(12) United States Patent
Chhabra

(10) Patent No.: US 12,423,415 B2
(45) Date of Patent: Sep. 23, 2025

(54) DYNAMIC HARDWARE INTEGRITY AND/OR REPLAY PROTECTION

(71) Applicant: Intel Corporation, Santa Clara, CA (US)

(72) Inventor: Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 18/266,379

(22) PCT Filed: Dec. 26, 2020

(86) PCT No.: PCT/US2020/067064
§ 371 (c)(1),
(2) Date: Jun. 9, 2023

(87) PCT Pub. No.: WO2022/139848
PCT Pub. Date: Jun. 30, 2022

(65) Prior Publication Data
US 2024/0193263 A1   Jun. 13, 2024

(51) Int. Cl.
*G06F 21/54* (2013.01)
*G06F 11/10* (2006.01)
*G06F 21/60* (2013.01)

(52) U.S. Cl.
CPC .......... *G06F 21/54* (2013.01); *G06F 11/1016* (2013.01); *G06F 21/602* (2013.01)

(58) Field of Classification Search
CPC ..... G06F 21/54; G06F 11/1016; G06F 21/602
See application file for complete search history.

(56) References Cited

U.S. PATENT DOCUMENTS

| | | | |
|---|---|---|---|
| 10,725,861 B2* | 7/2020 | Bolotov | G06F 11/1068 |
| 11,442,634 B2* | 9/2022 | Jean | G06F 21/79 |
| 11,514,174 B2* | 11/2022 | Mondello | G11C 29/52 |
| 2008/0072120 A1 | 3/2008 | Radke | |
| 2010/0293436 A1 | 11/2010 | Coteus et al. | |
| 2013/0117630 A1 | 5/2013 | Kang | |
| 2013/0166988 A1 | 6/2013 | Sharon et al. | |

(Continued)

FOREIGN PATENT DOCUMENTS

| | | |
|---|---|---|
| CN | 104115126 A | 10/2014 |
| KR | 10-2013-0049464 A | 5/2013 |

(Continued)

OTHER PUBLICATIONS

International Preliminary Report on Patentability, PCT App. No. PCT/US2020/067064, Jul. 6, 2023, 7 pages.

(Continued)

*Primary Examiner* — Linglan Edwards
*Assistant Examiner* — Jacob Benedict Knackstedt
(74) *Attorney, Agent, or Firm* — Nicholson De Vos Webster & Elliott LLP

(57) ABSTRACT

Techniques for dynamically configurable Scalable Memory Integrity and Enhanced Reliability, Availability, and Serviceability (SMIRAS) are described. A SMIRAS based system may be enabled to use an integrity-based metadata organization, a replay protection-based metadata organization, or a combination of both metadata organizations.

19 Claims, 37 Drawing Sheets

(56) References Cited

U.S. PATENT DOCUMENTS

2017/0091445 A1* 3/2017 Xing ................ G06F 21/79
2017/0185532 A1 6/2017 Durham et al.
2017/0239566 A1 8/2017 Perlman et al.

FOREIGN PATENT DOCUMENTS

TW 201119401 A 6/2011
TW 202015065 A 4/2020

OTHER PUBLICATIONS

International Search Report and Written Opinion, PCT App. No. PCT/US2020/067064, Sep. 24, 2021, 8 pages.
Office Action, TW App. No. 110134021, Nov. 25, 2024, 07 pages (04 pages of English Translation and 03 pages of Original Document).

* cited by examiner

| MSR BIT FIELDS 801 | MSR BIT DESCRIPTION 803 |
|---|---|
| 0 | AES-XTS 128-BIT ENCRYPTION |
| 1 | AES-XTS 128-BIT ENCRYPTION WITH AT LEAST 30BIT SHA-3-BASED MAC |
| 2 | AES-XTS 256-BIT ENCRYPTION |
| 3 | AES-XTS 256-BIT ENCRYPTION WITH AT LEAST 30-BIT SHA-3-BASED MAC |
| 4 | AES-XTS 256-BIT ENCRYPTION WITH AT LEAST 32-BIT SCALABLE INTEGRITY |
| 5 | AES-XTS 256-BIT ENCRYPTION WITH AT LEAST 56-BIT SCALABLE INTEGRITY |
| 15:6 | RESERVED |
| 20:16 | RESERVED |
| 28:21 | 21: STATIC SMIRAS<br>22: 1 GB GRANULAR SMIRAS<br>23: 8 GB GRANULAR SMIRAS<br>24: 16 GB GRANULAR SMIRAS<br>28:25: RESERVED |
| 31:29 | RESERVED |
| 63:32 | KEYID FIELDS |

FIG. 8

| MSR BIT FIELDS 901 | MSR BIT DESCRIPTION 903 |
|---|---|
| 0 | LOCK RO |
| 1 | ENABLE |
| 2 | KEY SELECT (0 – CREATE NEW; 1 – RESTORE KEY) |
| 3 | SAVE KEY FOR STANDBY |
| 7:4 | POLICY/ENCRYPTION ALGORITHM |
| 10:8 | RSVD |
| 11 | ENABLE SMIRAS |
| 13:12 | SMIRAS GRANULARITY |
| 31:14 | RESERVED |
| 35:32 | KEYID_BITS |
| 47:36 | RESERVED |
| 63:48 | ALG_ENABLE |

FIG. 9

FETCH A SINGLE INSTRUCTION HAVING FIELDS FOR AN OPCODE TO INDICATE A SMIRAS METADATA ORGANIZATION TO AT LEAST ONE MEMORY SECURITY ENGINE ACCORDING TO A SPECIFIED SIZE OF MEMORY TO BE UNSEQUESTERED AND ONE OR MORE FIELDS TO IDENTIFY A REGION TO CONVERT FROM SMIRAS PROTECTED
1001

DECODE THE INSTRUCTION 1003

RETRIEVE DATA ASSOCIATED WITH THE SOURCE OPERAND(S) AND SCHEDULE
1005

EXECUTE THE DECODED INSTRUCTION TO INDICATE A NON-SMIRAS METADATA ORGANIZATION TO THE AT LEAST ONE MEMORY SECURITY ENGINE ACCORDING TO THE SPECIFIED SIZE OF MEMORY TO BE NO LONGER SMIRAS PROTECTED
1007

COMMIT A RESULT OF THE EXECUTED INSTRUCTION
1009

FIG. 10

| DATALINE 1401 | MAC 1403 | VER 1405 | L0-LN-1 1407 | } 1400
| DATALINE 1411 | MACVER 1413 | | L0-LN-1 1417 | } 1410
| DATALINE 1421 | ECC_TIER2 1423 | VER 1425 | L0-LN-1 1427 | } 1420

FIG. 14

FETCH A SINGLE INSTRUCTION HAVING FIELDS FOR AN OPCODE TO INDICATE A USAGE OF SMIRAS REPLAY PROTECTION METADATA ORGANIZATION TO AT LEAST ONE MEMORY SECURITY ENGINE ACCORDING TO A SPECIFIED SIZE OF MEMORY TO BE SEQUESTERED AND ONE OR MORE FIELDS TO IDENTIFY A REGION TO CONVERT TO USING SMIRAS REPLAY PROTECTION 1601

DECODE THE SINGLE INSTRUCTION 1603

RETRIEVE DATA ASSOCIATED WITH THE SOURCE OPERANDS AND SCHEDULE 1605

EXECUTE THE DECODED SINGLE INSTRUCTION TO INDICATE A SMIRAS METADATA ORGANIZATION TO THE AT LEAST ONE MEMORY SECURITY ENGINE ACCORDING TO THE IDENTIFIED REGION 1607

COMMIT A RESULT OF THE EXECUTED INSTRUCTION 1609

FIG. 16

| MSR BIT FIELDS 1701 | MSR BIT DESCRIPTION 1703 |
|---|---|
| 0 | AES-XTS 128-BIT ENCRYPTION |
| 1 | AES-XTS 128-BIT ENCRYPTION WITH AT LEAST 30-BIT SHA-3-BASED MAC |
| 2 | AES-XTS 256-BIT ENCRYPTION |
| 3 | AES-XTS 256-BIT ENCRYPTION WITH AT LEAST 30-BIT SHA-3-BASED MAC |
| 4 | AES-XTS 256-BIT ENCRYPTION WITH AT LEAST 32-BIT SCALABLE INTEGRITY |
| 5 | AES-XTS 256-BIT ENCRYPTION WITH AT LEAST 56-BIT SCALABLE INTEGRITY |
| 15:6 | RESERVED |
| 20:16 | RESERVED |
| 28:21 | 21: 1 GRANULAR REPLAY PROTECTION<br>22: 8 GB GRANULAR REPLAY PROTECTION<br>23: 16 GB GRANULAR REPLAY PROTECTION<br>28:24: RESERVED |
| 31:29 | RESERVED |
| 63:32 | KEYID FIELDS |

FIG. 17

| MSR BIT FIELDS 1801 | MSR BIT DESCRIPTION 1803 |
|---|---|
| 0 | LOCK RO |
| 1 | ENABLE |
| 2 | KEY SELECT (0 – CREATE NEW; 1 – RESTORE KEY) |
| 3 | SAVE KEY FOR STANDBY |
| 7:4 | POLICY/ENCRYPTION ALGORITHM |
| 10:8 | RESERVED |
| 11 | ENABLE SMIRAS REPLAY PROJTECTION |
| 13:12 | SMIRAS REPLAY PROTECTION GRANULARITY |
| 31:14 | RESERVED |
| 35:32 | KEYID_BITS |
| 47:36 | RESERVED |
| 63:48 | ALG_ENABLE |

FIG. 18

```
┌─────────────────────────────────────────────────────────────────┐
│ FETCH A SINGLE INSTRUCTION HAVING FIELDS FOR AN OPCODE TO       │
│ INDICATE A CLEARING OF A SMIRAS METADATA ORGANIZATION TO AT     │
│ LEAST ONE MEMORY SECURITY ENGINE ACCORDING TO A SPECIFIED SIZE  │
│ OF MEMORY TO BE NO LONGER REPLAY PROTECTED AND ONE OR MORE      │
│ FIELDS TO IDENTIFY A REGION TO CONVERT FROM SMIRAS REPLAY       │
│ PROTECTED    1901                                                │
└─────────────────────────────────────────────────────────────────┘
                                  │
                                  ▼
┌─────────────────────────────────────────────────────────────────┐
│ DECODE THE INSTRUCTION  1903                                     │
└─────────────────────────────────────────────────────────────────┘
                                  │
                                  ▼
┌─────────────────────────────────────────────────────────────────┐
│ RETRIEVE DATA ASSOCIATED WITH THE SOURCE OPERAND(S) AND SCHEDULE│
│                              1905                                │
└─────────────────────────────────────────────────────────────────┘
                                  │
                                  ▼
┌─────────────────────────────────────────────────────────────────┐
│ EXECUTE THE DECODED INSTRUCTION TO INDICATE A NON-SMIRAS REPLAY │
│ PROTECTION METADATA ORGANIZATION TO THE AT LEAST ONE MEMORY     │
│ SECURITY ENGINE ACCORDING TO THE SPECIFIED SIZE OF MEMORY TO BE │
│ NO LONGER PROTECTED 1907                                         │
└─────────────────────────────────────────────────────────────────┘
                                  │
                                  ▼
┌─────────────────────────────────────────────────────────────────┐
│ COMMIT A RESULT OF THE EXECUTED INSTRUCTION                      │
│                             1909                                 │
└─────────────────────────────────────────────────────────────────┘
```

FIG. 19

| OPCODE MNEMONIC(S) 2401 | SOURCE 1 (MEM/REG/IMM) 2405 | SOURCE 2 (MEM/REG/IMM) 2405 | SOURCE 3 (MEM/REG/IMM) 2407 |
|---|---|---|---|
| SMIRAS_INTPROT/ SMIRAS_CLEARINTPROT | REGION IDENTIFIER | | |
| SMIRAS_INTPROT/ SMIRAS_CLEARINTPROT | START OF RANGE | END OF RANGE | |
| SMIRAS_SETRPPROT/ SMIRAS_CLEARRPPROT | REGION IDENTIFIER | | |
| SMIRAS_SETRPPROT/ SMIRAS_CLEARRPPROT | START OF RANGE | END OF RANGE | |
| SMIRAS_SEC | REGION IDENTIFIER | TYPE | |
| SMIRAS_SEC | START OF RANGE | END OF RANGE | TYPE |
| SMIRAS_REG | REGION IDENTIFIER | | |
| SMIRAS_REG | START OF RANGE | END OF RANGE | TYPE |

FIG. 24

DYNAMIC HARDWARE INTEGRITY AND/OR REPLAY PROTECTION

BACKGROUND

Modern processors are designed to protect sensitive data in memory from both hardware and software attacks. Some processors provide cryptographic mechanisms for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. In the absence of such protections, an attacker with physical access to the system can record snapshots of data lines and replay them at a later point in time.

Memory integrity operates by associating a cryptographic message authentication code (MAC) with each dataline in memory. The MAC is generated when data is written to memory and verified when the data is read from memory as a dataline or cacheline. If data was modified when resident in memory, the MAC will not match and result in the modification attack being detected (a security exception can then be signaled to notify software of the attack).

BRIEF DESCRIPTION OF DRAWINGS

Various embodiments in accordance with the present disclosure will be described with reference to the drawings, in which:

FIG. 8 illustrates embodiments of a model specific register (MSR) detailing memory encryption capability.

FIG. 9 illustrates embodiments of a model specific register (MSR) detailing memory activation.

FIG. 10 is a flow diagram illustrating operations of a method for processing a SMIRAS_CLEARINTPROT instruction according to some embodiments.

FIG. 14 illustrates examples of embodiments of metadata layouts in sequestered memory.

FIG. 16 is a flow diagram illustrating operations of a method for processing a SMIRAS_SETRPPROT instruction according to some embodiments.

FIG. 17 illustrates embodiments of a model specific register (MSR) detailing memory encryption capability.

FIG. 18 illustrates embodiments of a model specific register (MSR) detailing memory activation.

FIG. 19 is a flow diagram illustrating operations of a method for processing a SMIRAS_CLEARRPPROT instruction according to some embodiments.

FIG. 24 illustrates embodiments of formats for variants of the above instructions.

DETAILED DESCRIPTION

Figure 1:
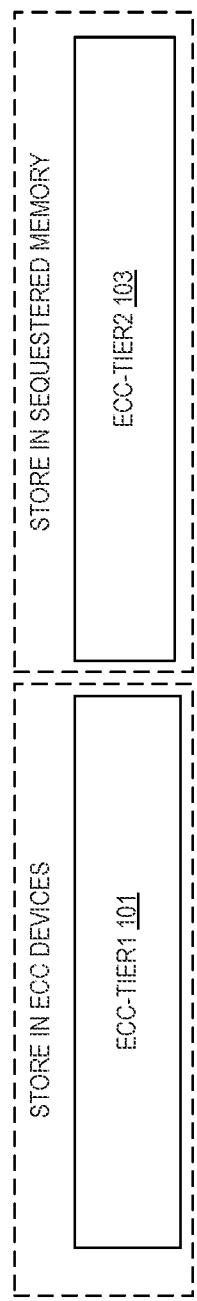
FIG. 1 illustrates embodiments of a tiered error correction code (ECC) organization.

The present disclosure relates to methods, apparatus, systems, and non-transitory computer-readable storage media for providing integrity and/or replay protection.

Cloud security providers (CSPs), driven by their customers' requirements, desire cryptographic isolation for the customer workloads running on their platform. In some embodiments, trust domain extensions (TDX) provide isolation on servers using a multi-key total memory encryption (MKTME) engine. Per-domain memory integrity is a component of TDX architecture, allowing protection against software attacks and defense against hardware modification attacks. However, to defend against additional hardware attacks, hardware replay protection may be needed.

As noted above, memory integrity operates by associating a MAC with each dataline in memory. The MAC is generated when data is written to memory and verified when the data is read from memory. If data was modified when resident in memory, the MAC will not match. As a result of this mismatch, modification attack may be detected (a security exception can then be signaled to notify software of the attack). Traditional integrity approaches can suffer from significant performance overheads as the MAC associated with each dataline must be loaded on each access and verified/updated depending on the type of memory access. This additional access results in storage, performance, and bandwidth overheads. Note that traditional memory integrity stores the MAC separately in stolen memory (memory not visible to the operating system (OS)).

Some server platforms use ECC memories for high availability and the ECC bits move along with the cacheline data, thereby eliminating the additional access and associated performance overheads. Note that cacheline and dataline may be used interchangeably in some embodiments. However, storing MAC in the ECC bits can result in reduced ECC capabilities (as an example for the most common DDR5 memories, 128 bits of ECC are needed for 100% single device error correction) and thus prevent scaling security beyond a certain limit due to the limited number of bits available in the ECC memory devices.

In some embodiments, a physical device (such as a DDR5 DIMM) includes memory devices that store ECC metadata and memory devices that are not used to store ECC metadata. For example, a dual in-line memory module (DIMM) may include ECC memory devices and non-ECC memory devices in some embodiments. In some embodiments, a system includes both ECC memory devices and non-ECC memory devices, but not at a DIMM level. In some embodiments, all memory devices store ECC metadata by default. Memory devices that use ECC are used to store performance sensitive metadata (e.g., error detection and correction tier of ECC, MAC), and memory devices used for sequestered memory may not use ECC (but may in some embodiments) and are used to store the metadata associated with a cacheline that is off the performance critical path (e.g., error correction tier of ECC). In some embodiments, 128 bits of data are stored per write in the memory devices. In some embodiments, additional parity bits (e.g., 8 bits) are also stored.

Some platforms provide Reliability, Availability, and Serviceability to support mission critical applications such as database, resource planning, resource management, and intelligence applications. Modern approaches strive to handle unrecoverable errors throughout the complete application stack, from the underlying hardware to the application software itself (FIG. 1). Such solutions involve three components: (1) reliability, how the solution preserves data integrity; (2) availability, how it guarantees uninterrupted operation with minimal degradation; and (3) serviceability, how it simplifies proactively and reactively dealing with failed or potentially failed components.

Detailed herein is a dynamic Scalable Memory Integrity and Enhanced RAS (SMIRAS) memory integrity and/or replay protection architecture. SMIRAS allows for full error correction capabilities and high-strength memory integrity without introducing, or minimizing, the performance overheads of traditional memory integrity approaches. In particular, in some embodiments, SMIRAS takes advantage of extended Reed Solomon codes for ECC which allows the ECC metadata bits to be split in two tiers, a first tier for error detection and correction and a second tier for error correction alone. In non-sequestered memory, datalines are stored along with metadata that may include one or more of ECC of the first tier, a MAC, a counter level value, and/or a version. In some embodiments, systems using SMIRAS use a sequestered memory (a separated portion of memory) to store the second tier of ECC metadata associated with each cacheline. As such, when full ECC correction desired, it is provided using both the ECC of the first tier and the ECC of the second tier.

To try to minimize the performance/bandwidth and storage overheads, embodiments herein detail a dynamic metadata allocation option where software designates a portion of memory to be SMIRAS protected memory. As such, a specified amount of memory in a system will utilized SMIRAS whereas the rest of the memory in the system will not be. The minimum granularity at which memory may be designated to be SMIRAS memory is referred to as a SMIRAS region. Note that in some embodiments, the SMIRAS region granularity (sizes of regions) is selectable by the basic input/output system (BIOS) at boot time and which regions are to use SMIRAS set by one or more instructions. Software can control whether memory is SMIRAS protected or not at runtime depending on the software's need for secure memory. Only memory that is SMIRAS protected incurs certain storage and performance overheads; memory that is not SMIRAS protected memory operates as on an unprotected system, without such certain overheads.

There are several approaches for specifying memory granularization. Detailed below are a few exemplary, but non-limiting approaches. A first approach is to set a granularity of 1 gigabyte (GB). For example, 1 GB is one of the most commonly used page sizes and is the granularity value for at least some embodiments. Another embodiment uses a granularity value of 8 GB. In processors with 64 bits per cacheline of metadata, a granularity of 8 GB works naturally as 1 GB for every 8 GB is used for metadata. In some embodiments, guest operating systems will be able to continue to operate unmodified with the metadata never being exposed to any guests. A third way to granularize is to set a granularity of 16 GB. Similar to 8 GB granularity, 16 GB granularity works naturally with 32 bits per cacheline or 64 bits per cacheline of SMIRAS metadata. With 32 bits per cacheline, 1 GB of a 16 GB region is reserved for SMIRAS metadata. With 64 bits per cacheline, 2 GB of a 16 GB region is reserved for SMIRAS metadata. With this option a smaller MAC can be offered (e.g., 28-bit to 32-bit MAC as opposed to the 56-bit MAC that can be afforded when using 64 bits per cacheline).

FIG. 1 illustrates embodiments of a tiered ECC organization. ECC_TIER1 101 represents ECC bits that are needed for both error detection and correction and hence are performance critical. ECC_TIER2 103 is only needed for error correction and hence can be stored in sequestered memory. On a write to memory, the ECC_TIER2 103 of ECC will be updated which can result in an extra access from sequestered memory. A metadata cache that caches ECC_TIER2 lines is used, in some embodiments, to minimize the additional accesses needed to memory for SMIRAS.

Figure 2:
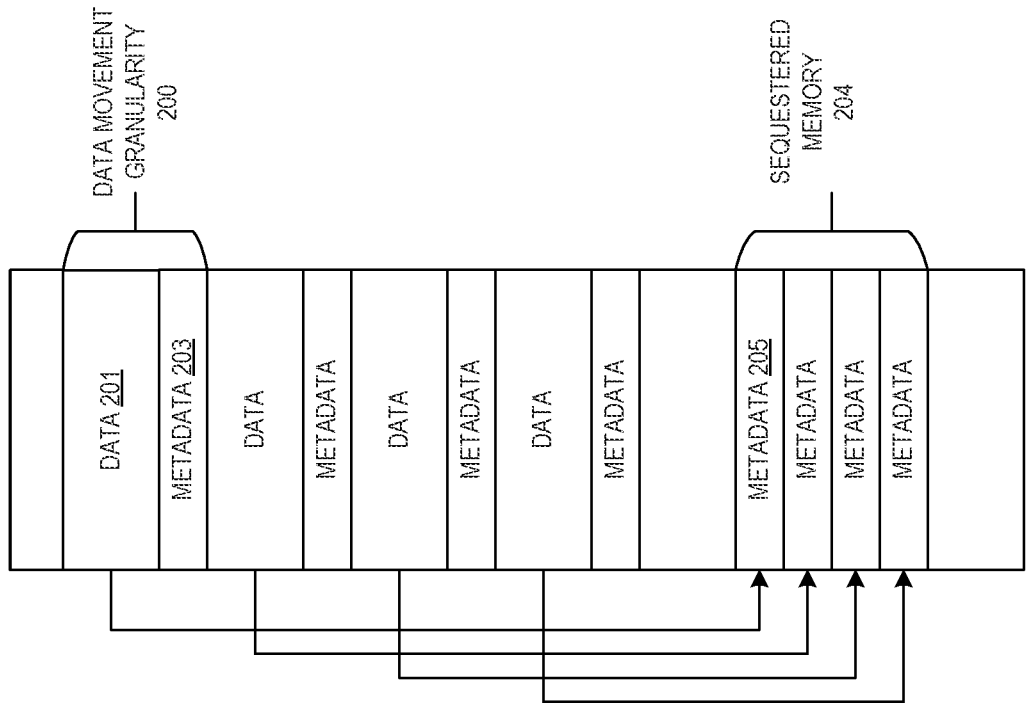
FIG. 2 illustrates embodiments of a memory layout with Scalable Memory Integrity and Enhanced Reliability, Availability, and Serviceability (SMIRAS).

FIG. 2 illustrates embodiments of a memory layout with SMIRAS. At a high-level, the use of SMIRAS sequesters an amount memory to store metadata (e.g., ECC_TIER2data) on a per-cacheline basis. As shown, a data movement granularity chunk 200 includes a dataline 201 and metadata 203. The metadata 203 is metadata of a first tier needed for error detection and correction. Additional metadata 205 is associated with each granular chunk 200 and is metadata of a second tier needed for error correction alone. This additional memory is stored in sequestered memory 204.

In some embodiments, SMIRAS uses ECC memory devices and non-ECC sequestered memory devices as a combined metadata store. The ECC memory devices store the performance sensitive metadata which is needed on reads and the sequestered memory devices store metadata that is off the performance path. As an example, a MAC associated with data the size of a cacheline is stored in the ECC memory devices as it may be considered performance sensitive. Sequestered memory is used to store metadata that is not performance sensitive. As an example, ECC metadata used for error correction alone is stored in sequestered memory. This secondary ECC metadata only needs to be updated on writes and does not need to be fetched on reads unless there is an error that needs correction. In non-ECC memory devices, all of the metadata is stored in sequestered memory.

Figure 3:
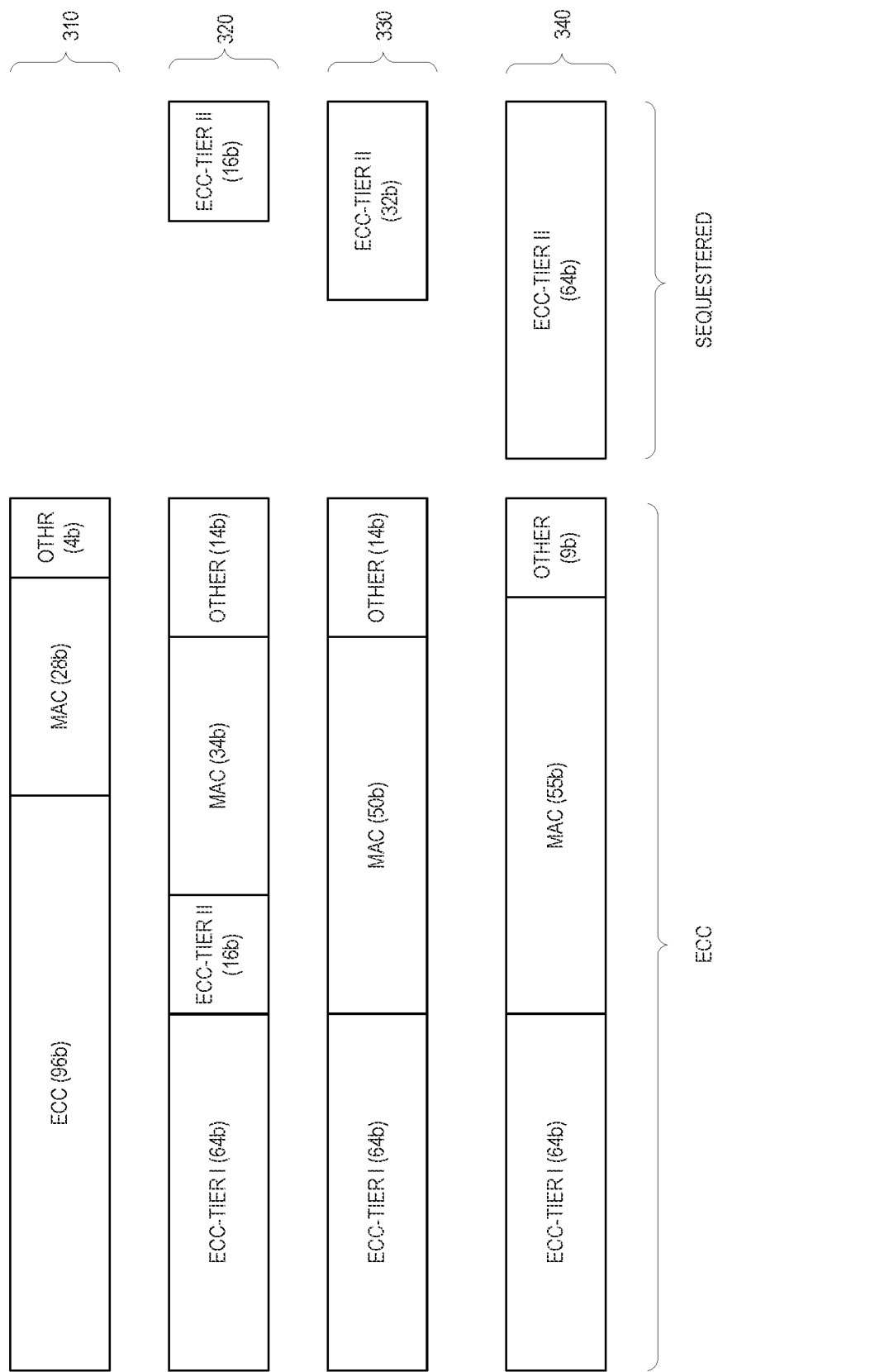
FIG. 3 illustrates a table providing a comparison of various metadata configurations, in accordance with at least one embodiment described herein.

FIG. 3 illustrates a table providing a comparison of various metadata configurations 310, 320, 330, and 340, in accordance with at least one embodiment described herein. As depicted in FIG. 3, a base metadata configuration 310 in which all of the metadata, including a 64 bits of error detection and correction data, 32 bits of error correction data, 28 bits of MAC data and 4 bits of security (or other) data fit within the 128 bits allowable in a first memory portion. In configuration 310, the MAC data is limited to 28 bits and the security data is limited to 4 bits to fit within the 128-bit constraint.

Configuration 320 provides a first metadata configuration in which the ECC data is split into a first portion of ECC data stored or otherwise retained in a first memory portion and a second portion of ECC data stored or otherwise retained in the sequestered, second memory portion. As depicted in configuration 320, the first memory portion stores or otherwise retains the first ECC data portion (64 bits of error detection+partial error correction data), and a portion of the second ECC data portion (16 bits of partial error correction data). The sequestered, second memory portion stores or otherwise retains the remaining portion of the second ECC data portion (16 bits of remaining error correction data). The first memory portion is read on every memory read operation, thereby permitting error detection capabilities. In some embodiments, the second ECC data portion (16 bits of remaining error correction data) in sequestered, second memory portion is accessed only upon detecting an error. The first memory portion allocated to the storage of MAC data has increased to 34 bits, providing an additional 6 bits of MAC data storage. Metadata configuration 320 beneficially provides increased capability for storage of other data—as depicted in configuration 320, up to 14 bits of other data. An example of such data includes but is not limited to tag bits.

Configuration 330 provides a second metadata configuration in which the first memory portion contains the first portion of ECC data (error detection data portion+partial correction data portion) and the second, sequestered memory portion contains the second portion of ECC data (remaining error correction data portion). As depicted in configuration 330, the first memory portion stores the first ECC data portion (64 bits of error detection data+partial correction data portion), 50 bits of MAC data, and 14 bits of other data (multi-level memory tag and state, Directory/Poison and other security related metadata). The sequestered second memory portion stores the second ECC data portion (32 bits of remaining error correction data). The first memory portion, including the first ECC data portion, containing the error detection data portion, is read on every memory read operation, thereby permitting error detection capabilities. The second ECC data portion (32 bits of remaining error correction data) in the sequestered, second memory is accessed only upon detecting an error. The first memory portion allocated to the storage of MAC data has increased to 50 bits, providing an additional 22 bits of MAC data storage over the base configuration 310. Similar to metadata configuration 320, metadata configuration 330 beneficially provides increased capability for storage of other data, up to 14 bits of other data.

Configuration 340 provides a third metadata configuration in which the first memory portion contains the first ECC data portion (error detection+partial correction data) and the sequestered, second memory portion contains the second ECC data portion (remaining error correction data). As depicted in configuration 340, the first memory portion stores the first ECC data portion (64 bits of error detection+partial correction data), 55 bits of MAC data, and 9 bits of other data (multi-level memory tag and state and other security related metadata). The sequestered, second memory portion stores the second ECC data portion (64 bits of remaining ECC data). The first memory circuitry portion, including the first ECC data portion, containing the error detection data, is read on every memory read operation, thereby permitting error detection capabilities. The second ECC data portion (64 bits of remaining error correction data) in sequestered, second memory portion is accessed only upon detecting an error. The first memory portion allocated to the storage of MAC data 136 has increased to 55 bits, providing enhanced security by providing an additional 27 bits of memory circuitry to store MAC data over the base metadata configuration 310.

Figure 4:
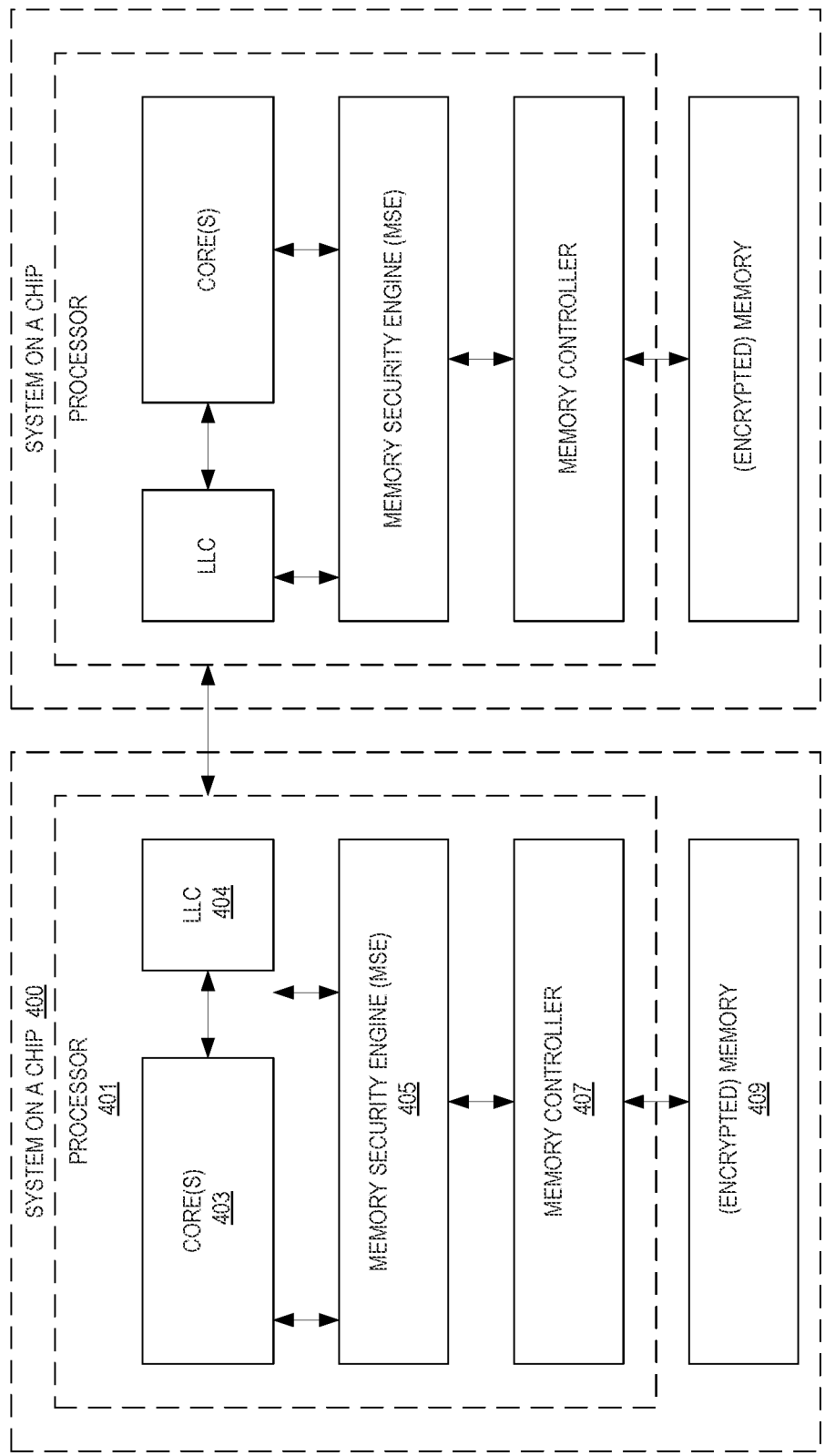
FIG. 4 illustrates embodiments of systems that utilizes SMIRAS.

FIG. 4 illustrates embodiments of systems that utilizes SMIRAS. As shown, an apparatus such as a processor 401 or system on a chip (SOC) 400 includes execution circuitry to execute decoded instructions such as one or more cores 403, a last level cache (LLC) 404 (which would be shared amongst a plurality of cores 403), a memory security engine (MSE) 405 to encrypt or decrypt data, validate data, maintain one or more encryption keys, and/or cache ECC data, and memory controller circuitry 407 to perform reads and write to memory (and, in some embodiments, to perform ECC-based error correction). Each processor 401 couples to memory 409 which may be encrypted. The memory coupled to the processor can be organized according to integrity based metadata organization and/or according to replay protection based metadata organization. Additionally, the memory 409 may support ECC. Each SOC 400 include the memory 409 in some embodiments. In some embodiments, the MSE 405 is a part of the memory controller circuitry 407. The apparatus further includes decoder circuitry to decode instructions including one or more single instructions. In some embodiments, a single SoC or multiple SoC constitute a package.

Figure 5:
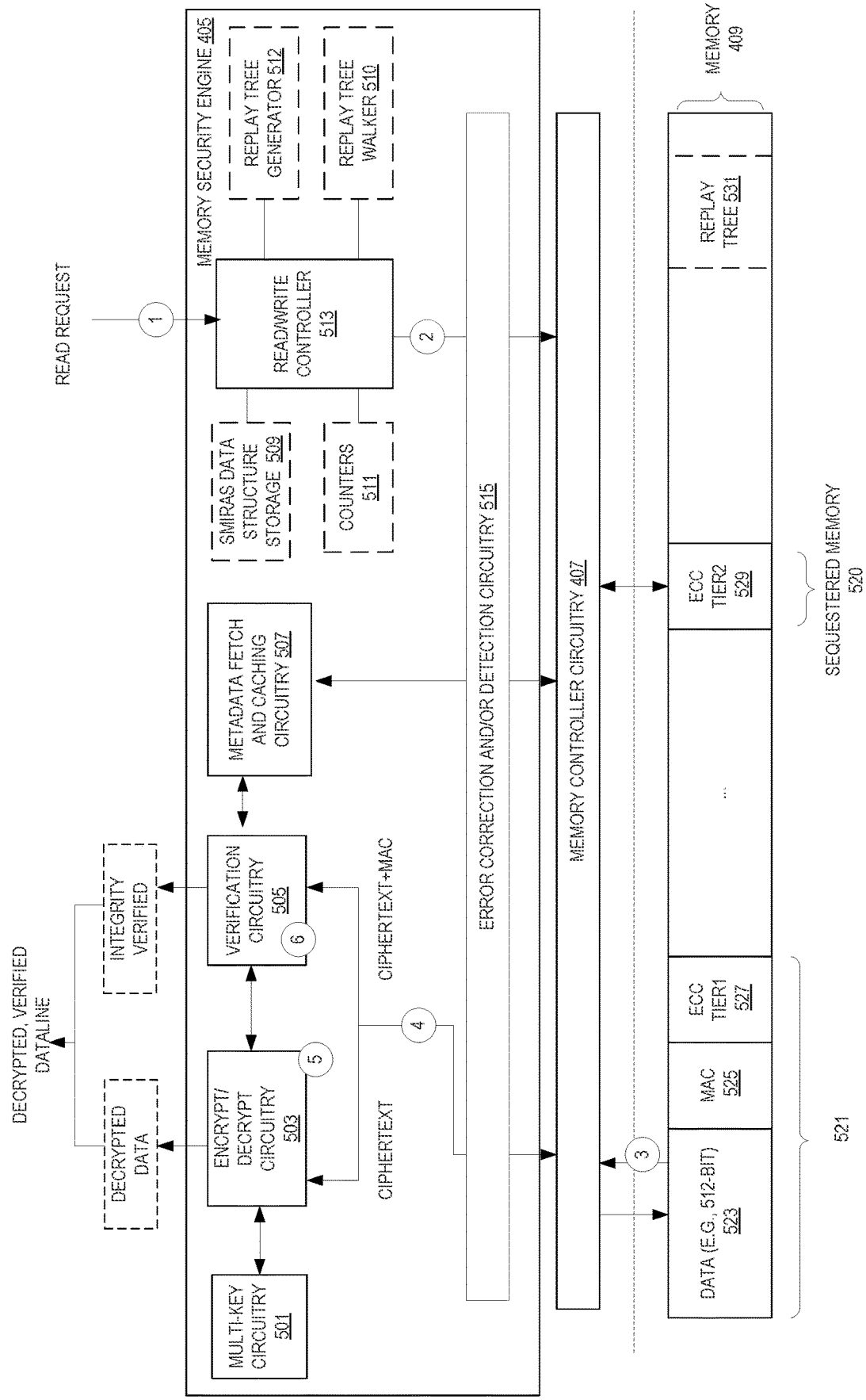
FIG. 5 illustrates embodiments of a memory security engine and its interaction with memory.

Most germane to SMIRAS is the MSE 405. Note that the MSE 405 may go by other names such as a memory encryption engine (MEE), a secure processor, etc. FIG. 5 illustrates embodiments of a memory security engine and its interaction with memory. The MSE 405 interacts with memory 409 (e.g., reads from or writes to) through memory controller circuitry 407. In this illustration, the memory 409 is storing a cacheline 521 having data 523, a MAC associated with the dataline 525, and ECC data needed for error detection and correction 527. ECC data needed for error correction alone 529 is stored in sequestered memory 520. In some embodiments, the ECC data needed for error detection and correction 527 and MAC 525 comprise 128 bits in total, the dataline 525 is 512-bit, and the ECC data needed for error correction alone 529 is 64-bit for each cacheline.

In some embodiments, the MSE 405 includes one or more of multi-key circuitry 501, encryption/decryption circuitry 503, error correction and/or detection circuitry 515, verification circuitry 505, metadata fetch and caching circuitry 507, a read/write controller 513, and/or one or more SMIRAS data structure(s) storage 509. Note that components shown in dashed lines may not be present or active in some embodiments (for example, when replay trees are not utilized the replay tree generator 512 and replay tree walker 510 are not present or active).

The multi-key circuitry 501 provides (e.g., stores and/or generates) multiple encryption keys. In some embodiments, the multi-key circuitry 501 comprises a key table having entries consisting of a key identifier (keyID), a key, and an indication of usage for the key. In some embodiments, the encryption keys are generated using a hardware random number generator. An example of a hardware random number generator is a physical unclonable function (PUF) circuit. Examples of types of encryption keys include, but are not limited to keys for AES-XTS-128-bit, AES-XTS-256-bit, etc. Typically, software manages the use of keys and can use each of the available keys for encrypting any page of the memory. As such, the multi-key circuitry 501 allows for at least page granular encryption of memory.

The encryption/decryption circuitry 503 performs encryption and decryption, such as AES-XTS-128-bit, AES-XTS-256-bit, etc. In particular, the encryption/decryption circuitry 503 can take in ciphertext and produce decrypted data or take in data and produce ciphertext. In some embodiments, AES-XTS encryption computes a tweak that is derived from a memory address of system memory. The tweak can be a unique location in memory, e.g. two memory sectors containing the same information can each have a unique memory location. The tweak can be represented as a combination of a processor-memory interface (PMI) sector address and index of a block within the sector of memory and may be stored in a tweak buffer when write or read data is received to be encrypted or decrypted.

Error correction and/or detection circuitry 515 performs one or more of: error correction and/or detection for data retrieved from memory 409 and error correction code generation for data to be written to memory 409.

The verification circuitry 505 uses message authentication codes (MACs) to check a dataline for integrity by comparing a calculated MAC value with the stored MAC value. Note the verification circuitry 505 generates the MAC value to be stored alongside a dataline and ECC in some embodiments. In some embodiments, the verification circuitry 505 performs error detection using ECC_TIER1 and error correction using ECC_TIER1 and ECC_TIER2.

The metadata fetch and caching circuitry 507 fetches (and caches) ECC data needed for error correction alone (e.g., ECC 529) when an error is detected by using the ECC data needed for error detection, when a correction code is not found in a cache of the metadata fetch and caching circuitry 507. Note that for writes, the ECC in sequestered memory is updated on each write (for a maximum of 2 writes). The cache of the metadata fetch and caching circuitry 507 may also store aspects of a replay protection tree, etc.

In some embodiments, one or more SMIRAS data structures (stored in SMIRAS data structure(s) storage 509) store one or more of the following: 1) a tier configuration (e.g., granularity, vector size, etc.) being used, 2) an indication of what encryption/decryption algorithm(s) are to be used, 3) addresses for data and metadata, 4) MSRs, and/or 4) an indication of which key(s) are to be used. In some embodiments, the tier configuration includes a region vector. As memory is divided into SMIRAS regions (with the granularity typically of the regions set by the BIOS in some embodiments and noted in a MSR) each having a bit in the SMIRAS region vector to indicate the metadata organization for that region (1: SMIRAS layout, 0: Non-SMIRAS layout).

In some embodiments, the MSE 405 includes aspects that allow for the supporting of SMIRAS replay protection using a replay protection tree. In particular, a replay protection tree walker 510, replay protection tree generator 512, and one or more counters 511 are included in the MSE 405. The replay protection tree 531 (or a proper thereof) is stored in memory 409. Note that in embodiments the top (root) level includes a sequence of on-die counters 511 which are stored in the internal storage of the processor die. The internal storage includes, but is not limited to, the on-die Static Random Access Memory (SRAM), register files, and any other suitable memory in the processor die. As these counters are on the processor die, their contents may be considered trusted and secure from passive and active attacks.

The read/write controller 513 performs read and write flows from and to memory (for integrity and/or replay protection). The read/write controller 513 may also track where data and metadata has been written for later retrieval. In some embodiments, the read/write controller 513 comprises one or more state machines. In some embodiments, the read/write controller 513 comprises one or more circuits.

The circles in this figure illustrate an exemplary memory read. A read request is generated (e.g., from a core) and the MSE 405 receives this request at circle 1. The MSE 405 issues a read request to the sequestered memory 520 via the memory controller circuitry 407 at circle 2. Ciphertext is read from memory (e.g., the dataline 523) along with the MAC associated with the dataline 525 and ECC data needed for error detection and correction 527) at circle 3.

The memory controller circuitry 407 determines if the ciphertext has errors using the ECC data 527. When there are no errors, the dataline 523 is concurrently or sequentially decrypted by the encryption/decryption circuitry 503 and verified using the MAC data 136 by the verification circuitry 505, at circles 4, 5 and 6 respectively.

In some embodiments, when the memory controller circuitry 407 and/or verification circuitry 505 determines there are errors or the dataline is not verifiable, the metadata fetch and caching circuitry 507 fetches the ECC data needed for error correction alone (e.g., ECC 529). One or more of the encryption/decryption circuitry 503, verification circuitry 505, metadata fetch and caching circuitry 507, and memory controller circuitry 407 repairs the dataline 523 using the entirety of the ECC (both portions). Responsive to a successful verification and decryption of the dataline 523, the decrypted data and an indication of an integrity verification are output.

Figure 6:
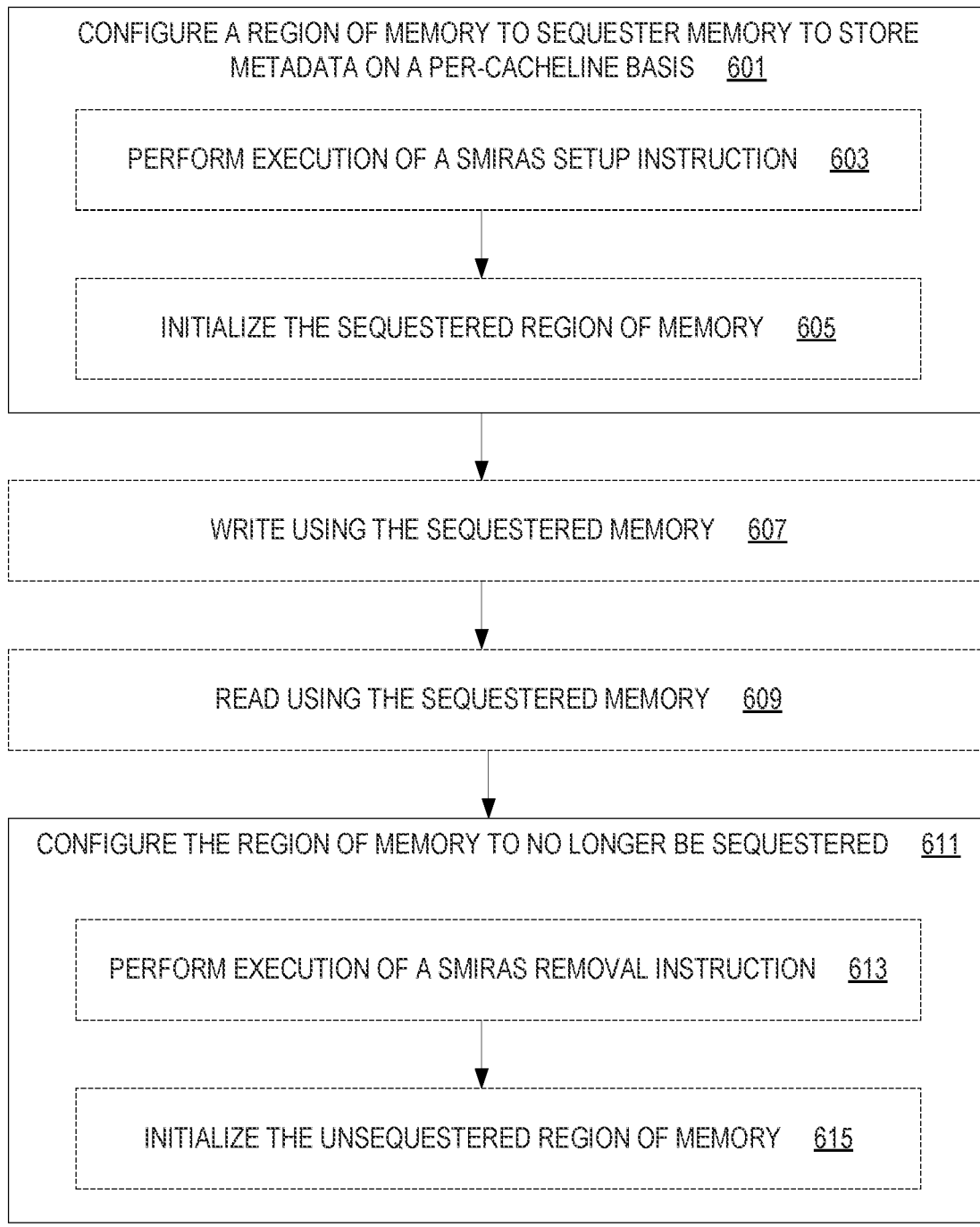
FIG. 6 is a flow diagram illustrating operations of a method for using SMIRAS according to some embodiments.

FIG. 6 is a flow diagram illustrating operations of a method for using SMIRAS according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by software executing on a processor or SOC.

At 601 a region of memory is configured as sequestered memory to store some metadata on a per-cacheline manner. In some embodiments, this configuration includes the execution of at least one instruction such as a single instruction. In some embodiments, a SMIRAS configuration (setup) instruction is executed at 603. For example, an integrity protection (or SMIRAS_INTPROT) instruction is executed to configure an integrity based metadata organization region of memory. The execution of the SMIRAS_INTPROT instruction causes all MSEs on a package to be alerted that a particular region of memory is being converted to SMIRAS protected memory (for example, that the particular region will be using tiered ECC organization). In some embodiments, the SMIRAS_INTPROT instruction includes one or more fields for an identifier of at least one operand location (e.g., register or memory) that is to store an indication of the region of memory that is to be organized according to the integrity based metadata organization, or an immediate that is to encode an indication of a region of memory that is to be organized according to the integrity based metadata organization, such as a region number to convert. As an example, in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata. As another example, with a 1 GB SMIRAS region granularity, a region number of 15 passed as an operand to this instruction would indicate that an addressable region from 15 GB to 16 GB of system memory will be protected with SMIRAS (whereas 0 GB to 15 GB will not be). In other embodiments, the SMIRAS_INTPROT instruction includes one or more fields for one or more operand locations (e.g., registers or memory) that is to store an address range for the SMIRAS region (e.g., a beginning address is stored in a first register and an ending address is stored in a second register). In some embodiments, a bit of a region vector is set indicating the region that is being protected. In some embodiments, the execution of a SMIRAS_INTPROT instruction will also cause an initialization of the identified region using non-temporal writes (e.g., the execution of a plurality of move bytes as a direct store instructions) to ensure metadata associated with each cacheline (e.g., ECC and MAC) is generated as per the SMIRAS layout. Note that which granularities, etc. are available may be set in one or more MSRs by BIOS.

In some embodiments, an initialization of the identified region using non-temporal writes (e.g., the execution of a plurality of MOVDIR64B instructions) is made to ensure metadata associated with each cacheline (e.g., ECC and MAC) is generated as per the SMIRAS layout at 605.

In some embodiments, at some point later in time, the sequestered memory is written to at 607. A write will write data, both tiers of ECC, and the MAC. A more detailed write flow according to some embodiments is detailed later.

In some embodiments, at some point later in time, the sequestered memory is read at 609. A read will read data, at least one tier of ECC and the MAC. A more detailed read flow according to some embodiments is detailed later.

At 611 SMIRAS region is configured to be "regular" again (such that it is no longer sequestered). In some embodiments, this conversion back to regular is performed by the execution of a SMIRAS removal instruction (such as a SMIRAS clear integrity protection (or SMIRAS_CLEAR-INTPROT)) instruction at 613 to disable an identified integrity-based metadata organization region of memory. The execution of the SMIRAS_CLEARINTPROT instruction causes all MSEs on a package to be alerted that a particular SMIRAS region is being converted to non-sequestered memory (for example, that the particular region will be not be using tiered ECC organization). In some embodiments, the SMIRAS_CLEARINTPROT instruction includes one or more fields for an operand location (e.g., register or memory) that is to store an indication of the region of memory that has been organized according to the integrity based metadata organization, and/or an immediate that is to encode an indication of a region of memory that has been organized according to the integrity based metadata organization, such as a region number to convert to regular usage. As an example, in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata. As another example, with a 1 GB SMIRAS region granularity, a region number of 15 passed as an operand to this instruction would indicate that an addressable region from 15 GB to 16 GB of system memory will not be protected with SMIRAS (whereas 0 GB to 15 GB will not be). In other embodiments, the SMIRAS_CLEARINTPROT instruction includes one or more fields for one or more operand locations (e.g., registers or memory) that is to store an address range for the SMIRAS region (e.g., a beginning address is stored in a first register and an ending address is stored in a second register) to be converted back to regular. In some embodiments, the execution of a SMIRAS_CLEARINTPROT instruction will also cause an initialization of the identified region using non-temporal writes (e.g., the execution of a plurality of MOVDIR64B instructions) to ensure metadata associated with each cacheline (e.g., ECC and MAC) is generated as per the non-SMIRAS layout.

In some embodiments, an initialization of the identified region using non-temporal writes (e.g., the execution of a plurality of MOVDIR64B instructions) is made to ensure metadata associated with each cacheline (e.g., ECC and MAC) is generated as per the non-SMIRAS layout at 615.

Figure 7:
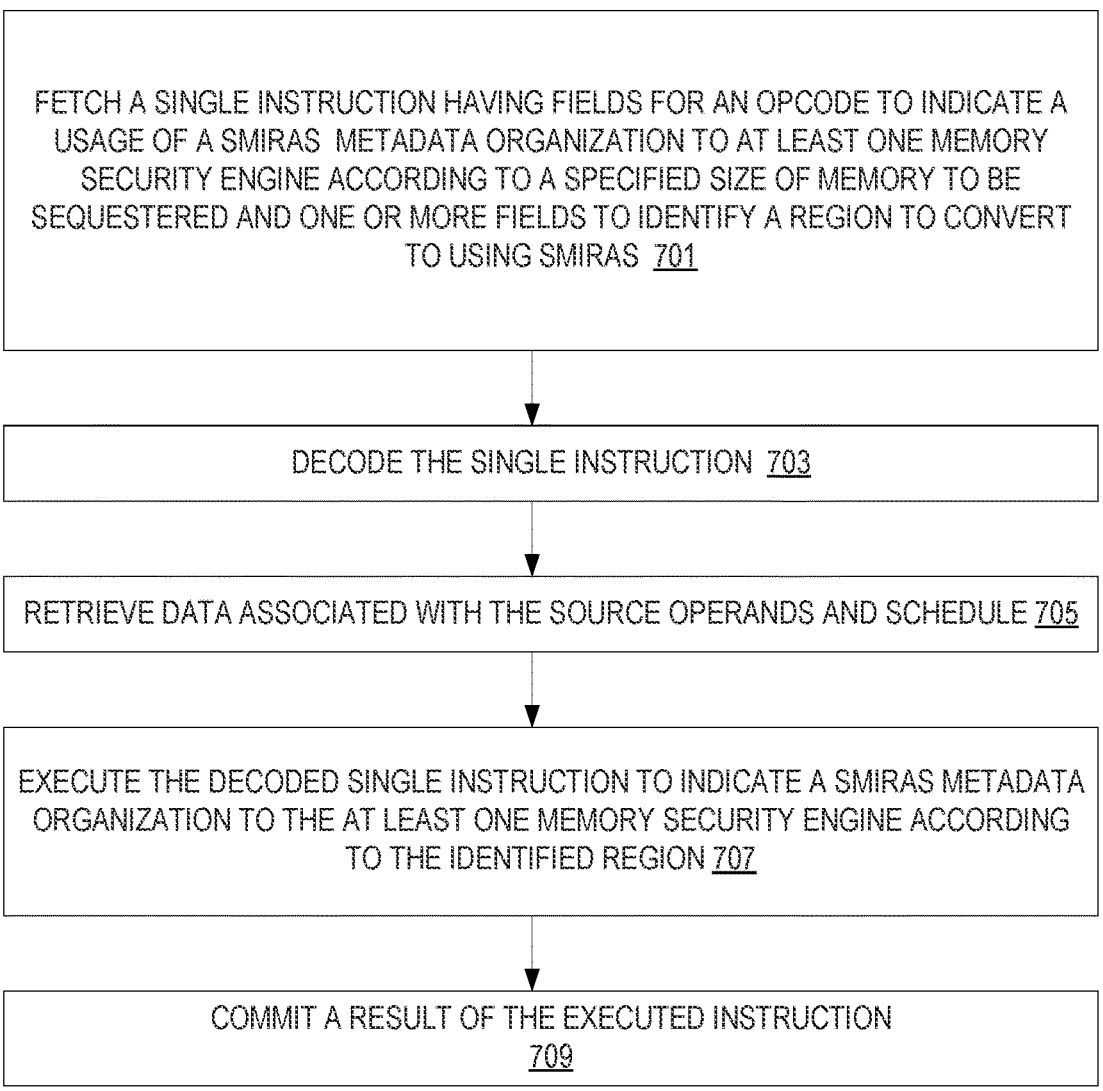
FIG. 7 is a flow diagram illustrating operations of a method for processing a SMIRAS_INTPROT instruction according to some embodiments.

FIG. 7 is a flow diagram illustrating operations of a method for processing a SMIRAS_INTPROT instruction according to some embodiments. At 701 a single SMIRAS_INTPROT instruction to configure an integrity based metadata organization region of memory is fetched having a field for an opcode to indicate execution circuitry is to at least indicate to at least one memory security engine to configure an integrity based metadata organization region of memory such as to indicate a SMIRAS metadata organization to at least one memory security engine according to a specified size of memory to be sequestered and one or more fields to identify a region to convert to SMIRAS protected.

In some embodiments, the SMIRAS_INTPROT instruction includes one or more fields for an identifier of at least an operand location (e.g., register or memory) that is to store an indication of the region of memory that is to be organized according to the integrity based metadata organization, and/or an immediate that is to encode an indication of a region of memory that is to be organized according to the integrity based metadata organization, such as a region number to convert. As an example, in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata. As another example, with a 1 GB SMIRAS region granularity, a region number of 15 passed as an operand to this instruction would indicate that an addressable region from 15 GB to 16 GB of system memory will be protected with SMIRAS (whereas 0 GB to 15 GB will not be). In other embodiments, the SMIRAS_INTPROT instruction includes one or more fields for one or more operand locations (e.g., registers or memory) that is to store an address range for the SMIRAS region (e.g., a beginning address is stored in a first register and an ending address is stored in a second register).

The single SMIRAS_INTPROT instruction is decoded at 703. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 705.

The decoded instruction is executed to indicate a SMIRAS metadata organization to the at least one memory security engine according to the identified region at 707. In some embodiments, the execution of the SMIRAS_INTPROT instruction causes all MSEs on a package to be alerted that a particular region of memory is being converted to SMIRAS protected memory (for example, that the particular region will be using tiered ECC organization). In some embodiments, the execution of a SMIRAS_INTPROT instruction will also cause an initialization of the identified region using non-temporal writes (e.g., the execution of a plurality of MOVDIR64B instructions) to ensure metadata associated with each cacheline (e.g., ECC and MAC) is generated as per the SMIRAS layout. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS is enabled or not. When not enabled, an exception is thrown and execution stops. In some embodiments, enablement is in an MSR. In some embodiments, a bit of a region vector is set indicating the region that is being protected.

A result of the executed instruction is committed at 709 in some embodiments.

As noted above, SMIRAS capability may be exposed to the BIOS/software via MSRs. FIG. 8 illustrates embodiments of a model specific register (MSR) detailing memory encryption capability. In some embodiments, this register is IA32_TME_CAPABILITY. This illustration shows MSR bit fields 801 and their corresponding description 803. Note that fields may be rearranged, etc. as this is merely an exemplary MSR layout.

The first six fields indicate what encryption and MAC the MSE(s) are to use by the encryption/decryption circuitry 503 and verification circuitry 505. Bits 28:21 indicate the type of SMIRAS granularity to use. Bits 63:32 identify the key(s) (e.g., from multi-key circuitry 501).

FIG. 9 illustrates embodiments of a model specific register (MSR) detailing memory activation. In some embodiments, this register is ME_ACTIVATE which is used, at least in part, to lock MSRs. This illustration shows MSR bit fields 901 and their corresponding description 903. Note that fields may be rearranged, etc. as this is merely an exemplary MSR layout.

Bit 0 indicates the a read only (RO) lock. Bit 1, when set, enables memory encryption (which may be total memory encryption). Bit 2 is used to select a key. Either create a new key at boot (when 0) or restore a key (when 1).

Bit 3 indicates to save the key into storage when resuming from standby.

Bits 7:4 indicate the encryption algorithm that is to be used. The value aligns with the first six fields of the MSR of FIG. 8.

Bits 10:8 are reserved.

Bit 11 indicates that SMIRAS is enabled (in some embodiments). Bits 13:12 indicate SMIRAS granularity.

Bits 31:14 are reserved.

Bits 35:32 indicate the number of keys to support. For example, if this has a value of 8 then up to 256 keys would be supported.

Bits 47:36 are reserved.

Bits 63:48 acts as a bitmask for each key identifier (KEYID) of if the identified encryption key has a valid encryption algorithm specified.

FIG. 10 is a flow diagram illustrating operations of a method for processing a SMIRAS_CLEARINTPROT instruction to disable an identified integrity based metadata organization region of memory according to some embodiments. In some embodiments, one or more (or all) of the operations are performed in a processor or SOC.

At 1001 a single SMIRAS_CLEARINTPROT instruction is fetched having fields for an opcode to indicate execution circuitry is to at least indicate to at least one memory security engine to disable an identified integrity based metadata organization region of memory such as to indicate a SMIRAS metadata organization to at least one memory security engine according to a specified size of memory to no longer be SMIRAS protected and one or more fields to identify a region to convert from SMIRAS protected (not use of sequestered memory).

In some embodiments, the SMIRAS_CLEARINTPROT instruction includes one or more fields for an an identifier of at least one operand location (e.g., register or memory) that is to store an indication of the region of memory that has been organized according to the integrity based metadata organization, and/or an immediate that is to encode an indication of a region of memory that been organized according to the integrity based metadata organization, such as a region number to convert to regular usage. As an example, in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata. As another example, with a 1 GB SMIRAS region granularity, a region number of 15 passed as an operand to this instruction would indicate that an addressable region from 15 GB to 16 GB of system memory will not be protected with SMIRAS (whereas 0 GB to 15 GB will not be). In other embodiments, the SMIRAS_CLEARINTPROT instruction includes one or more fields for one or more operand locations (e.g., registers or memory) that is to store an address range for the SMIRAS region to unconvert (e.g., a beginning address is stored in a first register and an ending address is stored in a second register). In some embodiments, a bit of a region vector is unset indicating the region that is not being protected.

The single SMIRAS_CLEARINTPROT instruction is decoded at 1003. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 1005.

The decoded instruction is executed to indicate the removal of a SMIRAS metadata organization to the at least one memory security engine according to the identified region at 1007. In some embodiments, the execution of the SMIRAS_CLEARINTPROT instruction causes all MSEs on a package to be alerted that a particular region of memory is being converted from SMIRAS protected memory (for example, that the particular region will not be using tiered ECC organization). In some embodiments, the execution of a SMIRAS_CLEARINTPROT instruction will also cause an initialization of the identified region using non-temporal writes (e.g., the execution of a plurality of MOVDIR64B instructions) to ensure metadata associated with each cacheline (e.g., ECC and MAC) is generated as per the non-SMIRAS layout. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS is enabled or not. When not enabled, an exception is thrown and execution stops. In some embodiments, enablement is in an MSR. In some embodiments, a bit of a region vector is unset indicating the region that is no longer being protected.

A result of the executed instruction is committed at 1009 in some embodiments.

Figure 11:
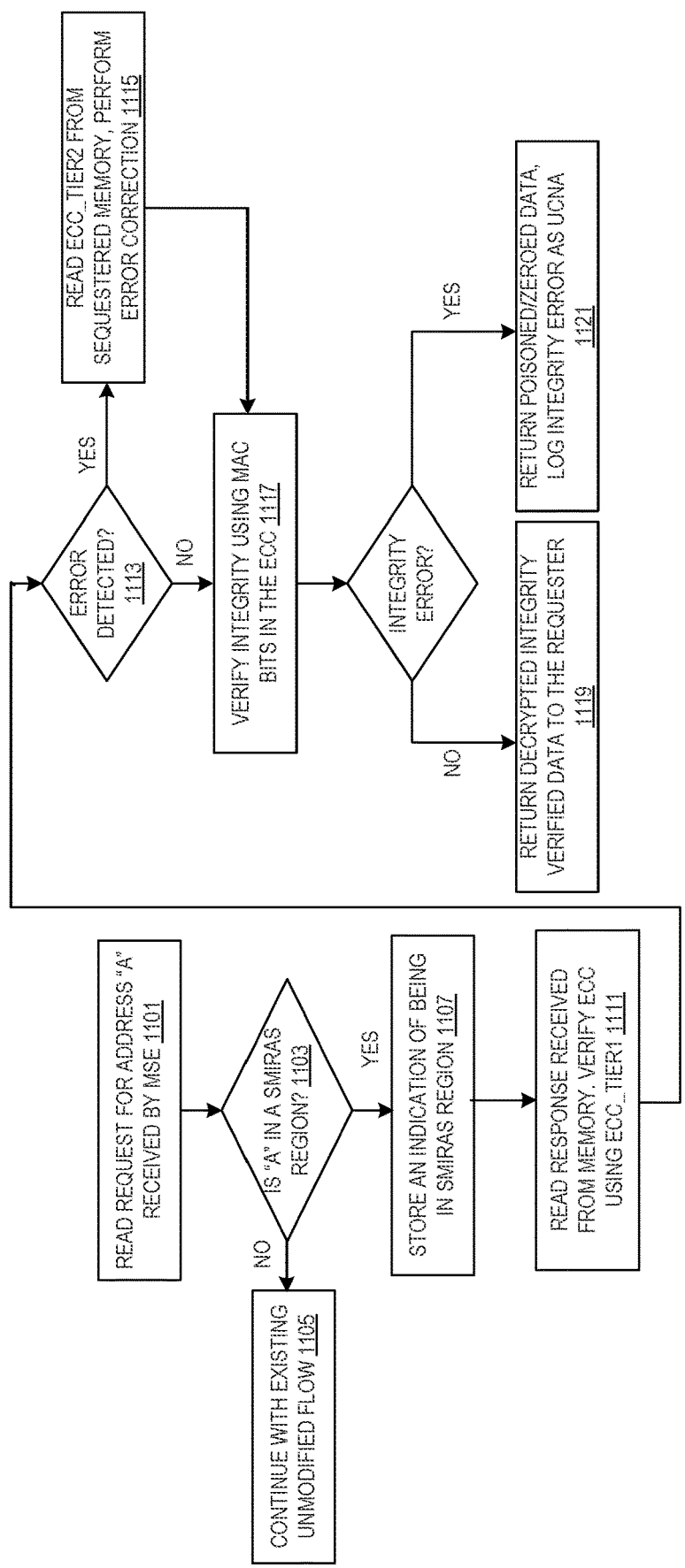
FIG. 11 illustrates embodiments a read flow using SMIRAS.

FIG. 11 illustrates embodiments of a read flow using SMIRAS. At 1101, a read request for address A is received by the MSE. The MSE looks up the region vector to determine whether the address belongs to a SMIRAS protected region or not at 1103. In some embodiments, an indication of if the address belongs to a SMIRAS protected region is stored at 1107 (e.g., in a tweak buffer) for later reference when a response returns.

When the address does not belong to a SMIRAS protected region, a traditional read for the dataline is performed at 1105. Note this read may include using full ECC. When the address belongs to a SMIRAS protected region, the memory responds with the dataline for a SMIRAS request at 1111 and the dataline is checked for any errors using ECC received with the dataline. As noted above, ECC_TIER1 is used to detect any errors in the dataline returned.

A determination of if there is an error detected is made at 1113. If an error is detected, a request to fetch ECC_TIER2 is issued at 1115. In some embodiments, this request first checks the metadata cache and if the cache returns a miss, the request is sent to memory. On receiving ECC_TIER2, error correction is performed using ECC_TIER1 and ECC_TIER2.

Once error correction is complete (or if the dataline received from memory had no errors), a verification of the integrity for the read response is made at 1117. If no integrity error is detected, decrypted/verified dataline is returned to the requester at 1119. If, on the other hand, integrity error is detected, poisoned/zeroed dataline is returned to the requester and the integrity error is logged in the machine check banks as uncorrected no action required (UCNA) at 1121.

Figure 12:
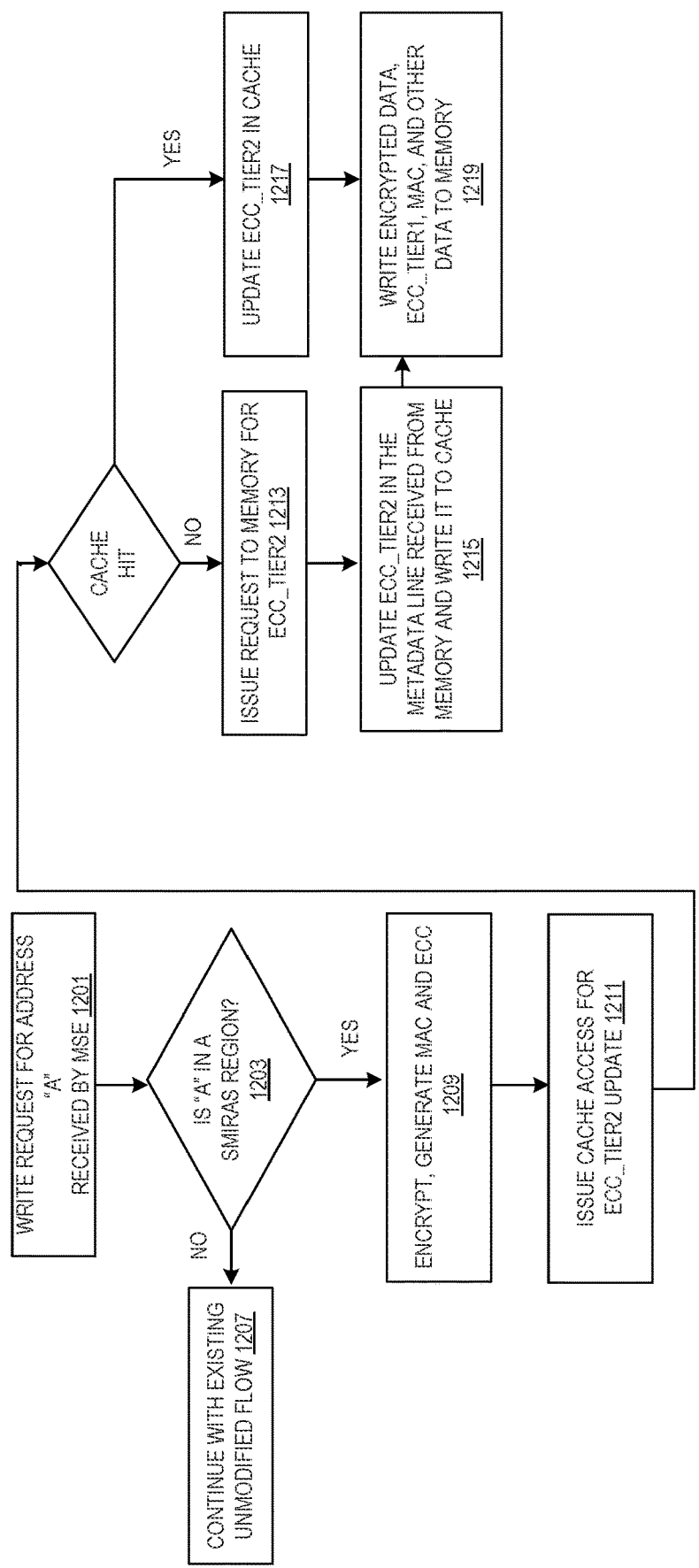
FIG. 12 illustrates embodiments a write flow using SMIRAS.

FIG. 12 illustrates embodiments of a write flow using SMIRAS. A write request for address A is received by the MSE at 1201. A look up of the region vector is made to determine whether the address belongs to a SMIRAS protected region or not at 1203. When the address is not a part of a SMIRAS region, traditional write processing occurs at 1207.

If the request belongs to a SMIRAS protected region, the write dataline is encrypted and ECC data (both ECC_TIER1 and ECC_TIER2) is generated at 1209. A MAC is also generated over the encrypted dataline and the ECC data (at least ECC_TIER1).

To update ECC_TIER2 for the encrypted data, the cache of the MSE is looked up for the line containing ECC_TIER2 that needs to be updated at 1211. If the access returns a hit, the line is updated in cache with the ECC_TIER2 value at 1217 and the encrypted data, ECC_TIER1, and MAC is written to memory at 1219. If the access returns a miss, a request is issued to memory to fetch the line containing ECC_TIER2 at 1213 and upon its return from memory, ECC_TIER2 for the encrypted line is updated and the updated line written to the cache at 1215. The encrypted data, ECC_TIER1, and MAC is then written to memory at 1219.

In some embodiments, partial writes are handled as read-modify-write operations and will use the read and write flows.

In some embodiments, memory replay protection using SMIRAS is supported. For memory replay protection, a tree of metadata is built over the protected memory with the top-level in the tree stored on-die (e.g., stored in at least one MSE). Each level in the tree protects the integrity of the next level in the tree. In this way, on-die nodes protect the integrity of the entire protected memory. For a read request, the tree nodes along the branch corresponding to the access are loaded and verified climbing up to the root. For a write request, the branch corresponding to the access is loaded, verified, and updated to reflect the updated data. Depending on the size of protected memory, the replay protection tree can result in many additional accesses (e.g., 8 levels in the tree are required for 256 GB of protected memory). This counter tree structure protects the memory region from replay attacks by a chain of verification operations. A write to a protected data line modifies a corresponding tree node at each level of the counter tree. When the protected data line is read, the processor verifies the value of the corresponding tree node at each level of the counter tree to authenticate the read result.

Figure 13:
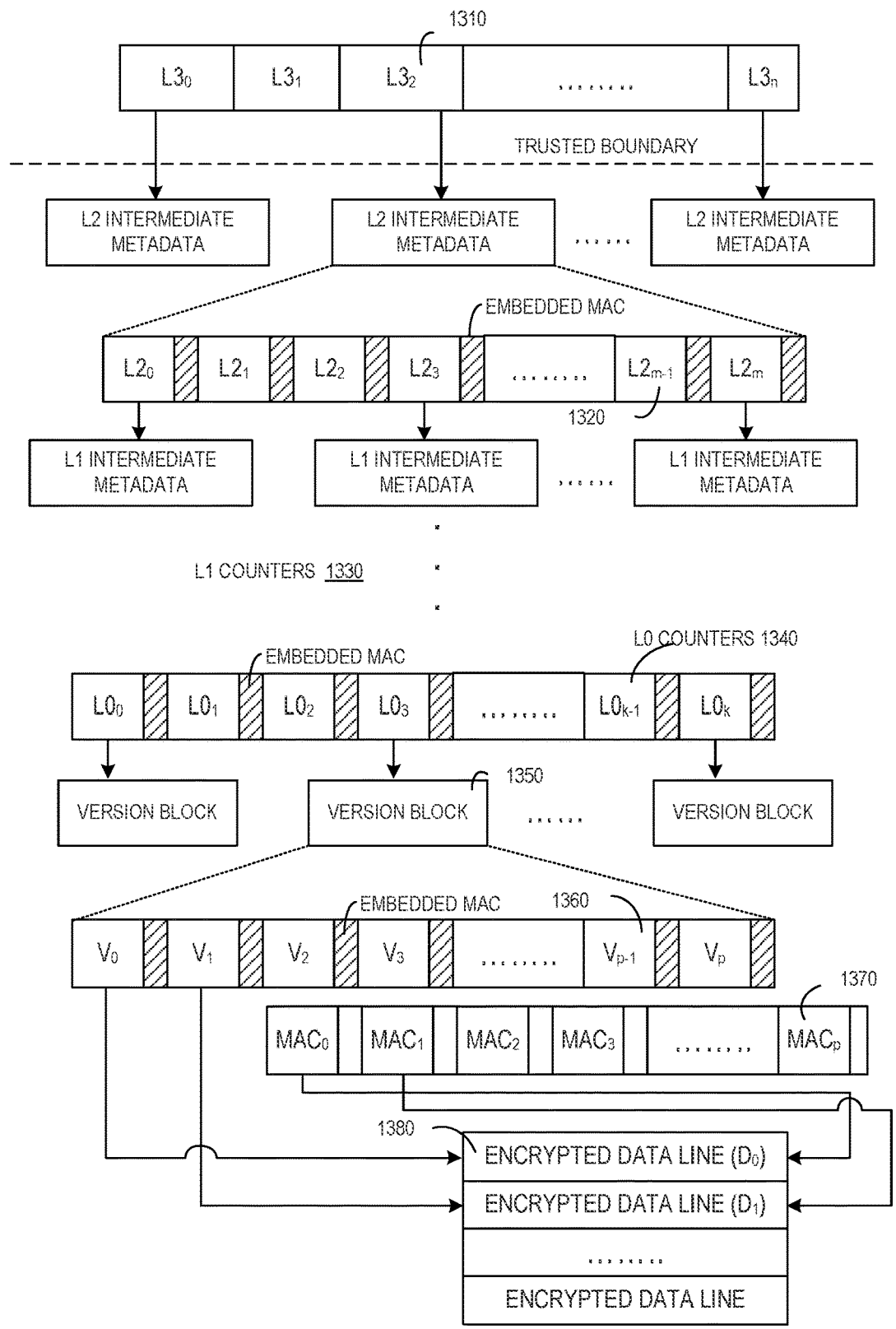
FIG. 13 illustrates embodiments of a high-level counter tree organization used to protect the integrity and ensure replay protection of the datalines.

FIG. 13 illustrates embodiments of a high-level counter tree organization used to protect the integrity and ensure replay protection of the datalines. It should be noted that the counter mode encryption described herein represents an example; embodiments of the invention can work with alternative mechanisms of counter mode encryption. In alternative embodiments there may be more or fewer levels in the counter tree structure than what is shown in FIG. 13.

At a high level, the tree consists of MAC nodes, version nodes and metadata nodes and the Top-level (or L3, used as an example) counters. For each dataline in the protected region, a per dataline MAC value is associated. Each time the dataline is written back to memory, this MAC is updated to reflect the most recent dataline that is stored in memory. When a dataline is read from memory, the memory protection engine verifies its MAC as well. This ensures protection against modification attacks on the dataline while it was resident in memory, providing integrity protection to the SMIRAS region.

The version nodes hold the version of a dataline which is incremented each time a dataline is written back to memory. A metadata node in the counter tree (L0, L1, L2) consists of counter values and an embedded MAC, computed over the counters stored in the node. As an input to the embedded MAC, a counter from the next higher level in the tree is used. This process continues up to the root counters or Top-level counter (L3), which are stored securely on the chip in SRAM. The L3 counters are never evicted off the processor chip and hence are guaranteed protection against attacks. In essence, the counters at each level in the tree act as versions for the next lower level ending with the version nodes storing the versions for the datalines. Hence, on a write to a dataline, all counters (including the version) and associated embedded MACs along the dataline's branches must be updated to ensure that the counters along the tree branch now reflect this update. In order to ensure replay-protection, each time a dataline is loaded from the protected region it is verified for authenticity against the tree nodes up to the root. A mismatch at any level indicates a potential attack and raises a security exception, thereby defeating the attack.

The counter tree structure includes a hierarchy of levels of tree nodes. The top (root) level includes a sequence of on-die counters (i.e., L3 counters 1310), which are stored in the internal storage of the processor die. The internal storage includes, but is not limited to, the on-die Static Random-Access Memory (SRAM), register files, and any other suitable memory in the processor die. As the L3 counters 1310 are on the processor die, their contents are trusted and secure from passive and active attacks. However, the trusted boundary (shown as a dotted line 1305) ends at the L3 counters 1310. In one embodiment, the lower levels of the counter tree lie outside of the process die (e.g., in main memory).

In one embodiment, each L3 counter 1310 is linked to a block of L2 intermediate metadata, which contains a sequence of L2 counters 1320. Each L2 counter 1320 is linked to a block of L1 intermediate metadata, which contains a sequence of L1 counters 1330. The blocks representing the L1 intermediate metadata and the L1 counters 1330 are omitted from FIG. 13 for simplicity of illustration. Each L1 counter 1330 is linked to a block of L0 intermediate metadata, which contains a sequence of L0 counters 1340. Each L0 counter 1340 is linked to a version block 1350, which contains a sequence of version nodes (represented by "V") 1360. Each version node 1360 is associated with an encrypted dataline 1380 in the protected region of main memory. The content of a version node 1360 is the version of the associated dataline, which provides a temporal component of the encryption seed in the counter mode encryption. As the lower-level counters (including L2, L1 and L0 counters and the version nodes 1360) are off the processor die and therefore are susceptible to attacks, each counter and each version node are encoded with an embedded MAC (shown as the blocks with hatched lines) to ensure their integrity.

In one embodiment, each embedded MAC is computed over the line in which they are embedded, using a corresponding counter from the next higher level as input. In the example of FIG. 13, the embedded MAC for the version block 1350 associated with $L0_3$ (shown in FIG. 13 as the middle version block) is computed using the values of $V_0$-$V_p$ and its corresponding L0 counter ($L0_3$). The value of this embedded MAC is stored in the line of the version blocks 1350 (shown as striped boxes in FIG. 13). The embedded MAC for each line of L0, L1 and L2 is computed similarly. L3 counters do not need embedded MACs because the contents of L3 counters are within the trusted boundary 1305.

The entire counter tree built over the protected memory region, starting from the versions up to the L3 counters, provides replay protection to the datalines in the protected memory region. The process of replay protection is as follows. When a processor performs a read operation or a write operation to a dataline, the MSE 405 loads a branch of the counter tree that contain tree nodes (also referred to as branch nodes) identified by the address of the dataline. The process of loading the tree nodes along a branch and verifying the authenticity of their values is herein referred to as a tree walk (or traverse). Tree walks proceed from the bottom level of the counter tree (i.e., the version nodes 1360) to the root nodes (i.e., the L3 counters). The authenticity of the tree node values needs to be verified because a major portion of the tree structure is resident in the main memory and therefore is susceptible to attacks. In case of a write, the tree walk is performed to verify the authenticity of the branch nodes values and update those values. In case of a read, the tree walk is also performed to verify the authenticity of the branch nodes values but without updating those values. In one embodiment, the MSE 405 contains a finite state machine circuitry that implements the tree walk.

In one embodiment, each encrypted dataline 1380 is encoded with a MAC node 1370 containing a MAC computed from the content of the dataline 1380. Each time the dataline is written back to memory, the MSE 405 updates this MAC to reflect the most recent data value stored in memory. When a dataline is read from memory, the MSE 405 verifies the value of its associated MAC node 1370 to establish the integrity of the dataline being read. The use of the MAC nodes 1370 provides integrity protection against modification attacks on a memory-resident dataline.

When the processor executes a write operation to write back one of the encrypted datalines 1380 into the protected memory region (e.g., when evicting a dataline from an on-die last level cache to the protected region in the main memory), the MSE 405 identifies the version node 1360 and the L0, L1, L2 and L3 counters (1310-1340) associated with that dataline. The MSE 405 updates the MAC 1370 associated with the dataline and increments the version of that dataline in the identified version node 1360. In addition, the MSE 405 also updates the identified L0, L1, L2 and L3 counters (1310-1340) of that dataline, as well as the embedded MAC associated with the updated version and the counters. This update process proceeds from the bottom level of the counter tree up to the root level of L3 counters, which are stored securely on the chip on the processor die and hence are guaranteed protection against attacks. The counters at each level of the counter tree act as the versions for the next lower level ending with the version nodes 1360 storing the versions for the datalines. Hence, on a write to a dataline, all of counters (including the version) and their associated embedded MACs along the branch identified by the dataline's address are updated to reflect the version update.

In order to ensure replay protection, each time a dataline is loaded from the protected region it is verified for authenticity against the tree nodes up to the root of the counter tree. A mismatch at any level indicates a potential attack and raises a security exception, thereby defeating the attack. Specifically, when a processor executes a read operation on one of the encrypted datalines 1380, the MSE 405 identifies the version and the L0, L1, L2 and L3 counters (1310-1340) of that dataline. Read operations do not alter the values of the version and the L0, L1, L2 and L3 counters (1310-1340). Upon a read operation, the MSE 405 verifies the MAC 1370 associated with the dataline. In addition, the MSE 405 verifies the embedded MAC associated with each of the version, L0, L1, L2 and L3 counters (1310-1340). This verification process proceeds from the bottom level of the counter tree up to the secure root counter L3.

In one embodiment, the tree nodes loaded in a tree walk are cached locally in an MEE cache, which is a local cache of the MSE 405. The MEE cache stores the values of the tree nodes (including the version nodes and the embedded MACs) that have been verified by previous requests. The content of the MEE cache is secure because it is located on the processor die. For read operations, a tree walk is terminated when the first node along the branch of the tree walk is found in the MEE cache. For write operations, a tree walk is terminated when the first node along the branch of the tree walk is found in the MEE cache and that the cached tree node is in the modified state.

To ensure that the counter tree returns correct counter values for all requests, on a write request the MSE 405 completes the update to all of the tree nodes along the write request's branch before any other request (read or write) sharing any of those tree nodes can proceed. As read requests do not alter the values of the counter tree, some of the read requests may be processed in parallel even though these read requests share one or more of the tree nodes in the counter tree.

The process of loading the tree nodes along a branch and verifying their authenticity is termed as a tree walk. In case of a write, the tree walk is done to load the tree nodes that need to be updated and verify their authenticity as they were resident in the main memory. In case of a read, the tree walk also establishes the integrity of the dataline read. It should also be noted that the tree nodes loaded in a tree walk are cached locally in a metadata cache. With the metadata cache, a tree walk is terminated when the first node along the tree walk is found in the cache (for writes, the cached tree node should be in modified state for the walk to be terminated). This is the case as a node in the metadata cache is considered to be secure, as it was verified by a previous request before being cached, and serves the same purpose as the L3 node.

At a highest level, memory is sequestered to store metadata corresponding to aspects of a replay protection tree (e.g., values that allow the replay protection tree to be walked) and/or the replay protection tree itself. Note that in some embodiments, a replay protection tree is not stored in sequestered memory. Prior solutions allocated metadata regions at boot time and present those regions as reserved to system software. In other words, this memory is lost at boot time and not available for use by system software. To keep the overall storage overheads small, prior solutions restrict replay protection to a region in memory. This approach has significant downsides. It forces software memory management changes to allocate memory from replay protected region vs. not. In effect, there are multiple memory pools that need to be created to manage the protected memory and rest of the memory. Additionally, the protected memory, including the metadata is stolen at boot time. If no security workloads are running, this region still cannot be used for regular/non-security usages, thereby reducing the overall memory available for non-secure usages.

FIG. 14 illustrates examples of embodiments of metadata layouts in sequestered memory. In particular, the non-data parts of these layouts are the metadata. In all of these layouts, ¾ of the replay protected region is made visible to software for use and ¼ of the converted region is used by the replay protection tree. In the first layout 1400, the dataline 1401 is not stored in sequestered memory, but what follows is. A MAC 1403 for the dataline is stored first, followed by a per cacheline version 1405, and followed by a counter value L0-LN-1 1407 where N is the top level in the tree. With this layout, each cacheline in the MAC region contains MACs for multiple (e.g., 8) consecutive cachelines in the data region and similarly each version line contains the first level versions multiple (e.g., 8) consecutive cachelines.

In the second layout 1410, the dataline 1411 is not stored in sequestered memory, but what follows is. In particular, a per-cacheline MAC and version are stored on the same cacheline 1413 in sequestered memory. With this layout, each cacheline in the MACVER region contains a MAC and version pairs of multiple (e.g., 4) consecutive cachelines. The MACVER 1413 is followed by a counter value L0-LN-1 1417 where N is the top level in the tree.

In the third layout 1420, ECC memory devices are used to store data (and performance metadata) and a portion thereof is allocated as sequestered memory. The ECC memory devices store the performance sensitive metadata which is needed on reads and the sequestered memory portion stores metadata that is off the performance path such as detailed above (e.g., not the MAC and ECC_TIER1). As an example, ECC_TIER2 1423 associated with dataline 1421 is stored in sequestered memory (followed by the per cacheline version 1425, and followed by a counter value L0-LN-1 1427 where N is the top level in the tree). This ECC portion only needs to be updated on writes and does not need to be fetched on reads unless there is an error that needs correction. Since errors are rare, this additional fetch for ECC on errors on reads does not have much, if any, impact on performance. Note that ECC_TIER1 and the MAC are stored with the dataline 1421 as detailed earlier. Note that the third layout is to be used on platforms which use ECC memory. For platforms using non-ECC memories, one of the first two metadata layouts shown in FIG. 14 is used.

Figure 15:
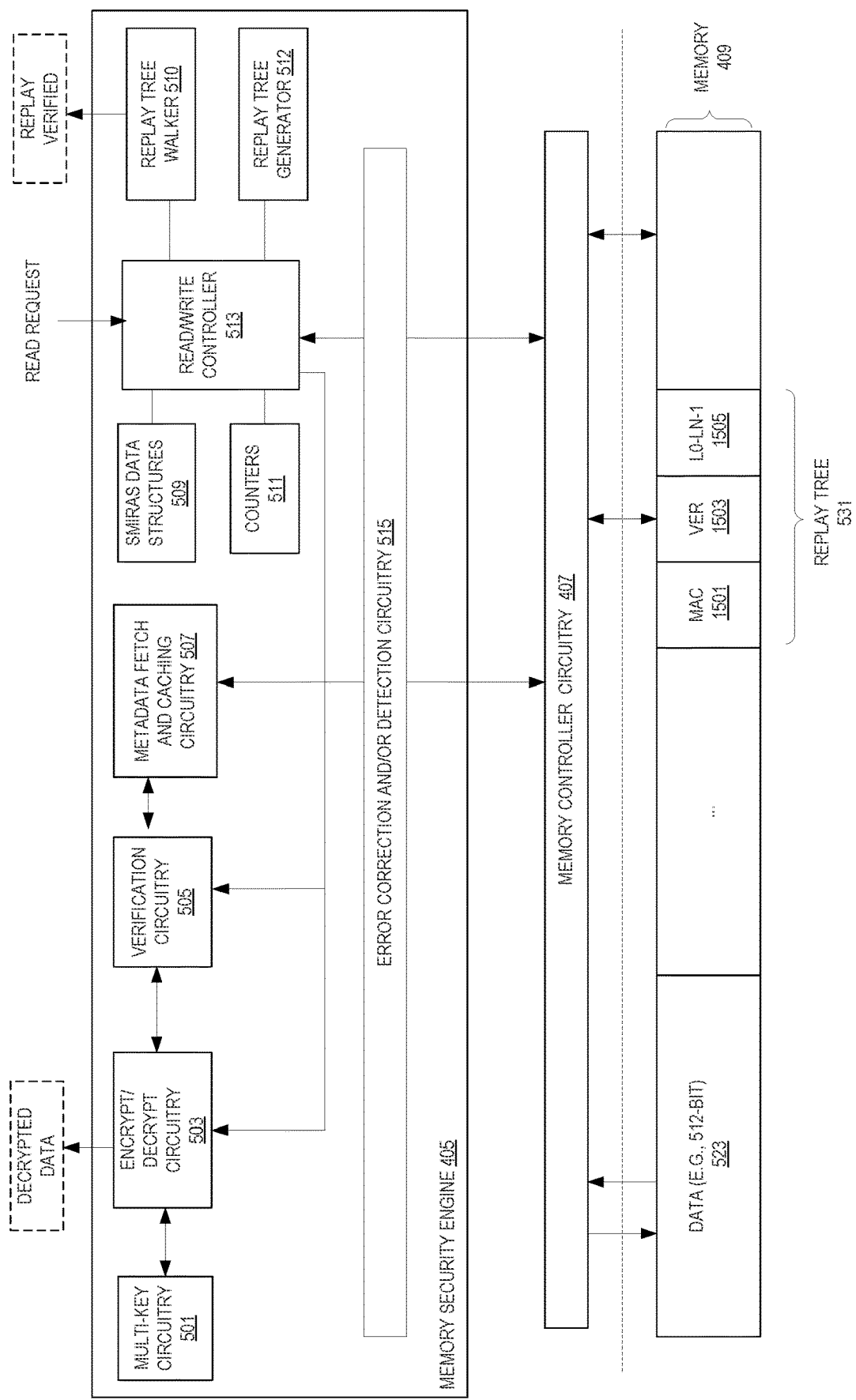
FIG. 15 illustrates embodiments of a memory security engine and its interaction with memory.

FIG. 15 illustrates embodiments of a memory security engine and its interaction with memory, and in particular, the interaction between the MSE 405 and memory 409 for replay protection. Note that the reference numbers from FIG. 5 are used where nothing has changed from that figure.

In this illustration, the memory 409 is storing a dataline 523 in non-sequestered memory. In sequestered memory 520, the replay protection tree 531 comprising the MAC

1501 for the dataline, the version 1503 of the dataline, the counter value L0-LN-1 1505 are stored.

On a read, the MAC 1501 for the dataline, the version 1503 of the dataline, the counter value L0-LN-1 1505 are used to walk the replay protection tree 531. If verified, the data of the dataline is read out to the requester.

Detailed herein are embodiments of two instructions (and their support) that allow for software to convert to and from SMIRAS replay protected memory. The instructions instruct all MSEs on a package that a particular region is being converted to or from a replay protected region. On conversion from regular to replay protected memory, execution of the instructions also causes an initialization of a replay protection tree to ensure that uninitialized reads from the replay protected region will not result in spurious integrity failures. The two instructions are one to set replay protection (e.g., SMIRAS_SETREPLAYPROTECTION (or SMIRAS_ SETRPPROT)) and one to clear replay protection (e.g., SMIRAS_CLEARREPLAYPROTECTION (or SMIRAS_CLEARRPPROT)).

In some embodiments, the replay protection tree is self-initializing. The top-level counters are initialized to zero. During tree walk, if any level is found in initialization state, the tree nodes are filled to the metadata cache in an initialization mode. In initialization mode, authentication is skipped, and lines are initialized (setting version counter to 1 for writes, leaving to 0 for reads (uninitialized reads are not MAC verified). A read to uninitialized region will hit the top-level counter in initialized state and fill to the metadata cache in the initialization mode. In some embodiments, the SMIRAS_SETRPPROT instruction initializes the top-level counters associated with the region and the SMIRAS_CLEARRPPROT clears those top-level counters.

FIG. 16 is a flow diagram illustrating operations of a method for processing a SMIRAS_SETRPPROT instruction according to some embodiments. In some embodiments, one or more (or all) of the operations are performed in a processor or SOC.

At 1601 a single SMIRAS_SETRPPROT instruction to configure a replay protection based metadata organization region of memory is fetched having fields for an opcode to indicate execution circuitry is to at least indicate to at least one memory security engine to configure a replay protection based metadata organization region of memory such as to indicate a usage of SMIRAS replay protection metadata organization to at least one memory security engine according to a specified size of memory to be sequestered and one or more fields to identify a region to convert to using SMIRAS replay protection. As such, once configured, memory accesses to the region having SMIRAS replay protection are to be verified against the replay protection tree. Using SMIRAS replay protection, data is stored in a first portion of memory and metadata (e.g., MAC, ECC_TIER2, VER, and/or counter values) are stored in a sequestered portion of memory.

In some embodiments, the SMIRAS_SETRPPROT instruction includes one or more fields for an identifier of at least an operand location (e.g., register or memory) that is to store an indication of the region of memory that is to be organized according to the replay protection based metadata organization, and/or an immediate that is to encode an indication of a region of memory that is to be organized according to the replay protection based metadata organization, such as a region number to convert. As an example, in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value. As another example, with a 1 GB SMIRAS replay protection region granularity, a region number of 15 passed as an operand to this instruction would indicate that an addressable region from 15 GB to 16 GB of system memory will be protected with SMIRAS (whereas 0 GB to 15 GB will not be). In other embodiments, the SMIRAS_SETRPPROT instruction includes one or more fields for one or more operand locations (e.g., registers or memory) that is to store an address range for the SMIRAS replay protection region (e.g., a beginning address is stored in a first register and an ending address is stored in a second register).

The single SMIRAS_SETRPPROT instruction is decoded at 1603. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 1605.

The decoded instruction is executed to indicate a SMIRAS replay protection metadata organization to the at least one memory security engine according to the identified region at 1607. In some embodiments, the execution of the SMIRAS_SETRPPROT instruction causes all MSEs on a package to be alerted that a particular region of memory is being converted to SMIRAS replay protected memory. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS replay protection is enabled or not. When not enabled, an exception is thrown and execution stops. In some embodiments, enablement is in an MSR. In some embodiments, a bit of a region vector is set indicating the region that is being protected. In some embodiments, the top-level counters associated with the region of a replay protection tree are initialized.

A result of the executed instruction is committed at 1609 in some embodiments.

SMIRAS replay protection capability may be exposed to the BIOS/software via MSRs. FIG. 17 illustrates embodiments of a model specific register (MSR) detailing memory encryption capability. In some embodiments, this register is IA32_TME_CAPABILITY. This illustration shows MSR bit fields 1701 and their corresponding description 1703. Note that fields may be rearranged, etc. as this is merely an exemplary MSR layout.

The first six fields indicate what encryption and MAC the MSE(s) are to use by the encryption/decryption circuitry 503 and verification circuitry 505. Bits 28:21 indicate the type of SMIRAS replay protection granularity to use. Bits 63:32 identify the key(s) (e.g., from multi-key circuitry 501).

FIG. 18 illustrates embodiments of a model specific register (MSR) detailing memory activation. In some embodiments, this register is ME_ACTIVATE which is used, at least in part, to lock MSRs. This illustration shows MSR bit fields 1801 and their corresponding description 1803. Note that fields may be rearranged, etc. as this is merely an exemplary MSR layout.

Bit 0 indicates a read only lock. Bit 1, when set, enables memory encryption (which may be total memory encryption). Bit 2 is used to select a key. Either create a new key at boot (when 0) or restore a key (when 1).

Bit 3 indicates to save the key into storage when resuming from standby.

Bits 7:4 indicate the encryption algorithm that is to be used. The value aligns with the first six fields of the MSR of FIG. 17.

Bits 10:8 are reserved.

Bit 11 indicates that SMIRAS replay protection is enabled (in some embodiments). Bits 13:12 indicate the replay protection granularity.

Bits 31:14 are reserved.

Bits 35:32 indicate the number of keys to support. For example, if this has a value of 8 then up to 256 keys would be supported.

Bits 47:36 are reserved.

Bits 63:48 acts as a bitmask for each KEYID of if the identified key has a valid encryption algorithm specified.

FIG. 19 is a flow diagram illustrating operations of a method for processing a SMIRAS_CLEARRPPROT instruction to disable an identified replay protection based metadata organization region of memory according to some embodiments. In some embodiments, one or more (or all) of the operations are performed in a processor or SOC.

At 1901 a single SMIRAS_CLEARRPPROT instruction is fetched having fields for an opcode to indicate the clearing of a SMIRAS replay protection metadata organization to at least one memory security engine according to a specified size of memory to be no longer replay protected and one or more fields to identify a region to convert from being SMIRAS replay protected.

In some embodiments, the SMIRAS_CLEARRPPROT instruction includes one or more fields for an identifier of at least an operand location (e.g., register or memory) that is to store an indication of the region of memory that was organized according to the replay protection based metadata organization, and/or an immediate that is to encode a region of memory that was organized according to the replay protection based metadata organization, such as a region number to convert to regular usage. As an example, in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value.

The single SMIRAS_CLEARRPPROT instruction is decoded at 1903. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 1905.

The decoded instruction is executed to indicate the removal of a SMIRAS replay protect metadata organization to the at least one memory security engine according to the identified region at 1907. In some embodiments, the execution of the SMIRAS_CLEARRPPROT instruction causes all MSEs on a package to be alerted that a particular region of memory is being converted from SMIRAS replay protected memory. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS is enabled or not. When not enabled, an exception is thrown and execution stops. In some embodiments, enablement is in a MSR. In some embodiments, a bit of a region vector is unset indicating the region that is no longer being protected. In some embodiments, the top-level counters associated with the region of a replay protection tree are cleared.

A result of the executed instruction is committed at 1909 in some embodiments.

Figure 20:
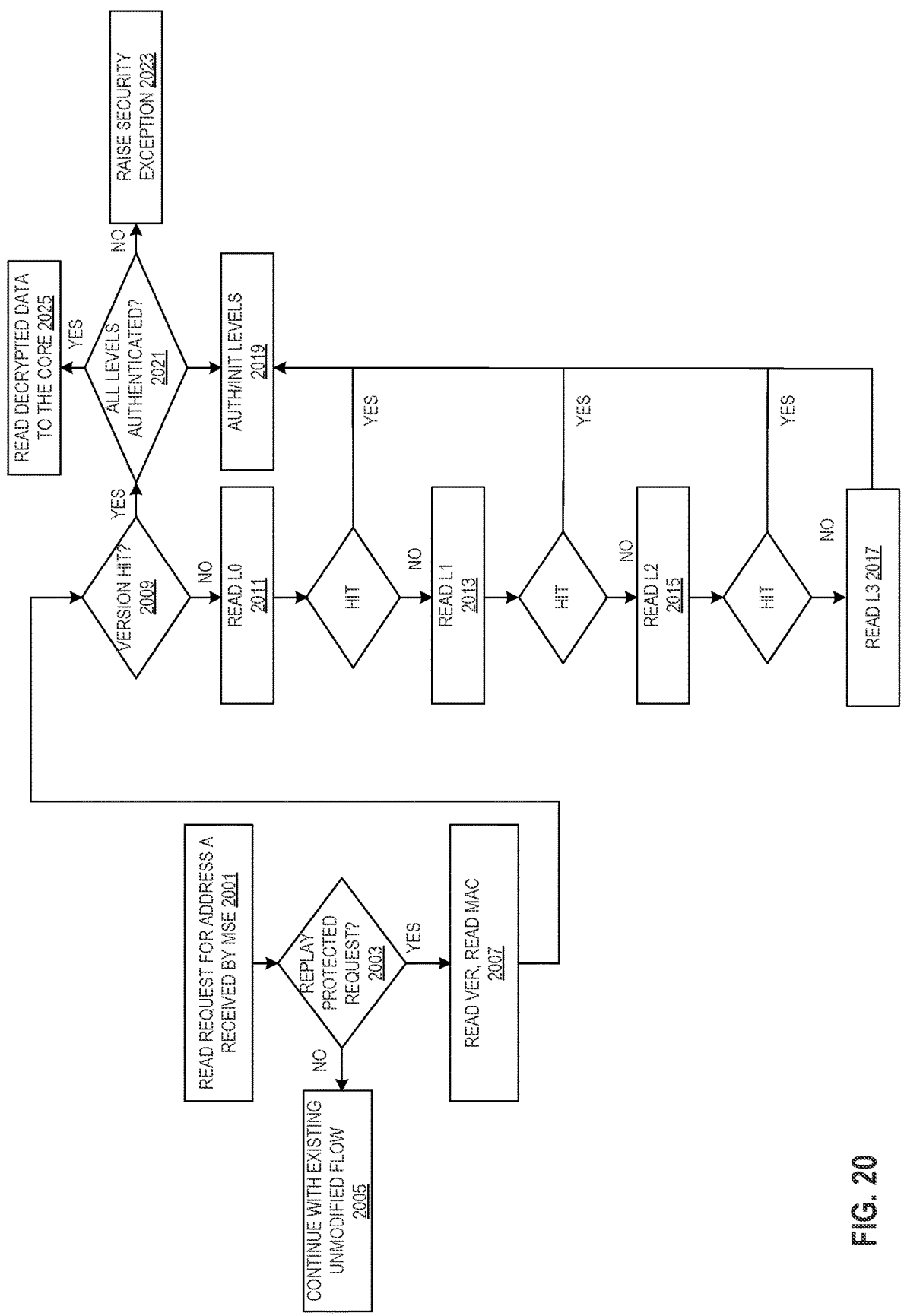
FIG. 20 illustrates embodiments of a read flow using SMIRAS replay protection.

FIG. 20 illustrates embodiments of a read flow using SMIRAS replay protection. A read request for address A is received by the MSE at 2001. A look up of the region vector is made to determine whether the address belongs to a SMIRAS replay protected region or not at 2003. When the region vector indicates that the incoming request does not belong to a replay protected region, the flow proceeds as normal as if SMIRAS replay protection did not exist at 2005.

When the incoming read request belongs to a replay protected region, the tree is walked after reading MAC and VER from the memory location A at 2007. A determination of if the version was hit is made at 2009. In other words, was the correct version received? If yes, then all levels of the tree can be authenticated at 2021. The tree walk continues until the first level in the tree is found in the cache with an access climbing to the top-level counter (L3, in the example shown in the figure) in the worst case. For example, when there is no version hit, then the L0 is read at 2011 and if there is a hit, then L0 is authenticated at 2019. When L0 has no hit, L1 is read at 2013, if no hit in L1, then L2 is read at 2015, if no hit in L2, then L3 is read at 2017. Note that more or fewer levels could be used.

All loaded levels (e.g., L0 up to L3) are authenticated (by verifying the embedded MAC) at 2019 and once the authentication is complete, if all levels pass authentication at 2021, the decrypted data is returned to the requester at 2025. If any of the levels fail authentication, signaling an integrity failure and a potential attack, a security exception is raised at 2023.

Figure 21:
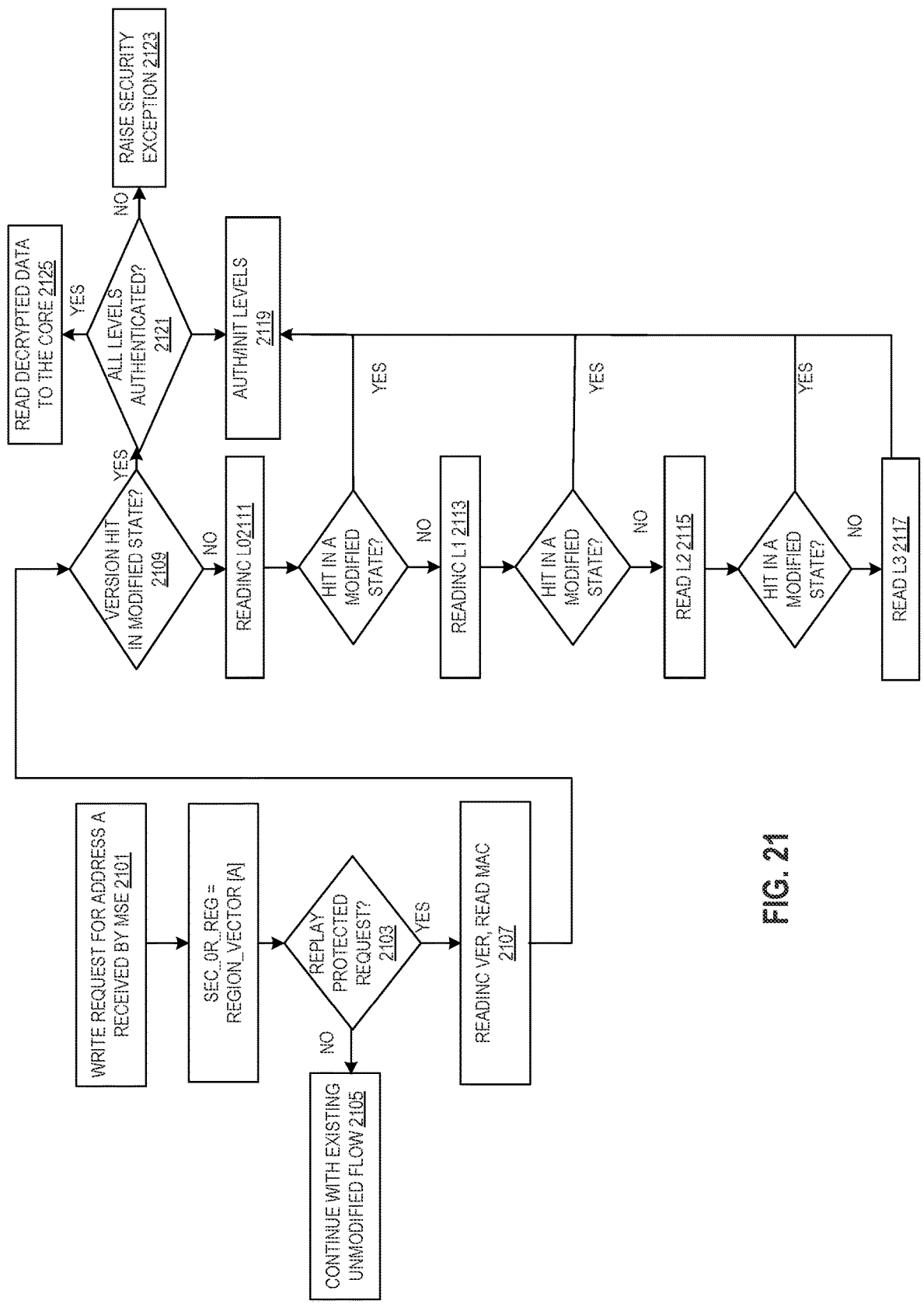
FIG. 21 illustrates embodiments of a write flow using SMIRAS replay protection.

Writes work similar to reads except that the tree walk is done in write flavor where the counters are fetched and incremented to reflect the new version of data line written to the memory. The tree walk stops when it hits the metadata cache with a metadata line in modified state. FIG. 21 illustrates embodiments of a write flow using SMIRAS replay protection. A write request for address A is received by the MSE at 2101. A look up of the region vector is made to determine whether the address belongs to a SMIRAS replay protected region or not at 2103. When the region vector indicates that the incoming request does not belong to a replay protected region, the flow proceeds as normal as if SMIRAS replay protection did not exist at 2105.

When the incoming read request belongs to a replay protected region, the tree is walked after reading MAC and incremented version at 2107. A determination of if an incremented version was hit in a modified state is made at

2109. The tree walk continues until the first level in the tree is found in the cache with an access climbing to the top-level counter (incremented L3, in the example shown in the figure) in the worst case. For example, when there is no version hit, then incremented L0 is read at 2111 and if there is a hit, then L0 is authenticated at 2119. When incremented L0 has no hit, incremented L1 is read at 2113, if no hit in incremented L1, then incremented L2 is read at 2115, if no hit in incremented L2, then incremented L3 is read at 2117.

All levels loaded (e.g., L0 up to L3) are authenticated (by verifying the embedded MAC) at 2119 and once the authentication is complete, if all levels pass authentication at 2121, the decrypted data is returned to the requester at 2125. If any of the levels fail authentication then a security exception is raised at 2123.

Figure 22:
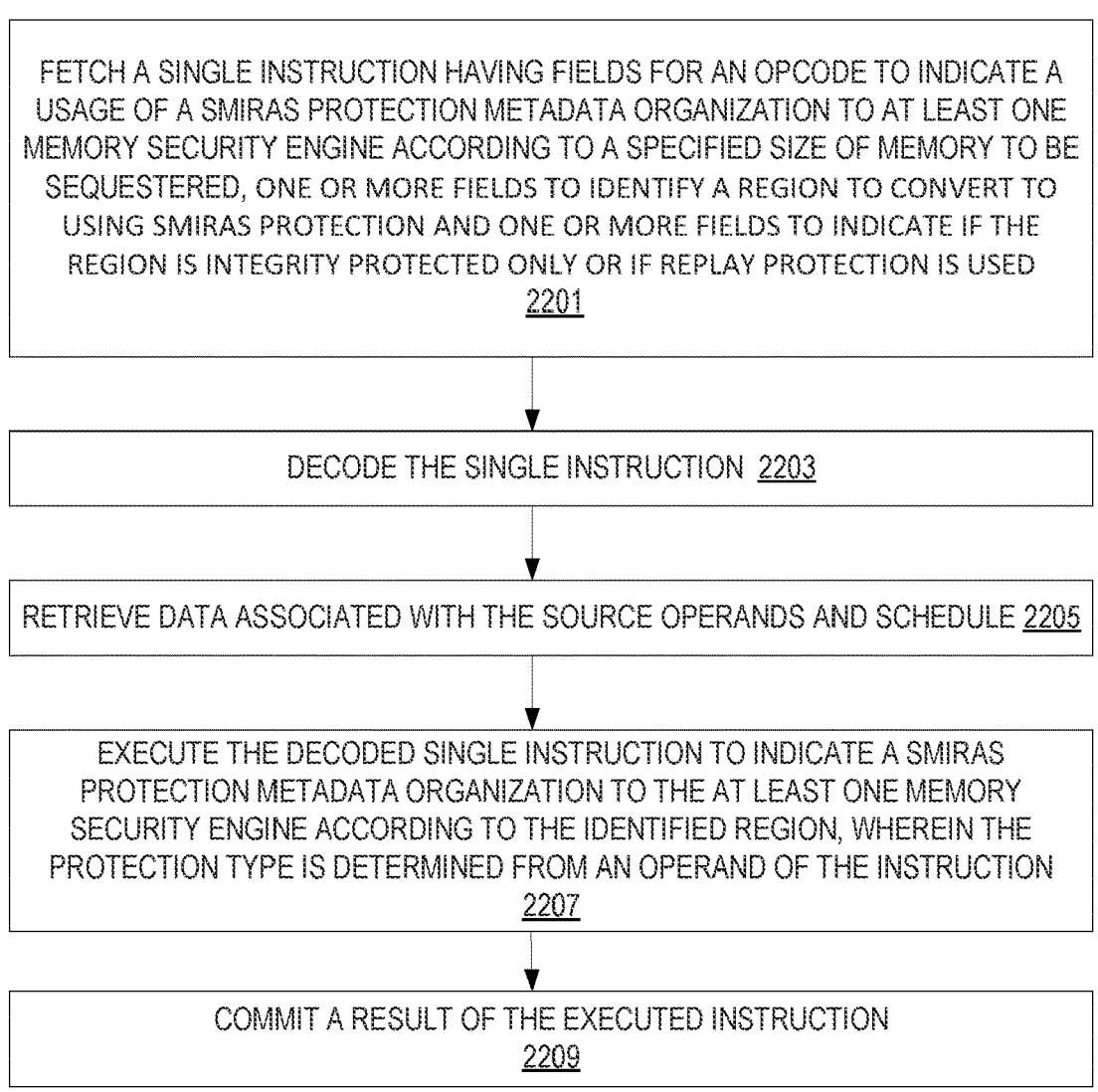
FIG. 22 is a flow diagram illustrating operations of a method for processing a SMIRAS configuration instruction (e.g., SMIRAS_SECURE or SMIRAS_SEC) instruction according to some embodiments.

In some embodiments, a single instruction is used for enabling integrity and/or replay protection. FIG. 22 is a flow diagram illustrating operations of a method for processing a SMIRAS configuration instruction (e.g., SMIRAS_SECURE or SMIRAS_SEC) instruction to configure a metadata organization region of memory as either integrity based or replay protection based according to some embodiments. In some embodiments, one or more (or all) of the operations are performed in a processor or SOC.

At 2201 a single SMIRAS_SEC instruction is fetched having fields for an opcode to indicate execution circuitry is to at least indicate to the at least one memory security engine to configure a metadata organization region of memory as either integrity based or replay protection based such as a usage of SMIRAS protection metadata organization to at least one memory security engine according to a specified size of memory to be sequestered, one or more fields to identify a region to convert to using SMIRAS protection and one or more fields to indicate if the region is integrity protected only or if replay protection is used. In some embodiments, the SMIRAS_SEC instruction includes one or more fields for an identifier of at least one operand location (e.g., register or memory) that is to store an indication of a selection of integrity based or replay protection based metadata organization, or an immediate that is to encode an indication of a selection of integrity based or replay protection based metadata organization, such as a region number to convert and/or the integrity/replay indication. As an example in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value.

In other embodiments, the SMIRAS_SEC instruction includes one or more fields for one or more operand locations (e.g., registers or memory) that is to store an address range for the SMIRAS protection region (e.g., a beginning address is stored in a first register and an ending address is stored in a second register) and/or the integrity/replay indication.

The single SMIRAS_SEC instruction is decoded at 2203. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 2205.

The decoded instruction is executed to indicate a SMIRAS protection metadata organization to the at least one memory security engine according to the identified region at 2207. This protection may be integrity alone or use replay protection as indicated by the operands and/or immediate. In some embodiments, the execution of the SMIRAS_SEC instruction causes all MSEs on a package to be alerted that a particular region of memory is being converted to SMIRAS protected memory. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS protection is enabled or not. When not enabled, an exception is thrown and execution stops. In some embodiments, enablement is in an MSR. In some embodiments, a bit of a region vector is set indicating the region that is being protected. In some embodiments, the top-level counters associated with the region of a replay protection tree are initialized when replay protection is indicated. In some embodiments, the execution of a SMIRAS_SEC instruction will also cause an initialization of the identified region using non-temporal writes (e.g., the execution of a plurality of MOVDIR64B instructions) to ensure metadata associated with each cacheline (e.g., ECC and MAC) is generated as per the SMIRAS layout.

A result of the executed instruction is committed at 2209 in some embodiments.

Figure 23:
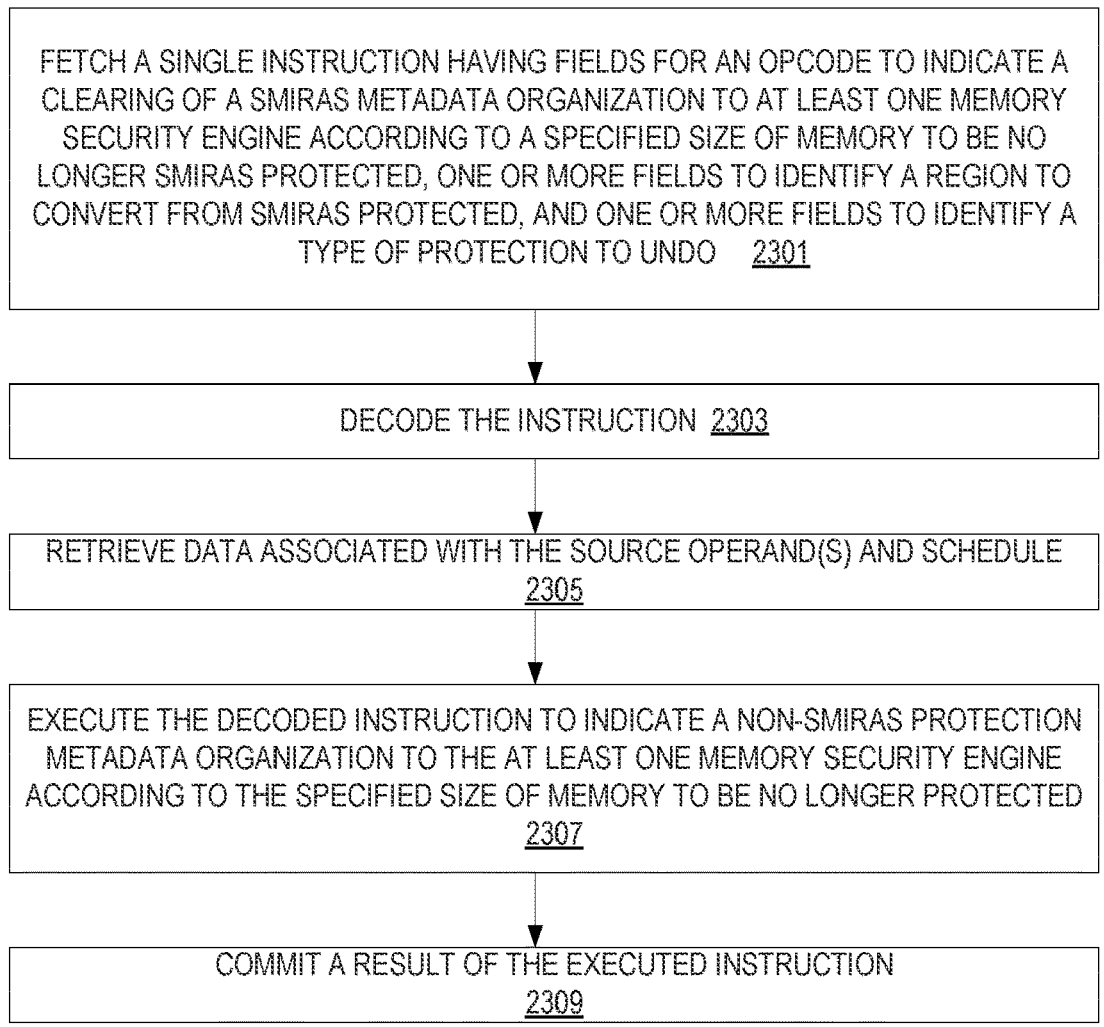
FIG. 23 is a flow diagram illustrating operations of a method for processing a SMIRAS clearing instruction (e.g., SMIRAS_REGULAR or SMIRAS_REG) instruction according to some embodiments.

In some embodiments, a single instruction is used for disabling integrity and/or replay protection. FIG. 23 is a flow diagram illustrating operations of a method for processing a SMIRAS clearing instruction (e.g., SMIRAS_REGULAR or SMIRAS_REG) instruction to disable a metadata organization region of memory that is either integrity based or replay protection based according to some embodiments. In some embodiments, one or more (or all) of the operations are performed in a processor or SOC.

At 2301 a single SMIRAS_REG instruction is fetched having fields for an opcode to indicate execution circuitry is to at least indicate to the at least one memory security engine to disable a metadata organization region of memory that is either integrity based or replay protection based such as clearing of a SMIRAS protection metadata organization to at least one memory security engine according to a specified size of memory to be no longer SMIRAS protected, one or more fields to identify a region to convert from SMIRAS protected, and one or more fields to identify a type of SMIRAS protection to remove (e.g., integrity and/or replay). In some embodiments, the SMIRAS_REG instruction includes one or more fields for an identifier of at least one operand location (e.g., register or memory) that is to store an indication of the region of memory, and/or an immediate that is to encode an indication of the region of memory, such as a region number to convert and/or the integrity/replay indication. As an example, in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value.

In other embodiments, the SMIRAS_REG instruction includes one or more fields for one or more operand locations (e.g., registers or memory) that is to store an address range for the SMIRAS protection region (e.g., a beginning address is stored in a first register and an ending address is stored in a second register) and/or the integrity/replay indication.

The single SMIRAS_REG instruction is decoded at 2303. For example, in some embodiments, one or more microoperations are generated by decoding the single instruction. In some embodiments, the decoding of the single instruction comprises translating the single instruction into one or more instructions of a different instruction set architecture and decoding those one or more instructions.

Data associated with the source operand(s) is/are retrieved and the operation(s) of the decoded instruction is/are scheduled at 2305.

The decoded instruction is executed to indicate the removal of a SMIRAS protection metadata organization to the at least one memory security engine according to the identified region at 2307. In some embodiments, the execution of the SMIRAS_REG instruction causes all MSEs on a package to be alerted that a particular region of memory is being converted from SMIRAS protected memory. In some embodiments, the execution of the decoded instruction includes determining which granularity to use (for example, static where all memory utilizes sequestered techniques, 1 GB, 8 GB, etc.) and confirming that the identified region works with the granularity. For example, if the region number provided is greater than the number of regions for a particular granularity, then an exception is thrown and execution stops. In some embodiments, this granularity is indicated in one or more model specific registers (MSRs). In some embodiments, a check is made to determine if SMIRAS is enabled or not. When not enabled, an exception is thrown and execution stops. In some embodiments, enablement is in an MSR. In some embodiments, a bit of a region vector is unset indicating the region that is no longer being protected. In some embodiments, the top-level counters associated with the region of a replay protection tree are cleared. In some embodiments, the execution of a SMIRAS_REG instruction will also cause an initialization of the identified region using non-temporal writes (e.g., the execution of a plurality of MOVDIR64B instructions) to ensure metadata associated with each cacheline (e.g., ECC and MAC) is generated as per the SMIRAS layout.

A result of the executed instruction is committed at 2309 in some embodiments.

FIG. 24 illustrates embodiments of formats for variants of the above instructions. In the illustrated table, the opcode mnemonics 2401 are shown in the first column, a first source 2405 is shown in the second column, a second source 2407 is shown in the third column, and a third source 2407 is shown in the last column. Note that the sources could be one of a memory location storing a value, a register storing a value, or an immediate encoding a value.

Figure 25:
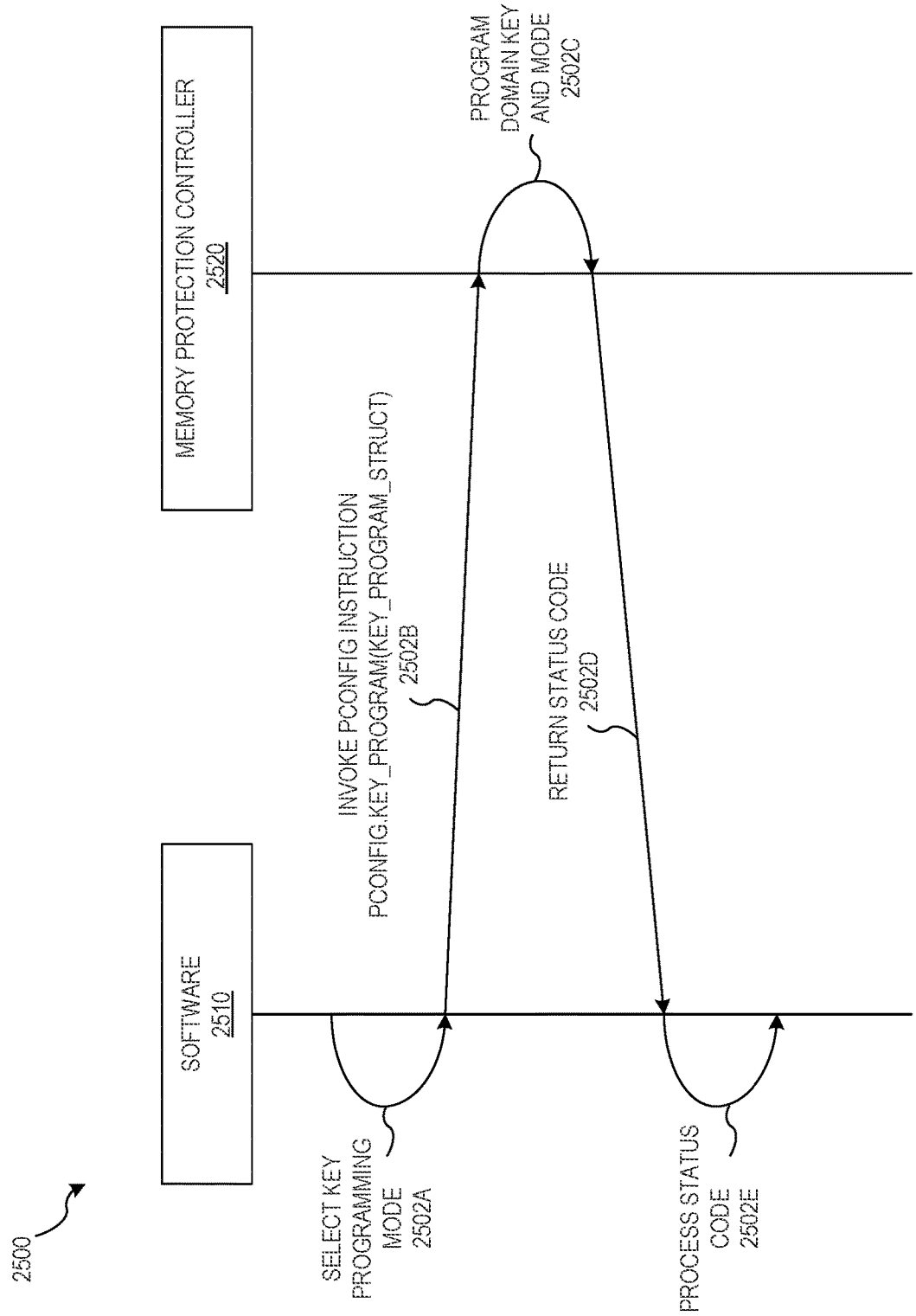
FIG. 25 illustrates an example call flow associated with a PCONFIG instruction to be used to allow programming of the above instructions.

FIG. 25 illustrates an example call flow associated with a PCONFIG instruction to be used to allow programming of the above instructions. The illustrated example identifies the call flow between software 2510 performing domain configuration using the PCONFIG instruction and a memory security engine 405. Memory security engine 405 may include any engine, controller, or other component that provides cryptographic memory protection. Software 2510 may include any software used to configure the domains protected by memory security engine 405, such as a virtual machine manager and/or other management software. The illustrated call flow begins by software 2510 selecting a key programming mode for programming an encryption key for a particular domain (call 2502a). For example, as discussed further below, software 2510 may directly specify a key for the domain, or may request that a random key be generated. Software 2510 may then invoke the PCONFIG processor instruction to perform the domain configuration (call 2502b). When the PCONFIG instruction is invoked, memory security engine 405 programs the key and protection mode for the particular domain (call 2502c). Memory security engine 405 then returns a status code to software 2510 (call 2502d), and the status code is then processed by software 2510 (call 2502e).

In some embodiments, the PCONFIG instruction may support various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

The table below illustrates an example of PCONFIG leaf encodings that could be used to enable support for multiple leaf functions. Although only one leaf function is shown (the KEY_PROGRAM leaf), additional leaf functions can be defined using the reserved leaf encodings in order to extend the functionality of the PCONFIG instruction such as supporting the above instructions.

| PCONFIG Leaf Function Encodings | | |
|---|---|---|
| LEAF | ENCODING | DESCRIPTION |
| KEY_PROGRAM | 0x00000000 | This leaf function is used to program the key associated with a domain. |
| OTHER | 0x00000001 - 0xFFFFFFFF | Additional leaf functions can be defined using these reserved leaf encodings for future extensions to the functionality of the PCONFIG instruction. |

The key program leaf function (KEY_PROGRAM) of the PCONFIG instruction can be used to program a key for a protected domain. In some embodiments, the parameters used by the key program leaf function may be specified in a key program structure (KEY_PROGRAM_STRUCT), and the address of the key program structure may be specified in a hardware register (e.g., the RBX register). The table below illustrates an example embodiment of the key program structure (KEY_PROGRAM_STRUCT).

| Key Program Structure (KEY_PROGRAM_STRUCT) | | |
|---|---|---|
| FIELD | SIZE (bytes) | DESCRIPTION |
| KEYID | 1 | This field identifies the KeyID of a domain that is being programmed. |
| KEYID_CMD | 1 | This field identifies a key programming command. |
| KEYID_ENC_ALG | 2 | This field may be used to select an encryption algorithm to use for the domain (based on the available encryption algorithms). |
| KEYID_KEY | 16 | This field may identify an encryption key for the domain. |
| KEYID_TWEAK_KEY | 16 | This field may identify a tweak key value. |

As shown in the table above, the key program structure identifies the KeyID of the particular domain being programmed, and it also specifies a key programming command. In some embodiments, for example, the key program leaf function may support multiple key programming commands, and the desired command may be specified in the key program structure. Moreover, in some embodiments, the key program structure may also include reserved field(s) that can be used for subsequent extensions to the key program leaf function.

The table below illustrates examples of key programming commands that may be supported by the key program leaf function.

| Key Programming Commands | | |
|---|---|---|
| KEY DOMAIN (KD) COMMAND | ENCODING | DESCRIPTION |
| Set Key Direct (KD_SET_KEY_DIRECT) | 0 | This command sets the key for a domain directly using the key specified in the key program structure (KEY_PROGRAM_STRUCT). The key is provided by the software that initiates this key programming command. The domain is then protected in custom encryption mode. |
| Set Key Random (KD_SET_KEY_RANDOM) | 1 | This command sets the key for a domain using a randomly generated key. For example, a key may be randomly generated by a processor and/or a random number generator, and thus may not be known by (or shared with) the software that initiates the key programming command. The domain is then protected in custom encryption mode. |
| Clear Key (KD_CLEAR_KEY) | 2 | This command clears the key that was previously set for a domain. The domain is then protected in default encryption mode. |
| No Key (KD_NO_KEY) | 3 | This command disables memory encryption for a domain. The domain is then protected in plaintext mode. |

After the key program leaf function is executed, a return value or status code may be specified in a hardware register to indicate whether the key program function was successful. The table below illustrates examples of the status codes that may be returned by the key program leaf function.

| Status codes returned by key program leaf function (KEY_PROGRAM) | | |
|---|---|---|
| STATUS CODE | ENCODING | DESCRIPTION |
| PROG_SUCCESS | 0 | The domain is programmed successfully. |
| INVALID_PROG_CMD | 1 | The key programming command is invalid. |
| ENTROPY_ERROR | 2 | The entropy of a randomly generated key is insufficient. |
| INVALID_KEYID | 3 | The domain KeyID is invalid. |
| INVALID_ENC_ALG | 4 | An invalid encryption algorithm is selected. |
| DEVICE_BUSY | 5 | A lock for the domain key table cannot be obtained. |

While the illustrated embodiment uses the PCONFIG processor instruction to perform domain configuration, other embodiments may use alternative and/or additional approaches for domain configuration. For example, in some embodiments, domain configuration may be performed using hardware registers. For example, a PCONFIG model-specific register (MSR) may be implemented for performing domain configuration, allowing software to invoke the PCONFIG operation by writing to the PCONFIG MSR (e.g., executing a WRMSR instruction with the index for the PCONFIG MSR passed in a register, such as the ECX register). Moreover, certain parameters for the PCONFIG operation (and its associated leaf functions and commands) may be passed in hardware registers. For example, the address of the key program structure (KEY_PROGRAM_STRUCT) can be passed in a hardware register, such as the EDX register, EAX register, or both of those registers (e.g., for 64-bit memory addresses). The PCONFIG operation can then be performed in a similar manner as described above.

Moreover, in some embodiments, a PCONFIG operation may utilize wrapped blobs for domain key programming. In this manner, domain keys can be programmed without revealing the keys to management software. In some embodiments, for example, additional PCONFIG leaf functions may be implemented to enable keys to be wrapped and then subsequently programmed to memory security engine 405 after being unwrapped.

Example pseudocode for implementing the PCONFIG instruction is provided below:

```
// #UD (undefined opcode exception) if PCONFIG is not enumerated or in VM86, or CPL>0
if (CPUID.7.0:ECX[PCONFIG] == 0 OR RFLAGS.VM == 1 OR CPL > 0) #UD;
if (in VMX non-root mode)
{
  if (VMCS.PCONFIG)
  {
  if ((EAX > 62 AND VMCS.PCONFIG_EXITING[63] ==1) OR
      (EAX < 63 AND VMCS.PCONFIG_EXITING[EAX] == 1))
  {
  Set VMCS.EXIT_REASON = PCONFIG; //No Exit qualification
  Deliver VMEXIT;
  }
    }
  else
  {
  #UD
  }
}
// #GP(0) (general protection fault) for an unsupported leaf
if(EAX != 0) #GP(0)
// KEY_PROGRAM leaf flow
if (EAX == 0)
{
//#GP(0) if ME_ACTIVATE_MSR is not locked or does not enable memory encryption (ME) or
multiple keys are not enabled
if
(ME_ACTIVATE_MSR.LOCK != 1 OR ME_ACTIVATE_MSR.ENABLE != 1 OR
ME_ACTIVATE_MSR.ME_KEYID_BITS == 0) #GP(0)
   // Check KEY_PROGRAM_STRUCT is 256B aligned
   if(DS:RBX is not 256B aligned) #GP(0);
   // Check that KEY_PROGRAM_STRUCT is read accessible
   <<DS: RBX should be read accessible>>
   // Copy KEY_PROGRAM_STRUCT to a temporary variable
   TMP_KEY_PROGRAM_STRUCT = DS:RBX.*;
   // RSVD field check
   if(TMP_KEY_PROGRAM_STRUCT.RSVD != 0) #GP(0);
   if(TMP_KEY_PROGRAM_STRUCT.USUPP_KEYID_KEY.BYTES[63:16] != 0) #GP(0);
    if(TMP_KEY_PROGRAM_STRUCT.USUPP_KEYID_TWEAK_KEY.BYTES[63:16] != 0)
#GP(0);
// Check for a valid command
if(TMP_KEY_PROGRAM_STRUCT. KEYID_CMD.COMMAND is not a valid command)
{
    RFLAGS.ZF = 1;
    RAX = INVALID_PROG_CMD;
      goto EXIT;
}
// Check that the KEYID being operated upon is a valid KEYID
if(TMP_KEY_PROGRAM_STRUCT.KEYID>
2^ME_ACTIVATE_MSR.ME_KEYID_BITS - 1
OR TMP_KEY_PROGRAM_STRUCT.KEYID >
ME_CAPABILITY_MSR.ME_MAX_KEYS
OR TMP_KEY_PROGRAM_STRUCT.KEYID == 0)
{
RFLAGS.ZF = 1;
    RAX = INVALID_KEYID;
      goto EXIT;
}
// Check that only one algorithm is requested for the KEYID domain and it is one of the activated
algorithms
if(NUM_BITS(TMP_KEY_PROGRAM_STRUCT.KEYID_CMD.ENC_ALG) != 1 ||
(TMP_KEY_PROGRAM_STRUCT.KEYID_CMD.ENC_ALG &
ME_ACTIVATE_MSR.ME_ALG_ENABLE ==0))
```

```
{
RFLAGS.ZF = 1;
      RAX = INVALID_ENC_ALG;
      goto EXIT;
}
// Try to acquire exclusive lock
if (NOT KEY_TABLE_LOCK.ACQUIRE(WRITE))
{
   // PCONFIG failure
   RFLAGS.ZF = 1;
   RAX = DEVICE_BUSY;
   goto EXIT;
}
// Lock is acquired
switch(TMP_KEY_PROGRAM_STRUCT.KEYID_CMD.COMMAND)
{
case KD_SET_KEY_DIRECT:
      <<Write
KEY=TMP_KEY_PROGRAM_STRUCT.USUPP_KEYID_KEY,
TWEAK_KEY=TMP_KEY_PROGRAM_STRUCT.USUPP_KEYID_TWEAK_KEY,
KEY_CONTROL=2'b01,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
      break;
case KD_SET_KEY_RANDOM:
TMP_RND_KEY = <<Generate a random key using RDSEED>>
      if (NOT ENOUGH ENTROPY)
      {
RFLAGS.ZF = 1;
      RAX = ENTROPY_ERROR;
      goto EXIT;
}
TMP_RND_TWEAK_KEY = <<Generate a random key using RDSEED>>
      if (NOT ENOUGH ENTROPY)
      {
RFLAGS.ZF = 1;
      RAX = ENTROPY_ERROR;
      goto EXIT;
}
// Mix user supplied entropy to the data key and tweak key
TMP_RND_KEY = TMP_RND_KEY XOR
TMP_KEY_PROGRAM_STRUCT.USUPP_KEYID_KEY.BYTES[15:0];
TMP_RND_TWEAK_KEY = TMP_RND_TWEAK_KEY XOR
TMP_KEY_PROGRAM_STRUCT.USUPP_KEYID_TWEAK_KEY.BYTES[15:0];
<<Write
KEY=TMP_RND_KEY,
TWEAK_KEY=TMP_RND_TWEAK_KEY,
KEY_CONTROL=2'b01,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
   break;
case KD_CLEAR_KEY:
      <<Write
KEY='0,
      TWEAK_KEY='0,
KEY_CONTROL = 2'b00,
to ME_KEY_TABLE at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
   break;
case KD_NO_KEY:
    <<Write
KEY_CONTROL=2'b11,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
   break;
}
RAX = 0;
RFLAGS.ZF = 0;
// Release Lock
KEY_TABLE_LOCK(RELEASE);
EXIT:
```

```
RFLAGS.CF=0;
RFLAGS.PF=0;
RFLAGS.AF=0;
RFLAGS.OF=0;
RFLAGS.SF=0;
}
```

SMIRAS may be utilized in many different architectures and systems. Detailed below are examples of exemplary architectures, systems, processors, etc.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 26:
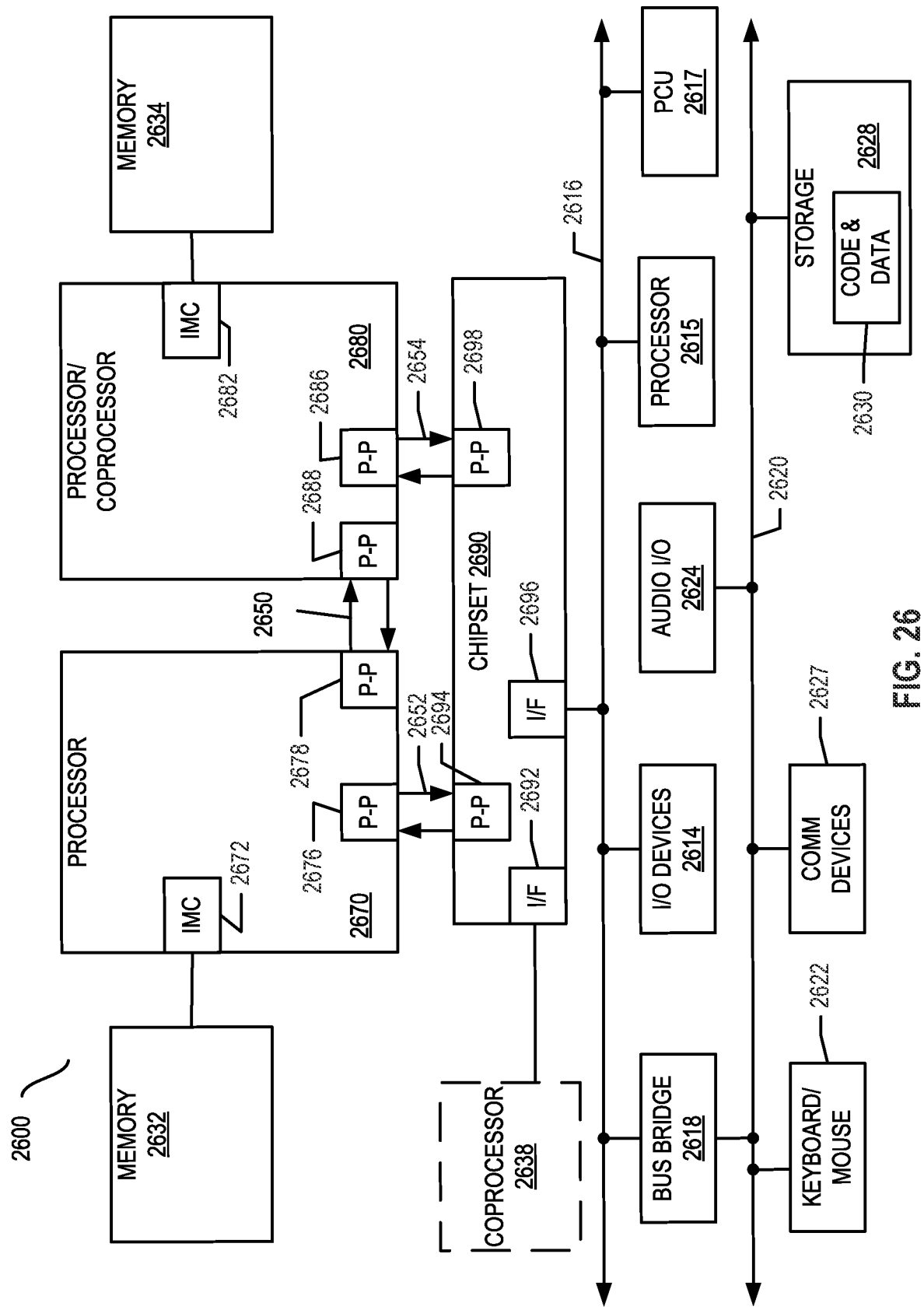
FIG. 26 illustrates embodiments of an exemplary system.

FIG. 26 illustrates embodiments of an exemplary system. Multiprocessor system 2600 is a point-to-point interconnect system and includes a plurality of processors including a first processor 2670 and a second processor 2680 coupled via a point-to-point interconnect 2650. In some embodiments, the first processor 2670 and the second processor 2680 are homogeneous. In some embodiments, first processor 2670 and the second processor 2680 are heterogenous.

Processors 2670 and 2680 are shown including integrated memory controller (IMC) units circuitry 2672 and 2682, respectively. Processor 2670 also includes as part of its interconnect controller units point-to-point (P-P) interfaces 2676 and 2678; similarly, second processor 2680 includes P-P interfaces 2686 and 2688. Processors 2670, 2680 may exchange information via the point-to-point (P-P) interconnect 2650 using P-P interface circuits 2678, 2688. IMCs 2672 and 2682 couple the processors 2670, 2680 to respective memories, namely a memory 2632 and a memory 2634, which may be portions of main memory locally attached to the respective processors.

Processors 2670, 2680 may each exchange information with a chipset 2690 via individual P-P interconnects 2652, 2654 using point to point interface circuits 2676, 2694, 2686, 2698. Chipset 2690 may optionally exchange information with a coprocessor 2638 via a high-performance interface 2692. In some embodiments, the coprocessor 2638 is a special-purpose processor, such as, for example, a high-throughput MIC processor, a network or communication processor, compression engine, graphics processor, GPGPU, embedded processor, or the like.

A shared cache (not shown) may be included in either processor 2670, 2680 or outside of both processors, yet connected with the processors via P-P interconnect, such that either or both processors' local cache information may be stored in the shared cache if a processor is placed into a low power mode.

Chipset 2690 may be coupled to a first interconnect 2616 via an interface 2696. In some embodiments, first interconnect 2616 may be a Peripheral Component Interconnect (PCI) interconnect, or an interconnect such as a PCI Express interconnect or another I/O interconnect. In some embodiments, one of the interconnects couples to a power control unit (PCU) 2617, which may include circuitry, software, and/or firmware to perform power management operations with regard to the processors 2670, 2680 and/or co-processor 2638. PCU 2617 provides control information to a voltage regulator to cause the voltage regulator to generate the appropriate regulated voltage. PCU 2617 also provides control information to control the operating voltage generated. In various embodiments, PCU 2617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2617 is illustrated as being present as logic separate from the processor 2670 and/or processor 2680. In other cases, PCU 2617 may execute on a given one or more of cores (not shown) of processor 2670 or 2680. In some cases, PCU 2617 may be implemented as a microcontroller (dedicated or general-purpose) or other control logic configured to execute its own dedicated power management code, sometimes referred to as P-code. In yet other embodiments, power management operations to be performed by PCU 2617 may be implemented externally to a processor, such as by way of a separate power management integrated circuit (PMIC) or another component external to the processor. In yet other embodiments, power management operations to be performed by PCU 2617 may be implemented within BIOS or other system software.

Various I/O devices 2614 may be coupled to first interconnect 2616, along with an interconnect (bus) bridge 2618 which couples first interconnect 2616 to a second interconnect 2620. In some embodiments, one or more additional processor(s) 2615, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 2616. In some embodiments, second interconnect 2620 may be a low pin count (LPC) interconnect. Various devices may be coupled to second interconnect 2620 including, for example, a keyboard and/or mouse 2622, communication devices 2627 and a storage unit circuitry 2628. Storage unit circuitry 2628 may be a disk drive or other mass storage device which may include instructions/code and data 2630, in some embodiments. Further, an audio I/O 2624 may be coupled to second interconnect 2620. Note that other architectures than the point-to-point architecture described above are possible. For example, instead of the point-to-point architecture, a system such as multiprocessor system 2600 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 27:
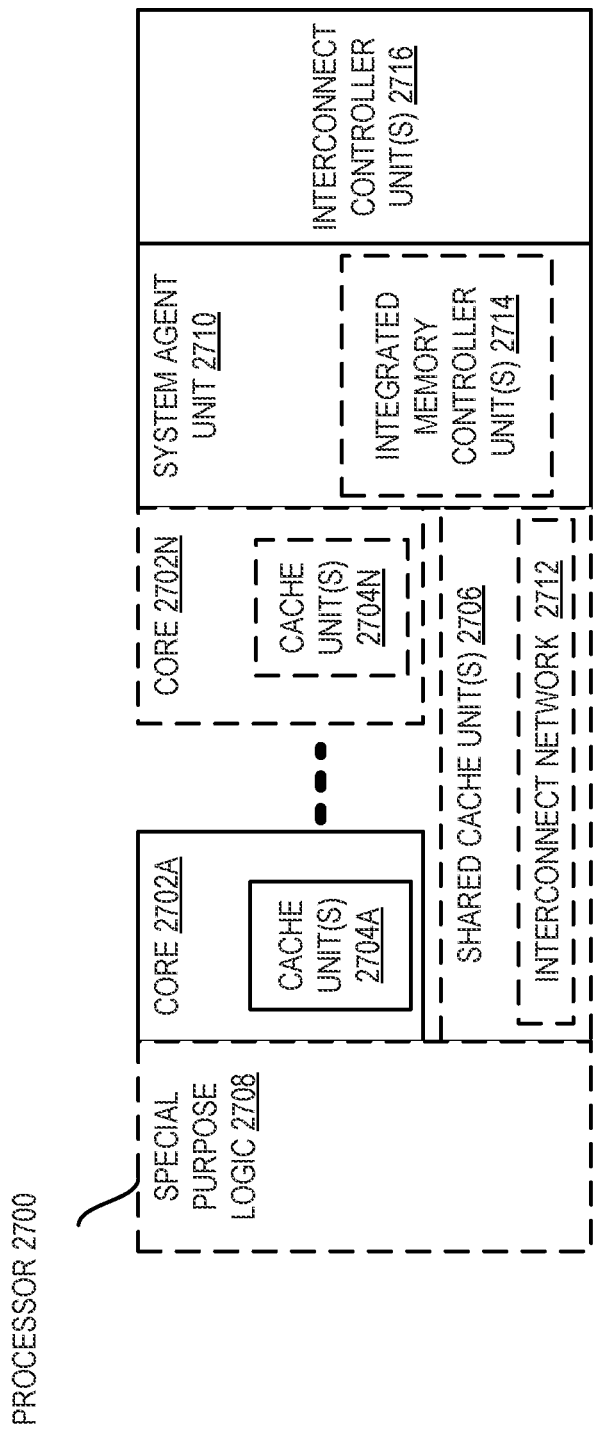
FIG. 27 illustrates a block diagram of embodiments of a processor.

FIG. 27 illustrates a block diagram of embodiments of a processor 2700 that may have more than one core, may have an integrated memory controller, and may have integrated graphics. The solid lined boxes illustrate a processor 2700 with a single core 2702A, a system agent 2710, a set of one or more interconnect controller units circuitry 2716, while the optional addition of the dashed lined boxes illustrates an alternative processor 2700 with multiple cores 2702(A)-(N), a set of one or more integrated memory controller unit(s) circuitry 2714 in the system agent unit circuitry 2710, and special purpose logic 2708, as well as a set of one or more interconnect controller units circuitry 2716. Note that the processor 2700 may be one of the processors 2670 or 2680, or co-processor 2638 or 2615 of FIG. 26.

Thus, different implementations of the processor 2700 may include: 1) a CPU with the special purpose logic 2708 being integrated graphics and/or scientific (throughput) logic (which may include one or more cores, not shown), and the cores 2702(A)-(N) being one or more general purpose cores (e.g., general purpose in-order cores, general purpose out-of-order cores, or a combination of the two); 2) a coprocessor with the cores 2702(A)-(N) being a large number of special purpose cores intended primarily for graphics and/or scientific (throughput); and 3) a coprocessor with the cores 2702(A)-(N) being a large number of general purpose in-order cores. Thus, the processor 2700 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 2700 may be a part of and/or may be implemented on one or more substrates using any of a number of process technologies, such as, for example, BiCMOS, CMOS, or NMOS.

A memory hierarchy includes one or more levels of cache unit(s) circuitry 2704(A)-(N) within the cores 2702(A)-(N), a set of one or more shared cache units circuitry 2706, and external memory (not shown) coupled to the set of integrated memory controller units circuitry 2714. The set of one or more shared cache units circuitry 2706 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 2712 interconnects the special purpose logic 2708 (e.g., integrated graphics logic), the set of shared cache units circuitry 2706, and the system agent unit circuitry 2710, alternative embodiments use any number of well-known techniques for interconnecting such units. In some embodiments, coherency is maintained between one or more of the shared cache units circuitry 2706 and cores 2702(A)-(N).

In some embodiments, one or more of the cores 2702(A)-(N) are capable of multi-threading. The system agent unit circuitry 2710 includes those components coordinating and operating cores 2702(A)-(N). The system agent unit circuitry 2710 may include, for example, power control unit (PCU) circuitry and/or display unit circuitry (not shown). The PCU may be or may include logic and components needed for regulating the power state of the cores 2702(A)-(N) and/or the special purpose logic 2708 (e.g., integrated graphics logic). The display unit circuitry is for driving one or more externally connected displays.

The cores 2702(A)-(N) may be homogenous or heterogeneous in terms of architecture instruction set; that is, two or more of the cores 2702(A)-(N) may be capable of executing the same instruction set, while other cores may be capable of executing only a subset of that instruction set or a different instruction set.

Exemplary Core Architectures

In-Order and Out-of-Order Core Block Diagram

Figure 28A:
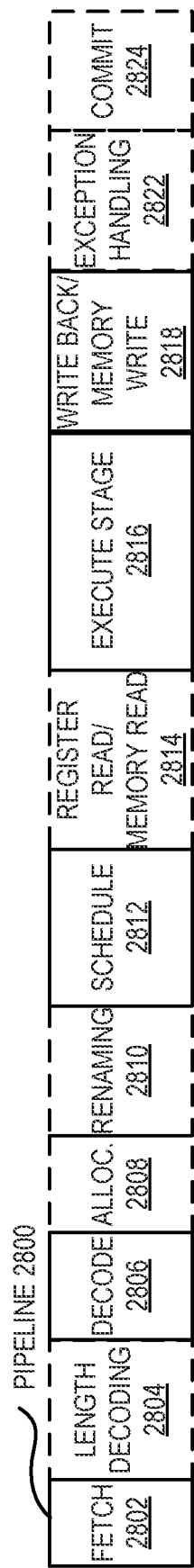
FIG. 28(A) is a block diagram illustrating both an exemplary in-order pipeline and an exemplary register renaming, out-of-order issue/execution pipeline according to embodiments of the invention.
Figure 28B:
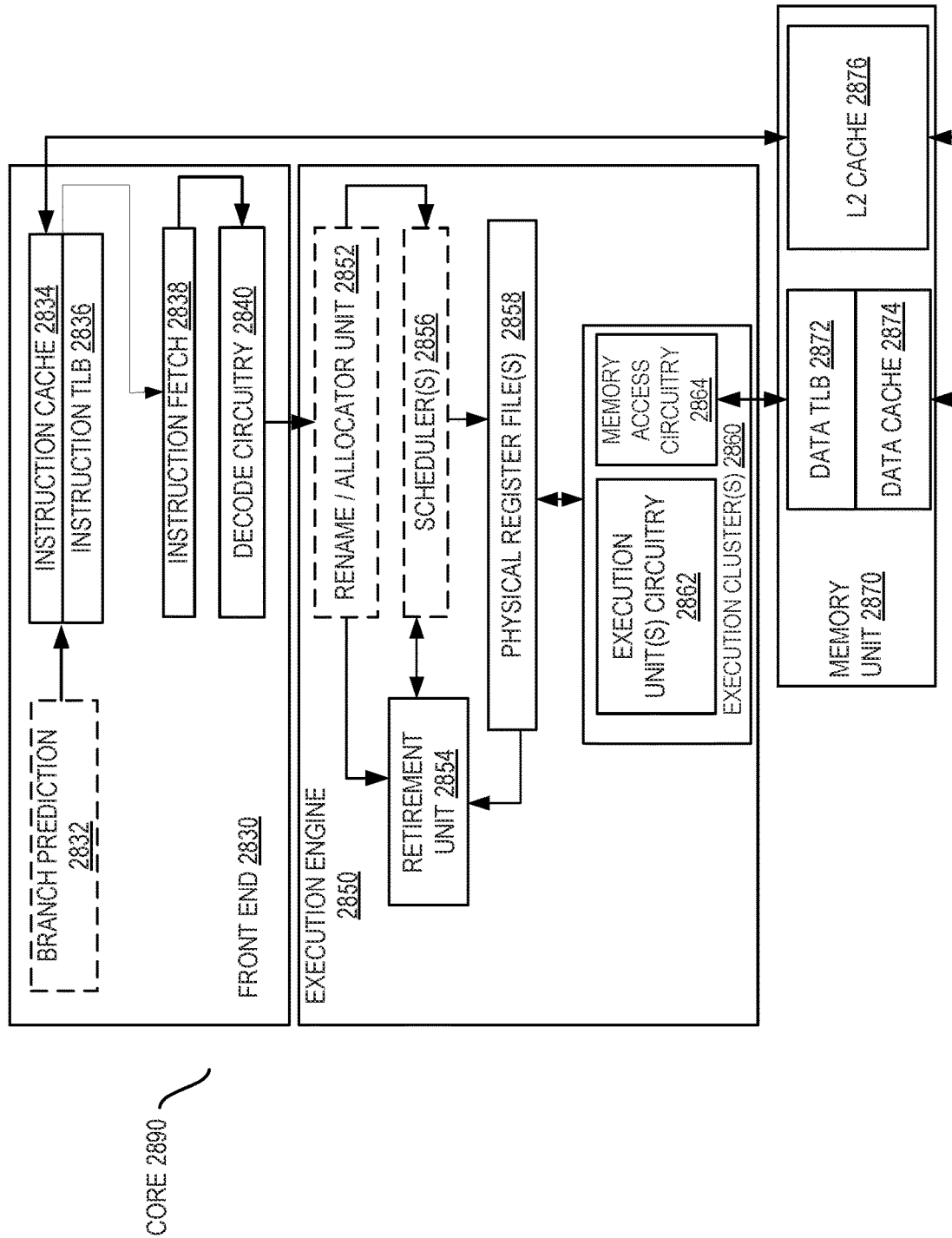
FIG. 28(B) is a block diagram illustrating both an exemplary embodiment of an in-order architecture core and an exemplary register renaming, out-of-order issue/execution architecture core to be included in a processor according to embodiments of the invention.

FIG. 28(A) is a block diagram illustrating both an exemplary in-order pipeline and an exemplary register renaming, out-of-order issue/execution pipeline according to embodiments of the invention. FIG. 28(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 28(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 28(A), a processor pipeline 2800 includes a fetch stage 2802, an optional length decode stage 2804, a decode stage 2806, an optional allocation stage 2808, an optional renaming stage 2810, a scheduling (also known as a dispatch or issue) stage 2812, an optional register read/memory read stage 2814, an execute stage 2816, a write back/memory write stage 2818, an optional exception handling stage 2822, and an optional commit stage 2824. One or more operations can be performed in each of these processor pipeline stages. For example, during the fetch stage 2802, one or more instructions are fetched from instruction memory, during the decode stage 2806, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 2806 and the register read/memory read stage 2814 may be combined into one pipeline stage. In one embodiment, during the execute stage 2816, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit (or decoder) circuitry 2840 performs the decode stage 2806; 3) the rename/allocator unit circuitry 2852 performs the allocation stage 2808 and renaming stage 2810; 4) the scheduler unit(s) circuitry 2856 performs the schedule stage 2812; 5) the physical register file(s) unit(s) circuitry 2858 and the memory unit circuitry 2870 perform the register read/memory read stage 2814; the execution cluster 2860 perform the execute stage 2816; 6) the memory unit circuitry 2870 and the physical register file(s) unit(s) circuitry 2858 perform the write back/memory write stage 2818; 7) various units (unit circuitry) may be involved in the exception handling stage 2822; and 8) the retirement unit circuitry 2854 and the physical register file(s) unit(s) circuitry 2858 perform the commit stage 2824.

FIG. 28(B) shows processor core 2890 including front-end unit circuitry 2830 coupled to an execution engine unit circuitry 2850, and both are coupled to a memory unit circuitry 2870. The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like.

The front end unit circuitry 2830 may include branch prediction unit circuitry 2832 coupled to an instruction cache unit circuitry 2834, which is coupled to an instruction translation lookaside buffer (TLB) 2836, which is coupled to instruction fetch unit circuitry 2838, which is coupled to decode unit circuitry 2840. In one embodiment, the instruction cache unit circuitry 2834 is included in the memory unit circuitry 2870 rather than the front-end unit circuitry 2830. The decode unit circuitry 2840 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 2840 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM (not shown) or other medium that stores microcode for certain macroinstructions (e.g., in decode unit circuitry 2840 or otherwise within the front end unit circuitry 2830). In one embodiment, the decode unit circuitry 2840 includes a micro-operation (micro-op) or operation cache (not shown) to hold/cache decoded operations, micro-tags, or micro-operations generated during the decode or other stages of the processor pipeline 2800. The decode unit circuitry 2840 may be coupled to rename/allocator unit circuitry 2852 in the execution engine unit circuitry 2850.

The execution engine circuitry 2850 includes the rename/allocator unit circuitry 2852 coupled to a retirement unit circuitry 2854 and a set of one or more scheduler(s) circuitry 2856. The scheduler(s) circuitry 2856 represents any number of different schedulers, including reservations stations, central instruction window, etc. In some embodiments, the scheduler(s) circuitry 2856 can include arithmetic logic unit (ALU) scheduler/scheduling circuitry, ALU queues, arithmetic generation unit (AGU) scheduler/scheduling circuitry, AGU queues, etc. The scheduler(s) circuitry 2856 is coupled to the physical register file(s) circuitry 2858. Each of the physical register file(s) circuitry 2858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 2858 includes vector registers unit circuitry, writemask registers unit circuitry, and scalar register unit circuitry. These register units may provide architectural vector registers, vector mask registers, general-purpose registers, etc. The physical register file(s) unit(s) circuitry 2858 is overlapped by the retirement unit circuitry 2854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2854 and the physical register file(s) circuitry 2858 are coupled to the execution cluster(s) 2860. The execution cluster(s) 2860 includes a set of one or more execution units circuitry 2862 and a set of one or more memory access circuitry 2864. The execution units circuitry 2862 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit (or execution) circuitry dedicated to specific functions or sets of functions, other embodiments may include only one execution unit circuitry or multiple execution units/execution unit circuitry that all perform all functions. The scheduler(s) circuitry 2856, physical register file(s) unit(s) circuitry 2858, and execution cluster(s) 2860 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 2864). It should also be understood that where separate pipelines are used, one or more of these pipelines may be out-of-order issue/execution and the rest in-order.

In some embodiments, the execution engine unit circuitry 2850 may perform load store unit (LSU) address/data pipelining to an Advanced Microcontroller Bus (AHB) interface (not shown), and address phase and writeback, data phase load, store, and branches.

The set of memory access circuitry 2864 is coupled to the memory unit circuitry 2870, which includes data TLB unit circuitry 2872 coupled to a data cache circuitry 2874 coupled to a level 2 (L2) cache circuitry 2876. In one exemplary embodiment, the memory access units circuitry 2864 may include a load unit circuitry, a store address unit circuit, and a store data unit circuitry, each of which is coupled to the data TLB circuitry 2872 in the memory unit circuitry 2870. The instruction cache circuitry 2834 is further coupled to a level 2 (L2) cache unit circuitry 2876 in the memory unit circuitry 2870. In one embodiment, the instruction cache 2834 and the data cache 2874 are combined into a single instruction and data cache (not shown) in L2 cache unit circuitry 2876, a level 3 (L3) cache unit circuitry (not shown), and/or main memory. The L2 cache unit circuitry 2876 is coupled to one or more other levels of cache and eventually to a main memory.

Figure 29:
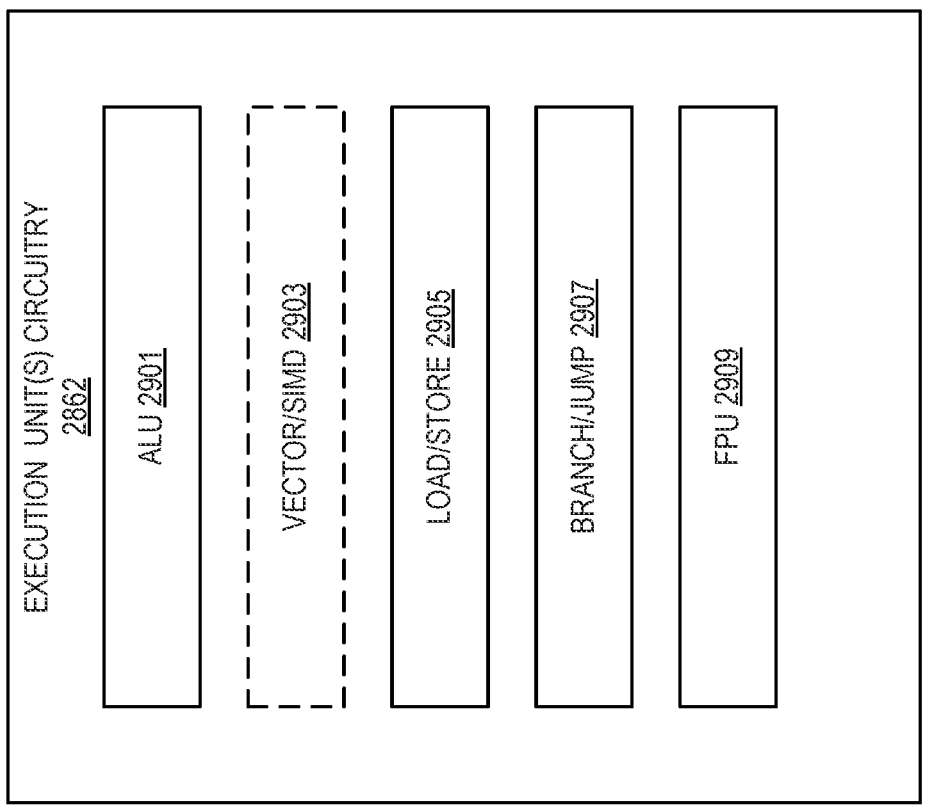
FIG. 29 illustrates embodiments of execution unit(s) circuitry.
Figure 30:
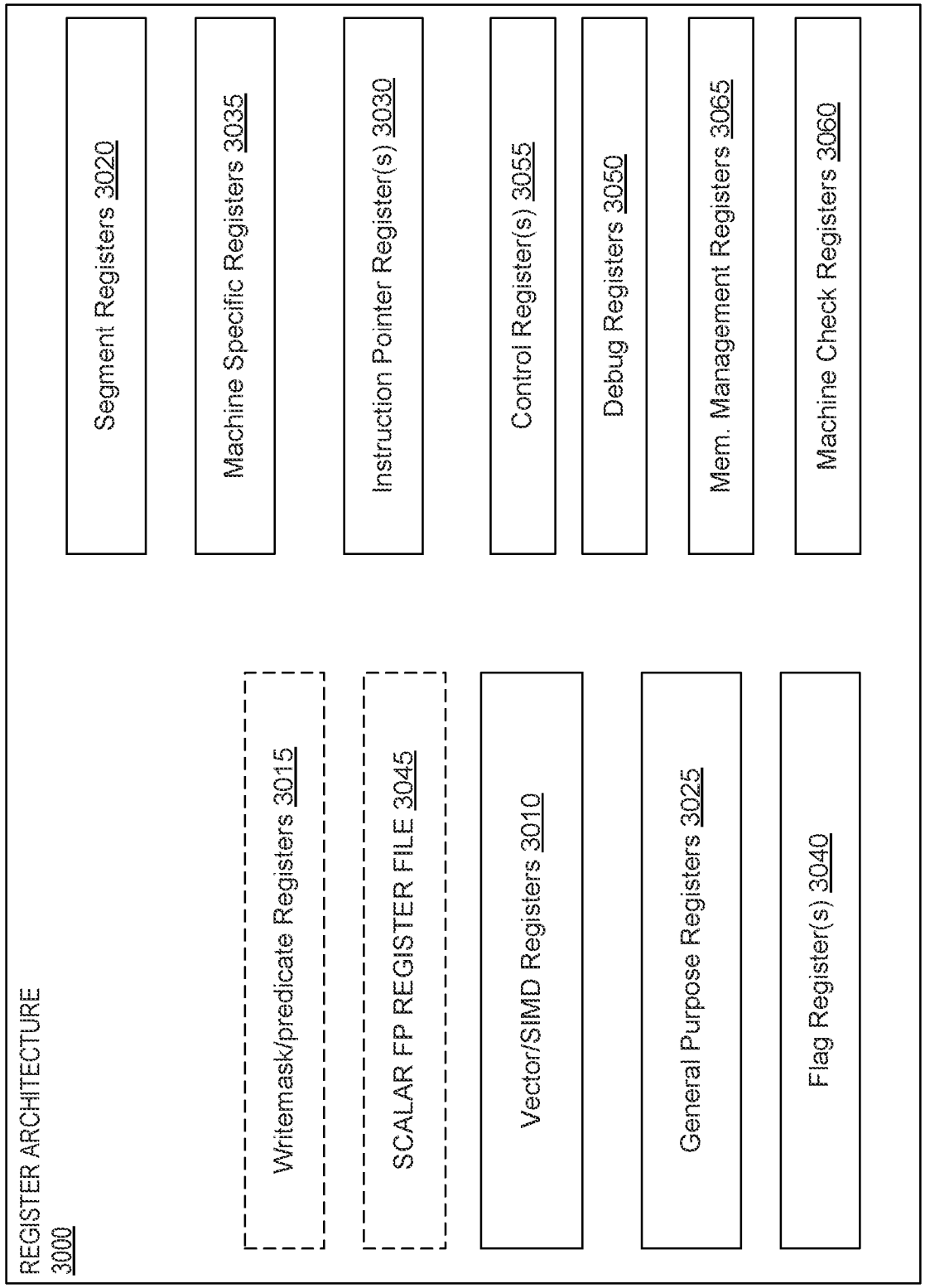
FIG. 30 is a block diagram of a register architecture according to some embodiments.

The core 2890 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 2890 includes logic to support a packed data instruction set extension (e.g., AVX1, AVX2), thereby allowing the operations used by many multimedia applications to be performed using packed data.
Exemplary Execution Unit(s) Circuitry FIG. 29 illustrates embodiments of execution unit(s) circuitry, such as execution unit(s) circuitry 2862 of FIG. 28(B). As illustrated, execution unit(s) circuitry 2862 may include one or more ALU circuits 2901, vector/SIMD unit circuits 2903, load/store unit circuits 2905, and/or branch/jump unit circuits 2907. ALU circuits 2901 perform integer arithmetic and/or Boolean operations. Vector/SIMD unit circuits 2903 perform vector/SIMD operations on packed data (such as SIMD/vector registers). Load/store unit circuits 2905 execute load and store instructions to load data from memory into registers or store from registers to memory. Load/store unit circuits 2905 may also generate addresses. Branch/jump unit circuits 2907 cause a branch or jump to a memory address depending on the instruction. Floating-point unit (FPU) circuits 2909 perform floating-point arithmetic. The width of the execution unit(s) circuitry 2862 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).
Exemplary Register Architecture FIG. 30 is a block diagram of a register architecture 3000 according to some embodiments. As illustrated, there are vector/SIMD registers 3010 that vary from 128-bit to 1,024 bits width. In some embodiments, the vector/SIMD registers 3010 are physically 512-bits and, depending upon the mapping, only some of the lower bits are used. For example, in some embodiments, the vector/SIMD registers 3010 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 3000 includes writemask/predicate registers 3015. For example, in some embodiments, there are 8 writemask/predicate registers (sometimes called k0 through k7) that are each 16-bit, 32-bit, 64-bit, or 128-bit in size. Writemask/predicate registers 3015 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 3015 corresponds to a data element position of the destination. In other embodiments, the writemask/predicate registers 3015 are scalable and consists of a set number of enable bits for a given vector element (e.g., 8 enable bits per 64-bit vector element).

The register architecture 3000 includes a plurality of general-purpose registers 3025. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 3000 includes scalar floating-point register 3045 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 3040 (e.g., EFLAGS, RFLAGS, etc.) store status and control information for arithmetic, compare, and system operations. For example, the one or more flag registers 3040 may store condition code information such as carry, parity, auxiliary carry, zero, sign, and overflow. In some embodiments, the one or more flag registers 3040 are called program status and control registers.

Segment registers 3020 contain segment points for use in accessing memory. In some embodiments, these registers are referenced by the names CS, DS, SS, ES, FS, and GS.

Machine specific registers (MSRs) 3035 control and report on processor performance. Most MSRs 3035 handle system-related functions and are not accessible to an application program. Machine check registers 3060 consist of control, status, and error reporting MSRs that are used to detect and report on hardware errors.

One or more instruction pointer register(s) 3030 store an instruction pointer value. Control register(s) 3055 (e.g., CR0-CR4) determine the operating mode of a processor (e.g., processor 2670, 2680, 2638, 2615, and/or 2700) and the characteristics of a currently executing task. Debug registers 3050 control and allow for the monitoring of a processor or core's debugging operations.

Memory management registers 3065 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.
Instruction Sets An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 31:
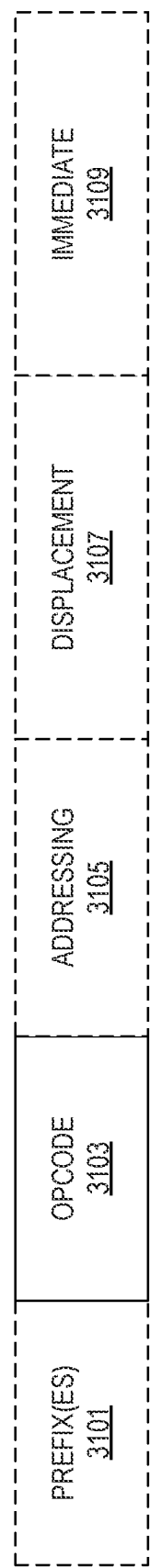
FIG. 31 illustrates embodiments of an instruction format.

FIG. 31 illustrates embodiments of an instruction format. As illustrated, an instruction may include multiple components including, but not limited to, one or more fields for: one or more prefixes 3101, an opcode 3103, addressing information 3105 (e.g., register identifiers, memory addressing information, etc.), a displacement value 3107, and/or an immediate 3109. Note that some instructions utilize some or all of the fields of the format whereas others may only use the field for the opcode 3103. In some embodiments, the order illustrated is the order in which these fields are to be encoded, however, it should be appreciated that in other embodiments these fields may be encoded in a different order, combined, etc.

The prefix(es) field(s) 3101, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3103 is used to at least partially define the operation to be performed upon a decoding of the instruction. In some embodiments, a primary opcode encoded in the opcode field 3103 is 1, 2, or 3 bytes in length. In other embodiments, a primary opcode can be a different length. An additional 3-bit opcode field is sometimes encoded in another field.

Figure 32:
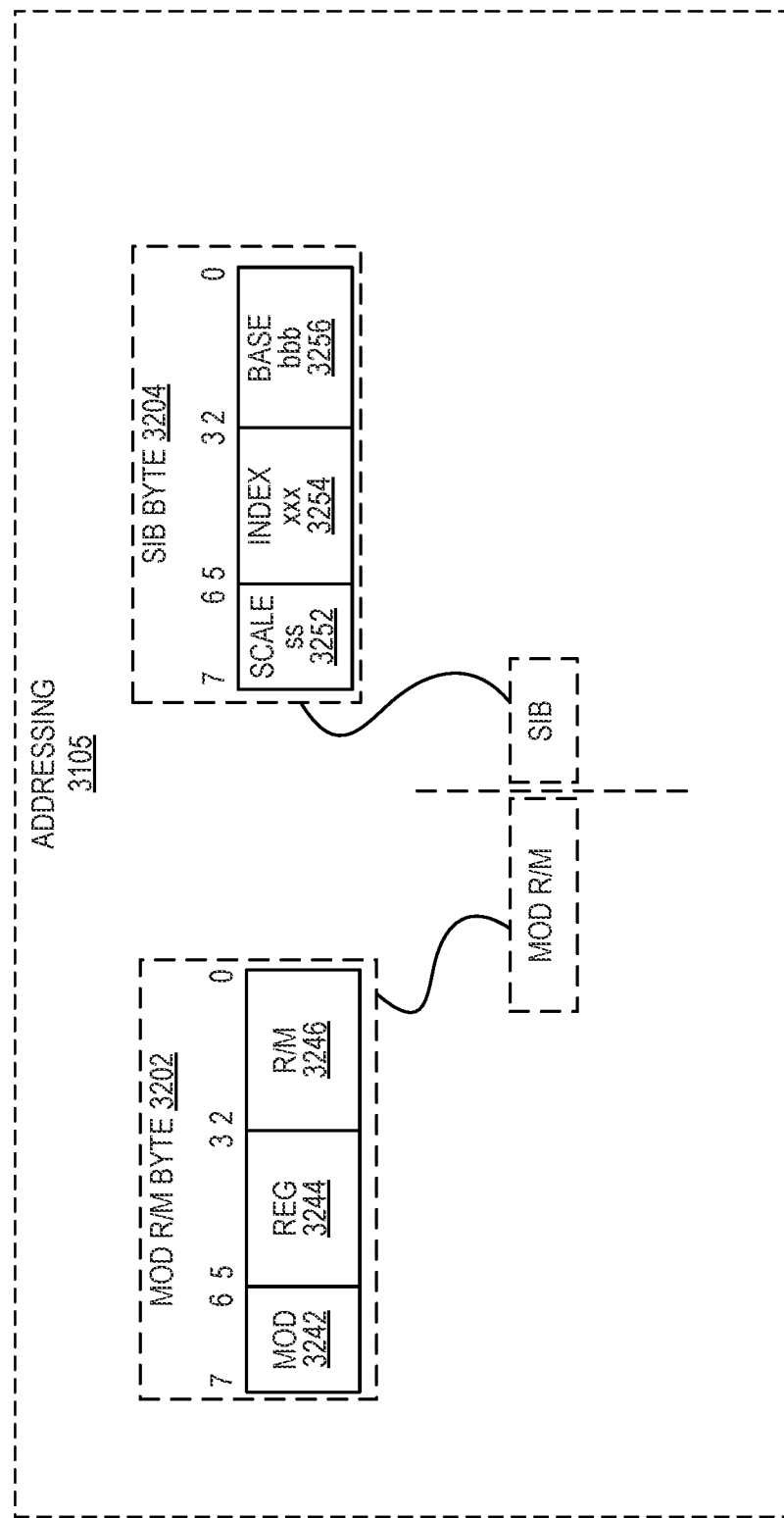
FIG. 32 illustrates embodiments of the addressing field.

The addressing field 3105 is used to address one or more operands of the instruction, such as a location in memory or one or more registers. FIG. 32 illustrates embodiments of the addressing field 3105. In this illustration, an optional ModR/M byte 3202 and an optional Scale, Index, Base (SIB) byte 3204 are shown. The ModR/M byte 3202 and the SIB byte 3204 are used to encode up to two operands of an instruction, each of which is a direct register or effective memory address. Note that each of these fields are optional in that not all instructions include one or more of these fields. The MOD R/M byte 3202 includes a MOD field 3242, a register field 3244, and R/M field 3246.

The content of the MOD field 3242 distinguishes between memory access and non-memory access modes. In some embodiments, when the MOD field 3242 has a value of b11, a register-direct addressing mode is utilized, and otherwise register-indirect addressing is used.

The register field 3244 may encode either the destination register operand or a source register operand, or may encode an opcode extension and not be used to encode any instruction operand. The content of register index field 3244, directly or through address generation, specifies the locations of a source or destination operand (either in a register or in memory). In some embodiments, the register field 3244 is supplemented with an additional bit from a prefix (e.g., prefix 3101) to allow for greater addressing.

The R/M field 3246 may be used to encode an instruction operand that references a memory address, or may be used to encode either the destination register operand or a source register operand. Note the R/M field 3246 may be combined with the MOD field 3242 to dictate an addressing mode in some embodiments.

The SIB byte 3204 includes a scale field 3252, an index field 3254, and a base field 3256 to be used in the generation of an address. The scale field 3252 indicates scaling factor. The index field 3254 specifies an index register to use. In some embodiments, the index field 3254 is supplemented with an additional bit from a prefix (e.g., prefix 3101) to allow for greater addressing. The base field 3256 specifies a base register to use. In some embodiments, the base field 3256 is supplemented with an additional bit from a prefix (e.g., prefix 3101) to allow for greater addressing. In practice, the content of the scale field 3252 allows for the scaling of the content of the index field 3254 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 3107 provides this value. Additionally, in some embodiments, a displacement factor usage is encoded in the MOD field of the addressing field 3105 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 3107.

In some embodiments, an immediate field 3109 specifies an immediate for the instruction. An immediate may be encoded as a 1-byte value, a 2-byte value, a 4-byte value, etc.

Figure 33:
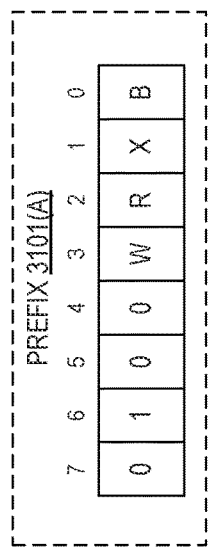
FIG. 33 illustrates embodiments of a first prefix.

FIG. 33 illustrates embodiments of a first prefix 3101(A). In some embodiments, the first prefix 3101(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3101(A) may specify up to three registers using 3-bit fields depending on the format: 1) using the reg field 3244 and the R/M field 3246 of the Mod R/M byte 3202; 2) using the Mod R/M byte 3202 with the SIB byte 3204 including using the reg field 3244 and the base field 3256 and index field 3254; or 3) using the register field of an opcode.

In the first prefix 3101(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 3244 and MOD R/M R/M field 3246 alone can each only address 8 registers.

In the first prefix 3101(A), bit position 2 (R) may an extension of the MOD R/M reg field 3244 and may be used to modify the ModR/M reg field 3244 when that field encodes a general purpose register, a 64-bit packed data register (e.g., a SSE register), or a control or debug register. R is ignored when Mod R/M byte 3202 specifies other registers or defines an extended opcode.

Bit position 1 (X) X bit may modify the SIB byte index field 3254.

Bit position B (B) B may modify the base in the Mod R/M R/M field 3246 or the SIB byte base field 3256; or it may modify the opcode register field used for accessing general purpose registers (e.g., general purpose registers 3025).

Figure 34A:
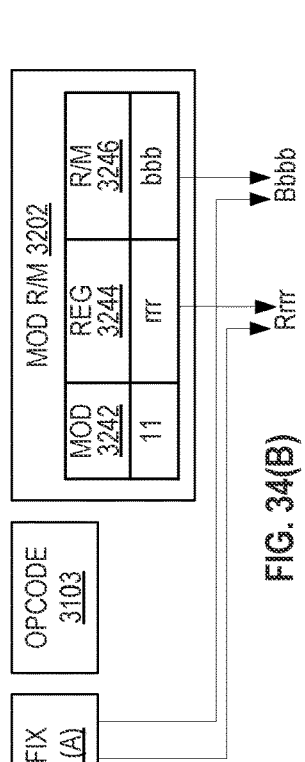
FIGS. 34(A)-(D) illustrate embodiments of how some fields of the first prefix are used.
Figure 34B:
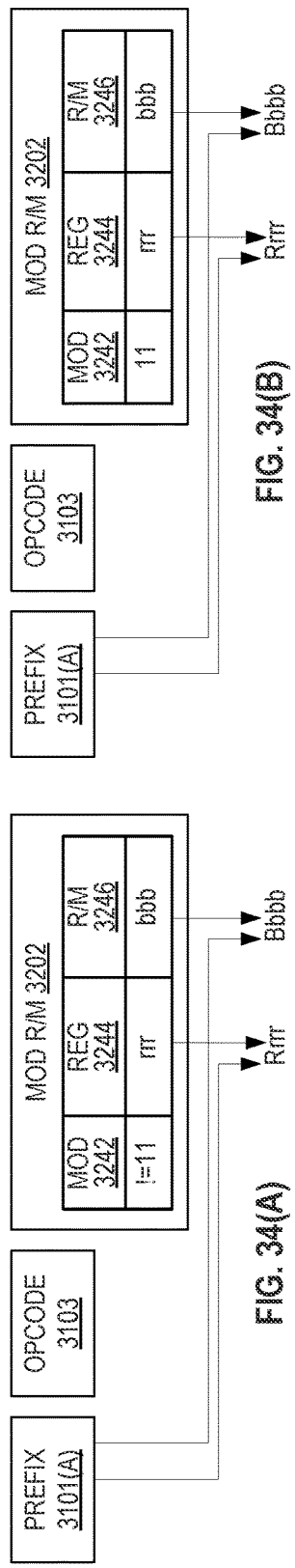
Figure 34C:
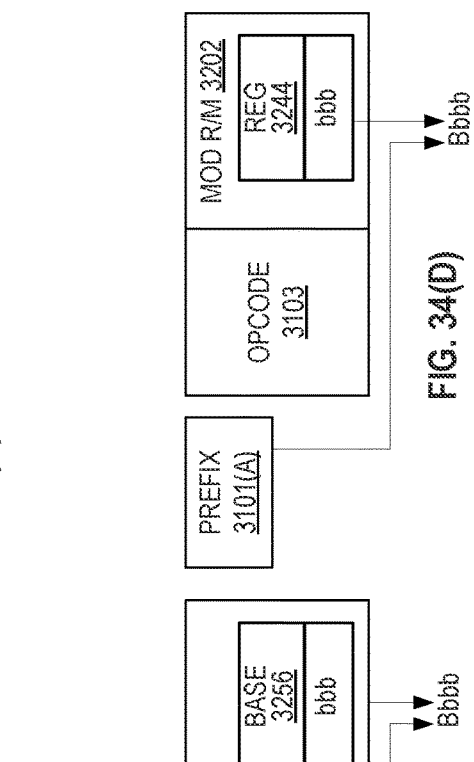
Figure 34D:
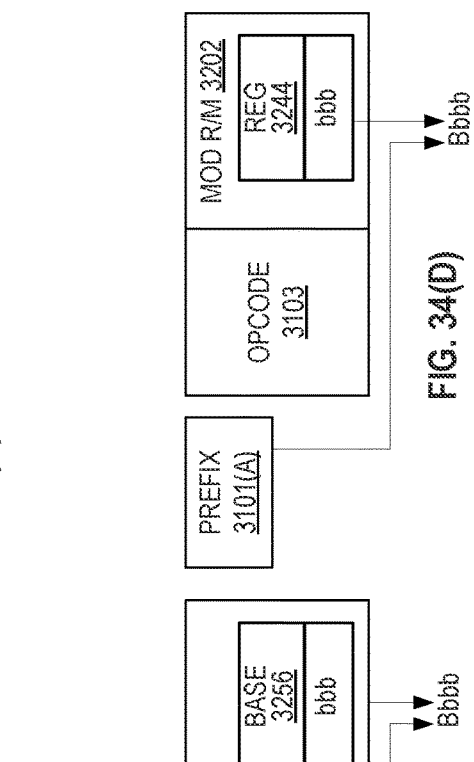

FIGS. 34(A)-(D) illustrate embodiments of how the R, X, and B fields of the first prefix 3101(A) are used. FIG. 34(A) illustrates R and B from the first prefix 3101(A) being used to extend the reg field 3244 and R/M field 3246 of the MOD R/M byte 3202 when the SIB byte 32 04 is not used for memory addressing. FIG. 34(B) illustrates R and B from the first prefix 3101(A) being used to extend the reg field 3244 and R/M field 3246 of the MOD R/M byte 3202 when the SIB byte 32 04 is not used (register-register addressing). FIG. 34(C) illustrates R, X, and B from the first prefix 3101(A) being used to extend the reg field 3244 of the MOD R/M byte 3202 and the index field 3254 and base field 3256 when the SIB byte 32 04 being used for memory addressing. FIG. 34(D) illustrates B from the first prefix 3101(A) being used to extend the reg field 3244 of the MOD R/M byte 3202 when a register is encoded in the opcode 3103.

Figure 35A:
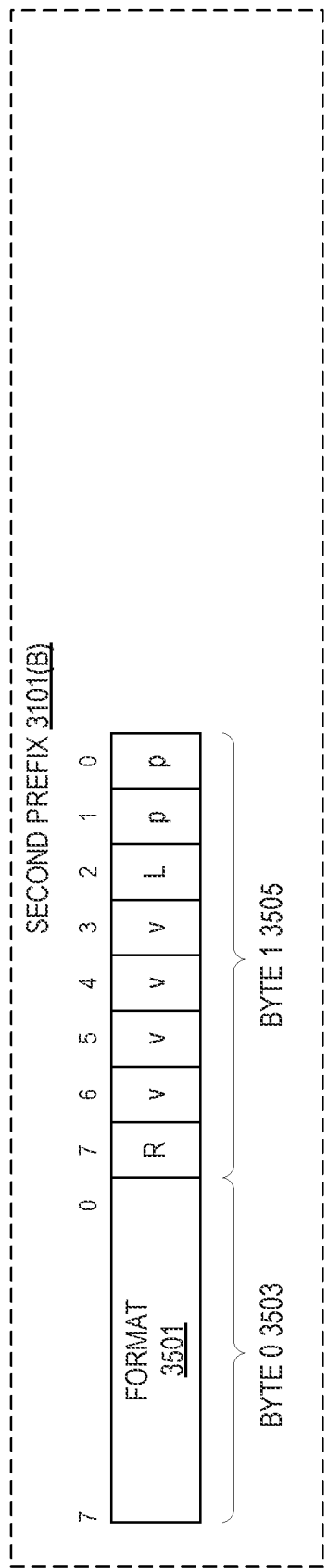
FIGS. 35(A)-(B) illustrate embodiments of a second prefix.
Figure 35B:
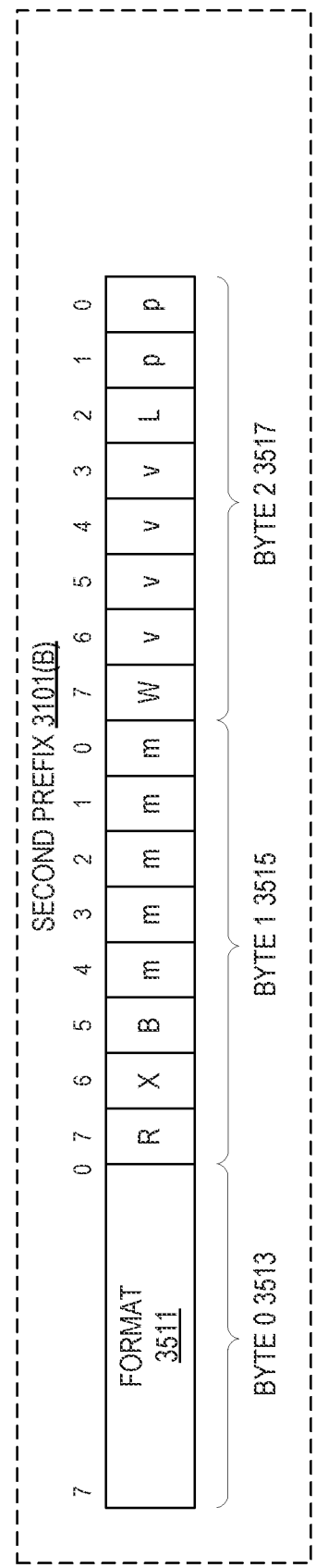

FIGS. 35(A)-(B) illustrate embodiments of a second prefix 3101(B). In some embodiments, the second prefix 3101(B) is an embodiment of a VEX prefix. The second prefix 3101(B) encoding allows instructions to have more than two operands, and allows SIMD vector registers (e.g., vector/SIMD registers 3010) to be longer than 64-bits (e.g., 128-bit and 256-bit). The use of the second prefix 3101(B) provides for three-operand (or more) syntax. For example, previous two-operand instructions performed operations such as A=A+B, which overwrites a source operand. The use of the second prefix 3101(B) enables operands to perform nondestructive operations such as A=B+C.

In some embodiments, the second prefix 3101(B) comes in two forms—a two-byte form and a three-byte form. The two-byte second prefix 3101(B) is used mainly for 128-bit, scalar, and some 256-bit instructions; while the three-byte second prefix 3101(B) provides a compact replacement of the first prefix 3101(A) and 3-byte opcode instructions.

FIG. 35(A) illustrates embodiments of a two-byte form of the second prefix 3101(B). In one example, a format field 3501 (byte 0 3503) contains the value C5H. In one example, byte 1 3505 includes a "R" value in bit[7]. This value is the complement of the same value of the first prefix 3101(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3246 to encode the instruction operand that references a memory address or encode either the destination register operand or a source register operand.

Instructions that use this prefix may use the Mod R/M reg field 3244 to encode either the destination register operand or a source register operand, be treated as an opcode extension and not used to encode any instruction operand.

For instruction syntax that support four operands, vvvv, the Mod R/M R/M field 3246 and the Mod R/M reg field 3244 encode three of the four operands. Bits[7:4] of the immediate 3109 are then used to encode the third source register operand.

FIG. 35(B) illustrates embodiments of a three-byte form of the second prefix 3101(B). in one example, a format field 3511 (byte 0 3513) contains the value C4H. Byte 1 3515 includes in bits[7:5] "R," "X," and "B" which are the complements of the same values of the first prefix 3101(A). Bits[4:0] of byte 1 3515 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 3517 is used similar to W of the first prefix 3101(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3246 to encode the instruction operand that references a memory address or encode either the destination register operand or a source register operand.

Instructions that use this prefix may use the Mod R/M reg field 3244 to encode either the destination register operand or a source register operand, be treated as an opcode extension and not used to encode any instruction operand.

For instruction syntax that support four operands, vvvv, the Mod R/M R/M field 3246, and the Mod R/M reg field 3244 encode three of the four operands. Bits[7:4] of the immediate 3109 are then used to encode the third source register operand.

Figure 36:
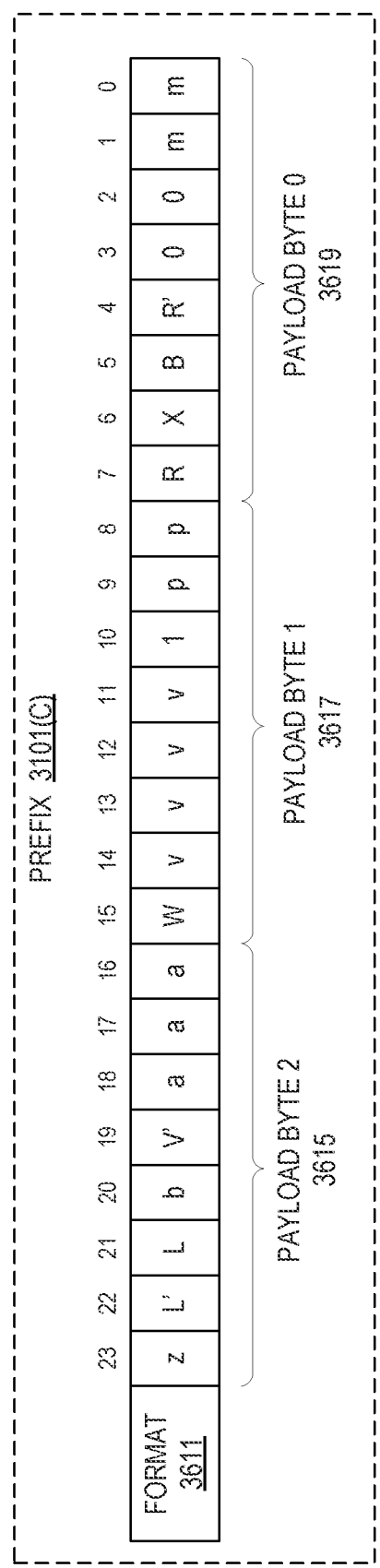
FIG. 36 illustrates embodiments of a third prefix.

FIG. 36 illustrates embodiments of a third prefix 3101(C). In some embodiments, the first prefix 3101(A) is an embodiment of an EVEX prefix. The third prefix 3101(C) is a four-byte prefix.

The third prefix 3101(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 30) or predication utilize this prefix. Opmask register allow for conditional processing or selection control. Opmask instructions, whose source/destination operands are opmask registers and treat the content of an opmask register as a single value, are encoded using the second prefix 3101(B).

The third prefix 3101(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3101(C) is a format field 3611 that has a value, in one example, of 62H. Subsequent bytes are referred to as payload bytes 3615-3619 and collectively form a 24-bit value of P[23:0] providing specific capability in the form of one or more fields (detailed herein).

In some embodiments, P[1:0] of payload byte 3619 are identical to the low two mmmmm bits. P[3:2] are reserved in some embodiments. Bit P[4] (R') allows access to the high 16 vector register set when combined with P[7] and the ModR/M reg field 3244. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 3244 and ModR/M R/M field 3246. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 3101(A) and second prefix 3111(B) and may serve as an opcode extension bit or operand size promotion.

P[18:16] specify the index of a register in the opmask (writemask) registers (e.g., writemask/predicate registers 3015). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 3101(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 37:
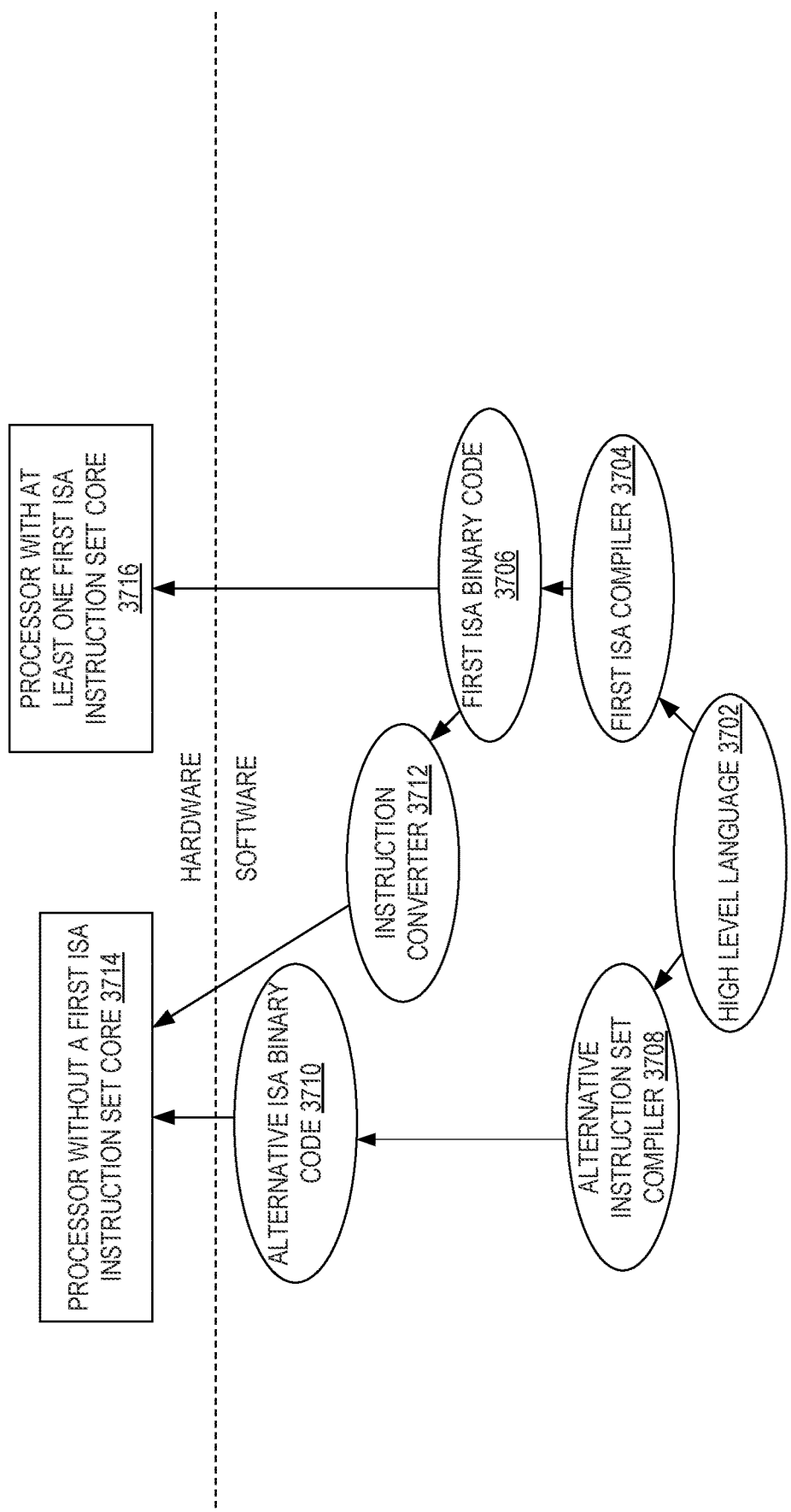
FIG. 37 illustrates a block diagram contrasting the use of a software instruction converter to convert binary instructions in a source instruction set to binary instructions in a target instruction set according to embodiments of the invention.

FIG. 37 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 37 shows a program in a high level language 3702 may be compiled using a first ISA compiler 3704 to generate first ISA binary code 3706 that may be natively executed by a processor with at least one first instruction set core 3716. The processor with at least one first ISA instruction set core 3716 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 3704 represents a compiler that is operable to generate first ISA binary code 3706 (e.g., object code) that can, with or without additional linkage processing, be executed on the processor with at least one first ISA instruction set core 3716. Similarly, FIG. 37 shows the program in the high level language 3702 may be compiled using an alternative instruction set compiler 3708 to generate alternative instruction set binary code 3710 that may be natively executed by a processor without a first ISA instruction set core 3714. The instruction converter 3712 is used to convert the first ISA binary code 3706 into code that may be natively executed by the processor without a first ISA instruction set core 3714. This converted code is not likely to be the same as the alternative instruction set binary code 3710 because an instruction converter capable of this is difficult to make; however, the converted code will accomplish the general operation and be made up of instructions from the alternative instruction set. Thus, the instruction converter 3712 represents software, firmware, hardware, or a combination thereof that, through emulation, simulation or any other process, allows a processor or other electronic device that does not have a first ISA instruction set processor or core to execute the first ISA binary code 3706.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary embodiments include, but are not limited to:

1. An apparatus comprising:
   at least one memory security engine;
   decoder circuitry to decode a single instruction, the single instruction to include:
   a field for an opcode, the opcode to indicate that execution circuitry is to at least indicate to the at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
   at least one field that is at least one of:
      an identifier of at least one operand location that is to store an indication of the region of memory that is to be organized according to the integrity based metadata organization and
      an immediate that is to encode an indication of a region of memory that is to be organized according to the integrity based metadata organization; and
   the execution circuitry to execute the decoded single instruction according to the opcode.
2. The apparatus of the previous example, wherein the at least one operand location is a register.
3. The apparatus of the previous example, wherein the at least one operand location is a memory location.
4. The apparatus of one or more of the previous examples, wherein the execution circuitry is further to confirm support for the integrity based metadata organization based on one or more fields of a model specific register.
5. The apparatus of one or more of the previous examples, wherein the first proper subset of an error correction code and the second, different proper subset of an error correction code total 96 or 128 bits.
6. The apparatus of one of the previous examples, wherein the at least one memory security engine comprises:
   encryption/decryption circuitry to encode a dataline to store in memory and decode a dataline received from memory; and
   verification circuitry to verify a dataline retrieved from memory by comparing the message authentication code to a generated message authentication code, wherein only verified and decrypted datalines are to be sent in response to a read request for a dataline.
7. The apparatus of one or more of the previous examples, wherein the verification circuitry is further to attempt error detection of a dataline based on the first proper subset of the error correction code.
8. The apparatus of the previous example, wherein the at least one memory security engine further comprises:
   fetching and caching circuitry to fetch and cache the second, different proper subset of an error correction code from sequestered memory upon an uncorrectable error,
   wherein the verification circuitry is further to attempt error correction of a dataline based on the first proper subset of the error correction code and the second, different proper subset of an error correction code.
9. The apparatus of one or more of the previous examples, wherein the at least one memory security engine further comprises storage of a plurality of encryption keys.
10. A method comprising:
    decoding a single instruction, the single instruction to include:
    a field for an opcode, the opcode to indicate that execution of the single instruction is to at least indicate to at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
    at least field that is at least one of:
       an identifier of at least one operand location that is to store an indication of the region of memory that is to be organized according to the integrity based metadata organization and
       an immediate that is to encode an indication of a region of memory that is to be organized according to the integrity based metadata organization; and
    executing the decoded single instruction according to the opcode.
11. The method of the previous example, wherein the at least one operand location is a register.
12. The method of the previous example, wherein the at least one operand location is a memory location.
13. The method of one or more of the previous examples, wherein the executing further comprises confirming support for the integrity based metadata organization region of memory based on one or more fields of a model specific register.
14. The method of one or more of the previous examples, further comprising:
    decoding a dataline received from memory; and
    verifying the dataline retrieved from memory by comparing the message authentication code to a generated message authentication code, wherein only verified and decrypted datalines are to be sent in response to a read request for a dataline.
15. The method of one or more of the previous examples, wherein the verifying further comprises attempting error detection of a dataline based on the first proper subset of the error correction code.
16. The method of one or more of the previous examples, further comprising:
    fetching and caching the second, different proper subset of an error correction code from sequestered memory upon an uncorrectable error; and
    attempting error correction of a dataline based on the first proper subset of the error correction code and the second, different proper subset of an error correction code.
17. The method of one or more of the previous examples, further comprising:
    accessing memory that is to store one or more datalines.
18. The method of one or more of the previous examples, further comprising:
    initializing the integrity based metadata organization region of memory.
19. A non-transitory machine readable medium to perform the method of any of examples 10-18.

20. A system comprising:
- a processor comprising:
  - at least one memory security engine;
  - decoder circuitry to decode a single instruction, the single instruction to include:
    - a field for an opcode, the opcode to indicate that execution circuitry is to at least indicate to the at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
    - at least one field that is at least one of:
      - an identifier of at least one operand location that is to store an indication of the region of memory that is to be organized according to the integrity based metadata organization and
      - an immediate that is to encode an indication of a region of memory that is to be organized according to the integrity based metadata organization; and
  - the execution circuitry to execute the decoded single instruction according to the opcode; and.
- the memory coupled to the processor to be organized according to the integrity based metadata organization.

21. An apparatus comprising:
- at least one memory security engine;
- decoder circuitry to decode a single instruction, the single instruction to include:
  - a field for an opcode, the opcode to indicate that execution circuitry is to at least indicate to the at least one memory security engine to disable an identified integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
  - at least one field that is:
    - an identifier of at least one operand location that is to store an indication of the region of memory that has been organized according to the integrity based metadata organization and
    - an immediate that is to encode an indication of a region of memory that has been organized according to the integrity based metadata organization; and
- the execution circuitry to execute the decoded single instruction according to the opcode.

22. The apparatus of the previous example, wherein the at least one operand location is a register.

23. The apparatus of the previous example wherein the at least one operand location is a memory location.

24. The apparatus of one or more of the previous examples, wherein the execution circuitry is further to confirm support for the integrity based metadata organization based on one or more fields of a model specific register.

25. The apparatus of one or more of the previous examples, wherein the first proper subset of an error correction code and the second, different proper subset of an error correction code total 96 or 128 bits.

26. The apparatus of one or more of the previous examples, wherein the at least one memory security engine further comprises storage of a plurality of encryption keys.

27. The apparatus of one or more of the previous examples, wherein the execution circuitry is further to initialize the integrity based metadata organization region of memory after disabling the integrity based metadata organization.

28. The apparatus of one or more of the previous examples, wherein the execution circuitry is further to clear a bit of a region vector that had been set indicating the region of memory is to use the integrity based metadata organization.

29. The apparatus of one or more of the previous examples, wherein the at least one operand location comprises two registers, a first register to store an beginning address and a second register to store an ending address, the beginning and ending addresses defining the region.

30. A method comprising:
- decoding a single instruction, the single instruction to include:
  - a field for an opcode, the opcode to indicate that execution of the single instruction is to at least indicate to at least one memory security engine to disable an identified integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
  - at least one field that is:
    - an identifier of at least one operand location that is to store an indication of the region of memory that has been organized according to the integrity based metadata organization and
    - an immediate that is to encode an indication of a region of memory that has been organized according to the integrity based metadata organization; and
- executing the decoded single instruction according to the opcode.

31. The method of the previous example, wherein the operand location is a register.

32. The method of the previous example, wherein the operand location is a memory location.

33. The method of one or more of the previous examples, wherein the executing further comprises confirming support for the integrity based metadata organization region of memory based on one or more fields of a model specific register.

34. The method of one or more of the previous examples, wherein the at least one operand location comprises a register to store a first address and a memory location to store a second address, the first and second addresses defining the region.

35 The method of one or more of the previous examples, further comprising:
- clearing a bit of a region vector that had been set indicating the region of memory is to use the integrity based metadata organization.

36 The method of one or more of the previous examples, further comprising:
   initializing the integrity based metadata organization region of memory after disabling the integrity based metadata organization.
37. The method of one or more of the previous examples, wherein the at least one operand location comprises two registers, a first register to store an beginning address and a second register to store an ending address, the beginning and ending addresses defining the region.
38. The method of one or more of the previous examples, wherein the first proper subset of an error correction code and the second, different proper subset of an error correction code total 96 or 128 bits.
39. A non-transitory machine readable medium storing instructions to perform the method of any of examples 30-38.
40. A system comprising:
   a processor comprising:
      at least one memory security engine;
      decoder circuitry to decode a single instruction, the single instruction to include:
         a field for an opcode, the opcode to indicate that execution circuitry is to at least indicate to the at least one memory security engine to disable an identified integrity based metadata organization region of memory, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
         at least one field that is:
            an identifier of at least one operand location that is to store an indication of the region of memory that has been organized according to the integrity based metadata organization and
            an immediate that is to encode an indication of a region of memory that has been organized according to the integrity based metadata organization; and
      the execution circuitry to execute the decoded single instruction according to the opcode; and.
   the memory coupled to the processor to be organized according to the integrity based metadata organization.
41. An apparatus comprising:
   at least one memory security engine;
   decoder circuitry to decode a single instruction, the single instruction to include:
      a field for an opcode, the opcode to indicate that execution circuitry is to at least indicate to the at least one memory security engine to configure a replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and
      at least one field that is at least one of:
         an identifier of at least one operand location that is to store an indication of the region of memory that is to be organized according to the replay protection based metadata organization and
         an immediate that is to encode an indication of a region of memory that is to be organized according to the replay protection based metadata organization; and
   the execution circuitry to execute the decoded single instruction according to the opcode.
42. The apparatus of the previous example, wherein the at least one operand location is a register.
43. The apparatus of the previous example, wherein the at least one operand location is a memory location.
44. The apparatus of one or more of the previous examples, wherein the execution circuitry is further to confirm support for the replay protection based metadata organization based on one or more fields of a model specific register.
45. The apparatus of one or more of the previous examples, wherein at least a proper subset of the replay protection tree is to be stored in memory.
46. The apparatus of one or more of the previous examples, wherein a top level of the replay tree is to be stored as one or more counter values in the at least one memory security engine.
47. The apparatus of one or more of the previous examples, wherein the at least one memory security engine comprises:
   encryption/decryption circuitry to encode a dataline to store in memory and decode a dataline received from memory; and
   replay tree walker to verify a dataline retrieved by performing a walk of the replay protection tree using the stored metadata.
48. The apparatus of one or more of the previous examples, wherein the at least one memory security engine further comprises a replay protection tree generator.
49. The apparatus of one or more of the previous examples, wherein the at least one memory security engine further comprises storage of a plurality of encryption keys.
50. A method comprising:
   decoding a single instruction, the single instruction to include:
      a field for an opcode, the opcode to indicate that execution of the single instruction is to at least indicate to at least one memory security engine to configure a replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and
      at least one field that is at least one of:
         an identifier of at least one operand location that is to store an indication of the region of memory that is to be organized according to the replay protection based metadata organization and
         an immediate that is to encode an indication of a region of memory that is to be organized according to the replay protection based metadata organization; and
   executing the decoded single instruction according to the opcode.

51. The method of the previous example, wherein the at least one operand location is a register.
52. The method of the previous example, wherein the at least one operand location is a memory location.
53. The method of one or more of the previous examples, wherein the executing further comprises confirming support for the replay protection based metadata organization region of memory based on one or more fields of a model specific register.
54. The method of one or more of the previous examples, further comprising:
   decoding a dataline received from memory; and
   verifying the dataline retrieved from memory by comparing the message authentication code to a generated message authentication code, wherein only verified and decrypted datalines are to be sent in response to a read request for a dataline.
55. The method of one or more of the previous examples, further comprising:
   receiving a dataline from memory; and
   walking the replay protection tree to establish integrity of the received dataline.
56 The method of one or more of the previous examples, further comprising:
   generating the replay protection tree.
57. The method of one or more of the previous examples, further comprising:
   accessing memory that is to store one or more datalines.
58 The method of one or more of the previous examples, further comprising:
   initializing the replay protection based metadata organization region of memory.
59. A non-transitory machine readable medium storing instructions to perform the method of any of examples 50-58.
60. A system comprising:
   a processor comprising:
      at least one memory security engine;
      decoder circuitry to decode a single instruction, the single instruction to include:
         a field for an opcode, the opcode to indicate that execution circuitry is to at least indicate to the at least one memory security engine to configure a replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and
         at least one field that is at least one of:
            an identifier of at least one operand location that is to store an indication of the region of memory that is to be organized according to the replay protection based metadata organization and
            an immediate that is to encode an indication of a region of memory that is to be organized according to the replay protection based metadata organization; and
      the execution circuitry to execute the decoded single instruction according to the opcode; and.
   the memory coupled to the processor to be organized according to the replay protection based metadata organization.
61. An apparatus comprising:
   at least one memory security engine;
   decoder circuitry to decode a single instruction, the single instruction to include:
      a field for an opcode, the opcode to indicate that execution circuitry is to at least indicate to the at least one memory security engine to disable an identified replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and
      at least one field that is at least one of:
         an identifier of at least one operand location that is to store an indication of the region of memory that has been organized according to the replay protection based metadata organization and
         an immediate that is to encode an indication of a region of memory that has been organized according to the replay protection based metadata organization; and
   the execution circuitry to execute the decoded single instruction according to the opcode.
62. The apparatus of the previous example, wherein the at least one operand location is a register.
63. The apparatus of the previous example, wherein the at least one operand location is a memory location.
64. The apparatus of one or more of the previous examples, wherein the execution circuitry is further to confirm support for the replay protection based metadata organization based on one or more fields of a model specific register.
65. The apparatus of one or more of the previous examples, wherein at least a proper subset of the replay protection tree is to be stored in memory.
66. The apparatus of one or more of the previous examples, wherein a top level of the replay tree is to be stored as one or more counter values in the at least one memory security engine.
67. The apparatus of one or more of the previous examples, wherein the execution circuitry is further to initialize the replay protection based metadata organization region of memory after disabling the integrity based metadata organization.
68. The apparatus of one or more of the previous examples, wherein the execution circuitry is further to clear a bit of a region vector that had been set indicating the region of memory is to use the replay protection based metadata organization.
69. The apparatus of one or more of the previous examples, wherein the at least one operand location comprises two registers, a first register to store an beginning address and a second register to store an ending address, the beginning and ending addresses defining the region.
70. A method comprising:
   decoding a single instruction, the single instruction to include:
      a field for an opcode, the opcode to indicate that execution of the single instruction is to at least indicate to the at least one memory security engine to disable an identified replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and at least one field that is at least one of:
an identifier of at least one operand location that is to store an indication of the region of memory that was organized according to the replay protection based metadata organization and
an immediate that is to encode an indication of a region of memory that was organized according to the replay protection based metadata organization; and executing the decoded single instruction according to the opcode.

71. The method of the previous example 70, wherein the at least one operand location is a register.

72. The method of the previous example 70, wherein the at least one operand location is a memory location.

73. The method of one or more of the previous examples 70, wherein the executing further comprises confirming support for the replay protection based metadata organization region of memory based on one or more fields of a model specific register.

74 The method of one or more of the previous examples 70, further comprising:
initializing the replay protection based metadata organization region of memory after disabling the integrity based metadata organization.

75. The method of one or more of the previous examples 70, further comprising:
clearing a bit of a region vector that had been set indicating the region of memory is to use the replay protection based metadata organization.

76. The method of one or more of the previous examples 70, wherein the at least one operand location comprises two registers, a first register to store an beginning address and a second register to store an ending address, the beginning and ending addresses defining the region.

77. The method of one or more of the previous examples 70, wherein the at least one operand location comprises two registers, a first register to store an beginning address and a second register to store an ending address, the beginning and ending addresses defining the region.

78. The method of one or more of the previous examples 70, further comprising:
throwing an exception when the identified replay protection based metadata organization region of memory is improper.

79. A non-transitory machine readable medium to perform the method of any of examples 70-78.

80. A system comprising:
a processor comprising:
at least one memory security engine;
decoder circuitry to decode a single instruction, the single instruction to include:
a field for an opcode, the opcode to indicate that execution circuitry is to at least indicate to the at least one memory security engine to disable an identified replay protection based metadata organization region of memory, wherein in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, and at least one field that is at least one of:
an identifier of at least one operand location that is to store an indication of the region of memory that has been organized according to the replay protection based metadata organization and
an immediate that is to encode an indication of a region of memory that has been organized according to the replay protection based metadata organization; and the execution circuitry to execute the decoded single instruction according to the opcode; and.

the memory coupled to the processor to be organized according to the replay protection based metadata organization.

81. An apparatus comprising:
at least one memory security engine;
decoder circuitry to decode a single instruction, the single instruction to include:
a field for an opcode, the opcode to indicate that execution circuitry is to at least indicate to the at least one memory security engine to configure a metadata organization region of memory as either integrity based or replay protection based, wherein
in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, at least one field that is at least one of:
an identifier of at least one operand location that is to store an indication of a selection of integrity based or replay protection based metadata organization and
an immediate that is to encode an indication of a selection of integrity based or replay protection based metadata organization, at least one field that is at least one of:
an identifier of at least one operand location that is to store an indication of the region of memory that is to be organized according to the selected based metadata organization and
an immediate that is to encode an indication of a region of memory that is to be organized according to the integrity based metadata organization; and the execution circuitry to execute the decoded single instruction according to the opcode.

82. The apparatus of the previous example, wherein the at least one operand location is a register.

83. The apparatus of the previous example, wherein the at least one operand location is a memory location.

84. The apparatus of one or more of the previous examples, wherein the execution circuitry is further to confirm support for the integrity based metadata organization based on one or more fields of a model specific register.

85. The apparatus of one or more of the previous examples, wherein the first proper subset of an error correction code and the second, different proper subset of an error correction code total 96 or 128 bits.

86. The apparatus of one or more of the previous examples, wherein the at least one memory security engine comprises:
  encryption/decryption circuitry to encode a dataline to store in memory and decode a dataline received from memory; and
  verification circuitry to verify a dataline retrieved from memory by comparing the message authentication code to a generated message authentication code, wherein only verified and decrypted datalines are to be sent in response to a read request for a dataline.

87. The apparatus of one or more of the previous examples, wherein the verification circuitry is further to attempt error detection of a dataline based on the first proper subset of the error correction code.

88. The apparatus of one or more of the previous examples, wherein the at least one memory security engine further comprises:
  fetching and caching circuitry to fetch and cache the second, different proper subset of an error correction code from sequestered memory upon an uncorrectable error,
  wherein the verification circuitry is further to attempt error correction of a dataline based on the first proper subset of the error correction code and the second, different proper subset of an error correction code.

89. The apparatus of one or more of the previous examples, wherein the execution circuitry is further to confirm support for the replay based metadata organization based on one or more fields of a model specific register.

90. A method comprising:
  decoding a single instruction, the single instruction to include:
    a field for an opcode, the opcode to indicate that execution of the instruction is to at least indicate to the at least one memory security engine to configure a metadata organization region of memory as either integrity based or replay protection based, wherein
    in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
    in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value,
  at least one field that is at least one of:
    an identifier of at least one operand location that is to store an indication of a selection of integrity based or replay protection based metadata organization and
    an immediate that is to encode an indication of a selection of integrity based or replay protection based metadata organization, at least one field that is at least one of:
      an identifier of at least one operand location that is to store an indication of the region of memory that is to be organized according to the selected based metadata organization and
      an immediate that is to encode an indication of a region of memory that is to be organized according to the integrity based metadata organization; and
  executing the decoded single instruction according to the opcode.

91. The method of the previous example, wherein the at least one operand location is a register.

92. The method of the previous example, wherein the at least one operand location is a memory location.

93. The method of one or more of the previous examples, wherein the executing further comprises confirming support for the integrity based metadata organization region of memory based on one or more fields of a model specific register.

94. The method of one or more of the previous examples, further comprising:
  decoding a dataline received from memory; and
  verifying the dataline retrieved from memory by comparing the message authentication code to a generated message authentication code, wherein only verified and decrypted datalines are to be sent in response to a read request for a dataline.

95. The method of one or more of the previous examples, wherein the verifying further comprises attempting error detection of a dataline based on the first proper subset of the error correction code.

96. The method of one or more of the previous examples, further comprising:
  fetching and caching the second, different proper subset of an error correction code from sequestered memory upon an uncorrectable error; and
  attempting error correction of a dataline based on the first proper subset of the error correction code and the second, different proper subset of an error correction code.

97. The method of one or more of the previous examples, further comprising:
  accessing memory that is to store one or more datalines.

98 The method of one or more of the previous examples, further comprising:
  initializing the metadata organization region of memory.

99. A non-transitory machine readable medium storing instructions to perform the method of any of examples 90-98.

100. A system comprising:
  a processor comprising:
    at least one memory security engine;
    decoder circuitry to decode a single instruction, the single instruction to include:
      a field for an opcode, the opcode to indicate that execution circuitry is to at least indicate to the at least one memory security engine to configure a metadata organization region of memory as either integrity based or replay protection based, wherein
        in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, at least one field that is at least one of:
an identifier of at least one operand location that is to store an indication of a selection of integrity based or replay protection based metadata organization and an immediate that is to encode an indication of a selection of integrity based or replay protection based metadata organization, at least one field that is at least one of:

an identifier of at least one operand location that is to store an indication of the region of memory that is to be organized according to the selected based metadata organization and an immediate that is to encode an indication of a region of memory that is to be organized according to the integrity based metadata organization; and the execution circuitry to execute the decoded single instruction according to the opcode; and.

the memory coupled to the processor to be organized according to the integrity based metadata organization.

101. An apparatus comprising:
at least one memory security engine;
decoder circuitry to decode a single instruction, the single instruction to include:
a field for an opcode, the opcode to indicate that execution circuitry is to at least indicate to the at least one memory security engine to disable a metadata organization region of memory that is either integrity based or replay protection based, wherein in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, at least one field that is at least one of:
an identifier of at least one operand location that is to store an indication of the region of memory and
an immediate that is to encode an indication of the region of memory; and the execution circuitry to execute the decoded single instruction according to the opcode.

102. The apparatus of the previous example, wherein the at least one operand location is a register.

103. The apparatus of the previous example, wherein the at least one operand location is a memory location.

104. The apparatus of one or more of the previous examples, wherein the execution circuitry is further to confirm support for the integrity based metadata organization based on one or more fields of a model specific register.

105. The apparatus of one or more of the previous examples, wherein the first proper subset of an error correction code and the second, different proper subset of an error correction code total 96 or 128 bits.

106. The apparatus of one or more of the previous examples, wherein the at least one memory security engine comprises:
encryption/decryption circuitry to encode a dataline to store in memory and decode a dataline received from memory; and
verification circuitry to verify a dataline retrieved from memory by comparing the message authentication code to a generated message authentication code, wherein only verified and decrypted datalines are to be sent in response to a read request for a dataline.

107. The apparatus of one or more of the previous examples, wherein the verification circuitry is further to attempt error detection of a dataline based on the first proper subset of the error correction code.

108. The apparatus of one or more of the previous examples, wherein the at least one memory security engine further comprises:
fetching and caching circuitry to fetch and cache the second, different proper subset of an error correction code from sequestered memory upon an uncorrectable error,
wherein the verification circuitry is further to attempt error correction of a dataline based on the first proper subset of the error correction code and the second, different proper subset of an error correction code.

109. The apparatus of one or more of the previous examples, wherein the execution circuitry is further to confirm support for the replay based metadata organization based on one or more fields of a model specific register.

110. A method comprising:
decoding a single instruction, the single instruction to include:
a field for an opcode, the opcode to indicate that execution of the single instruction is to at least indicate to the at least one memory security engine to disable a metadata organization region of memory that is either integrity based or replay protection based, wherein
in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value, at least one field that is at least one of:
  an identifier of at least one operand location that is to store an indication of the region of memory and
  an immediate that is to encode an indication of the region of memory; and
executing the decoded single instruction according to the opcode.

111. The method of the previous example, wherein the at least one operand location is a register.

112. The method of the previous example, wherein the at least one operand location is a memory location.

113. The method of one or more of the previous examples, wherein the executing further comprises confirming support for the integrity based metadata organization region of memory based on one or more fields of a model specific register.

114. The method of one or more of the previous examples, further comprising:
  decoding a dataline received from memory; and
  verifying the dataline retrieved from memory by comparing the message authentication code to a generated message authentication code, wherein only verified and decrypted datalines are to be sent in response to a read request for a dataline.

115. The method of one or more of the previous examples, wherein the verifying further comprises attempting error detection of a dataline based on the first proper subset of the error correction code.

116. The method of one or more of the previous examples, further comprising:
  fetching and caching the second, different proper subset of an error correction code from sequestered memory upon an uncorrectable error; and
  attempting error correction of a dataline on the first proper subset of the error correction code and the second, different proper subset of an error correction code.

117. The method of one or more of the previous examples, further comprising:
  accessing memory that is to store one or more datalines.

118. The method of one or more of the previous examples, further comprising:
  initializing the metadata organization region of memory.

119. A non-transitory machine readable medium storing instructions to perform the method of any of examples 110-118.

120. A system comprising:
  a processor comprising:
    at least one memory security engine;
    decoder circuitry to decode a single instruction, the single instruction to include:
      a field for an opcode, the opcode to indicate that execution circuitry is to at least indicate to the at least one memory security engine to disable a metadata organization region of memory that is either integrity based or replay protection based, wherein
        in the integrity based metadata organization region of memory a dataline is to be stored with a set of metadata that includes a message authentication code and a first proper subset of an error correction code and a second, different proper subset of an error correction code associated with the dataline is to be stored in memory that is sequestered from the dataline and the set of metadata, and
        in the replay protection based metadata organization region of memory a dataline is to be stored in a first portion of memory and a set of metadata to be used to traverse a replay protection tree is to be stored in sequestered memory, wherein the set of metadata includes at least one of a message authentication code, a version of the dataline, error correction code data, and a counter value,
      at least one field that is at least one of:
        an identifier of at least one operand location that is to store an indication of the region of memory and
        an immediate that is to encode an indication of the region of memory; and
    the execution circuitry to execute the decoded single instruction according to the opcode; and.
    the memory coupled to the processor to be organized according to the integrity based metadata organization.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
  at least one memory security engine;
  decoder circuitry to decode a single instruction, the single instruction to including:
    a field for an opcode, the opcode to indicate that execution circuitry is to at least indicate to the at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of the error correction code associated with the dataline is to be stored in memory that is sequestered from the dataline and the set of metadata, and
    at least one field that is at least one of:
      an identifier of at least one operand location that is to store an indication of the region of memory that is to be organized according to the integrity based metadata organization and
      an immediate that is to encode an indication of a region of memory that is to be organized according to the integrity based metadata organization; and
  the execution circuitry to execute the decoded single instruction according to the opcode.

2. The apparatus of claim 1, wherein the at least one operand location is a register.

3. The apparatus of claim 1, wherein the at least one operand location is a memory location.

4. The apparatus of claim 1, wherein the execution circuitry is further to confirm support for the integrity based metadata organization based on one or more fields of a model specific register.

5. The apparatus of claim 1, wherein the first proper subset of an error correction code and the second, different proper subset of an error correction code total 96 or 128 bits.

6. The apparatus of claim 1, wherein the at least one memory security engine comprises:
  encryption/decryption circuitry to encode a dataline to store in memory and decode a dataline received from memory; and verification circuitry to verify a dataline retrieved from memory by comparing the message authentication code to a generated message authentication code, wherein only verified and decrypted datalines are to be sent in response to a read request for a dataline.

7. The apparatus of claim 6, wherein the verification circuitry is further to attempt error detection of a dataline based on the first proper subset of the error correction code.

8. The apparatus of claim 7, wherein the at least one memory security engine further comprises:
fetching and caching circuitry to fetch and cache the second, different proper subset of an error correction code from sequestered memory upon an uncorrectable error,
wherein the verification circuitry is further to attempt error correction of a dataline based on the first proper subset of the error correction code and the second, different proper subset of an error correction code.

9. The apparatus of claim 1, wherein the at least one memory security engine further comprises storage of a plurality of encryption keys.

10. A method comprising:
decoding a single instruction, the single instruction to include:
a field for an opcode, the opcode to indicate that execution of the single instruction is to at least indicate to at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of the error correction code associated with the dataline is to be stored in memory that is sequestered from the dataline and the set of metadata, and
at least field that is at least one of:
an identifier of at least one operand location that is to store an indication of the region of memory that is to be organized according to the integrity based metadata organization and
an immediate that is to encode an indication of a region of memory that is to be organized according to the integrity based metadata organization; and
executing the decoded single instruction according to the opcode.

11. The method of claim 10, wherein the at least one operand location is a register.

12. The method of claim 10, wherein the at least one operand location is a memory location.

13. The method of claim 10, wherein the executing further comprises confirming support for the integrity based metadata organization region of memory based on one or more fields of a model specific register.

14. The method of claim 10, further comprising:
decoding a dataline received from memory; and
verifying the dataline retrieved from memory by comparing the message authentication code to a generated message authentication code, wherein only verified and decrypted datalines are to be sent in response to a read request for a dataline.

15. The method of claim 14, wherein the verifying further comprises attempting error detection of a dataline based on the first proper subset of the error correction code.

16. The method of claim 10, further comprising:
fetching and caching the second, different proper subset of an error correction code from sequestered memory upon an uncorrectable error; and
attempting error correction of a dataline based on the first proper subset of the error correction code and the second, different proper subset of an error correction code.

17. The method of claim 10, further comprising:
accessing memory that is to store one or more datalines.

18. The method of claim 10, further comprising:
initializing the integrity based metadata organization region of memory.

19. A system comprising:
a processor comprising:
at least one memory security engine;
decoder circuitry to decode a single instruction, the single instruction to include:
a field for an opcode, the opcode to indicate that execution circuitry is to at least indicate to the at least one memory security engine to configure an integrity based metadata organization region of memory, wherein in the integrity based metadata organization region of memory a dataline is to be stored with a set of metadata that includes a message authentication code and a first proper subset of an error correction code and a second, different proper subset of the error correction code associated with the dataline is to be stored in memory that is sequestered from the dataline and the set of metadata, and
at least one field that is at least one of:
an identifier of at least one operand location that is to store an indication of the region of memory that is to be organized according to the integrity based metadata organization and
an immediate that is to encode an indication of a region of memory that is to be organized according to the integrity based metadata organization; and
the execution circuitry to execute the decoded single instruction according to the opcode; and
the memory coupled to the processor to be organized according to the integrity based metadata organization.

* * * * *